3,464,987
1,2-DIHYDRO-1-HYDROXY-2-IMINO-6-(LOWER ALKYL)PYRIMIDINES
Joseph J. Ursprung, Portage, and William C. Anthony, Kalamazoo, Mich., assignors to The Upjohn Company, Kalamazoo, Mich., a corporation of Delaware
No Drawing. Filed Feb. 21, 1966, Ser. No. 528,790
The portion of the term of the patent subsequent to May 7, 1985, has been disclaimed
Int. Cl. C07d 99/02, 57/00; A61k 27/00
U.S. Cl. 260—247.5    17 Claims

ABSTRACT OF THE DISCLOSURE 1,2-dihydro-1-hydroxy-2-imino-6-(lower alkyl)pyrimidines, the corresponding acid addition salts, and the carboxylates are disclosed. These compounds are useful in the treatment of hypertension and shock.

---

This invention relates to novel compositions of matter and to methods for producing them. In particular, this invention relates to novel 1,2-dihydro-1-hydroxy-2-imino-6-lower-alkylpyrimidines of Formula IA,

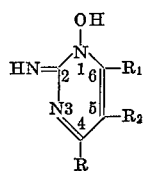

IA and 1,6-dihydro-1-hydroxy-2-lower-alkyl-6-iminopyrimidines of Formula IB,

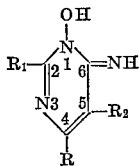

IB wherein R is a moiety selected from the group consisting of moieties of the formula

wherein $R_3$ and $R_4$ are selected from the group consisting of hydrogen, lower alkyl, lower alkenyl, lower aralkyl, and lower cycloalkyl, with the proviso that both $R_3$ and $R_4$ are not hydrogen and the heterocyclic moieties, aziridinyl, azetidinyl, pyrrolidinyl, piperidino, hexahydroazepinyl, heptamethylenimino, octamethylenimino, morpholino, and 4-lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of R to the ring in said formula. When R is

$R_3$ and $R_4$ can be alike or different. When R is a heterocyclic moiety, the alkyls which can be attached thereto can all be different or any two or all of them can be alike. $R_1$ is lower alkyl and $R_2$ is selected from the group consisting of hydrogen, lower alkyl, bromo, chloro, nitro, amino, R as defined above, and

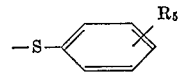

wherein $R_5$ is selected from the group consisting of hydrogen, bromo, chloro, fluoro, nitro, amino and lower alkyl.

The use of the above numbering system by which the positions of the pyrimidine nucleus are numbered will be followed exclusively in naming the various compounds.

The novel 1-hydroxypyrimidines of this invention can be represented by formulas other than Formulas IA and IB. For example, with regard to Formulas IA and IB, among such other formulas are:

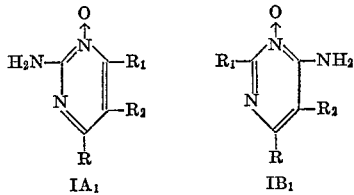

IA₁    IB₁

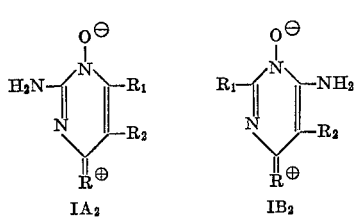

IA₂    IB₂

Compounds of Formulas $IA_1$, $IA_2$, $IB_1$, and $IB_2$ are tautomeric with compounds of Formulas IA and IB. For convenience, reference will be made hereinafter only to Formulas IA and IB. It is to be understood, however, that the novel compounds of this invention are likely to be mixtures of tautomeric forms, the compositions of which are dependent on such factors as the nature ot R, $R_1$, and $R_2$, and the environment. In some instances, one form or another may predominate.

Examples of lower alkyl are methyl, ethyl, propyl, butyl, pentyl, hexyl, heptyl, octyl, and isomeric forms thereof. Examples of lower alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-hepenyl, 2-octenyl, 5-octenyl, 1,4-dimethyl-4-hexenyl, and the like. Examples of lower cycloalkyl are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3-isopropylcyclohexyl, 2,2-dimethylcyclohexyl, cycloheptyl, cyclooctyl, and the like. Examples of lower aralkyl are benzyl, phenethyl, 1-phenylethyl, 2-phenylpropyl, 4-phenylbutyl, 6-pentylhexyl, 5-phenyl-2-methylpentyl, 1-naphthylmethyl, 2-(1-naphthyl)ethyl, 2-(2-naphthyl)ethyl, and the like.

Examples of heterocyclic moieties within the scope of R, in addition to those already mentioned above, are 2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-dioctylpyrrolidinyl,
2-methylpiperidino,
3-methylpiperidino,
4-methylpiperidino,
3-isopropylpiperidino,
4-tert-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl,
4-tert-butylhexahydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-isooctyloctamethylenimino,
2-ethylmorpholino,
2-methyl-5-ethylmorpholino,
3,3-dimethylmorpholino,
2,6-di-tert-butylmorpholino,
4-methylpiperazinyl,
4-isopropylpiperazinyl, and the like. In each of the above examples of heterocyclic moieties, the free valence, and hence the point of attachment to a carbon atom of the pyrimidine ring, is at the heterocyclic nitrogen atom.

The novel 1-hydroxypyrimidines of Formulas IA and IB are amines, and exist in the non-protonated or free base form, or in the protonated or acid addition salt form, depending on the pH of the environment. They form stable protonates, i.e., mono- or diacid addition salts, on neutralization with suitable acids, for example, hydrochloric, hydrobromic, sulfuric, phosphoric, nitric, acetic, benzoic, salicyclic, glycolic, succinic, nicotinic, tartaric, maleic, malic, pamoic, methanesulfonic, cyclohexanesulfamic, picric, and lactic acids, and the like. These acid addition salts are useful for upgrading or purifying the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula IA and IB compounds form salts with fluosilicic acid which are useful as mothproofing agents according to U.S. Patents 1,915,334 and 2,075,539. They also form salts with thiocyanic acid which condense with formaldehyde to form resinous materials useful as pickling inhibitors according to U.S. Patents 2,425,320 and 2,606,155.

The Formula IA and IB 1-hydroxypyrimidines of this invention also form salts with penicillins. These salts have solubility characteristics which cause them to be useful in the isolation and purification of penicillins, particularly benzyl penicillin. Said salts can be formed either by neutralization of the free base form of a compound of Formula IA or IB with the free acid form of a penicillin, or by a metathetical exchange of the anion of an acid addition salt of a Formula IA or IB compound, for example, the chloride ion of a hydrochloride, with the anionic form of a penicillin.

The novel Formula IA and IB 1-hydroxypyrimidines also form carboxyacylates on treatment with carboxyacylating agents, for example, carboxylic acid anhydrides and carboxylic acid chlorides. These carboxyacylates can be single compounds or mixtures of compounds depending on such factors as the nature of the 1-hydroxypyrimidine reactant, the carboxyacylating agent, and the reaction conditions.

Carboxyacylates obtained from Formula IA and IB 1-hydroxypyrimidines can be represented by the formulas

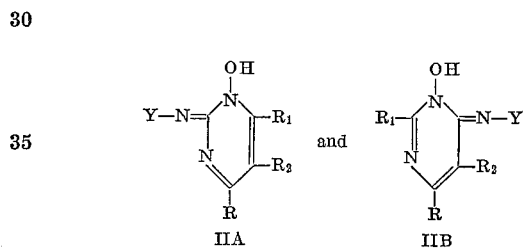

wherein R, $R_1$ and $R_2$ are as defined above and Y is carboxyacyl.

The carboxyacylates of Formulas IIA and IIB can be used for upgrading a Formula IA or IB 1-hydroxypyrimidine free base. The latter can be transformed to a carboxyacylate, the carboxyacylate purified by conventional techniques, e.g., recrystallization or chromatography, and the purified carboxyacylate deacylated, advantageously by alcoholysis.

The dihydropyrimidine carboxyacylates of Formulas IIA and IIB can be represented by other formulas. As for Formula IA and IB compounds, these Formula IIA and IIB carboxyacylates are likely to be mixtures of tautomeric forms, the compositions of which are dependent on such factors as the nature of the substituents and the carboxyacyl moieties, and the environment. In some instances, one form or another may predominate. Formulas IIA and IIB are used for convenience, and the other tautomeric forms are not excluded.

Carboxyacylates of Formulas IIA and IIB are amines and exist in either the non-protonated (free base) form or the protonated (acid addition salt) form depending upon the pH of the environment. They form stable protonates on neutralization with suitable strong acids, for example, hydrochloric acid, sulfuric acid, phosphoric acid, perchloric acid, and the like. These acid addition salts are useful for upgrading or purifying the carboxyacylate free bases.

The novel compounds of this invention, including the free bases of Formulas IA and IB, the acid addition salts thereof, the carboxyacylates of Formulas IIA and IIB, and the acid addition salts thereof possess pharmacological activity. For example, they are orally and parenterally active in birds and mammals, including man, as antihypertensive agents having vasodilatory activity, and are useful for lowering blood pressure and for the treatment of shock. They are also useful as antifertility agents, as antiviral agents, as anti-inflammatory agents, and as central nervous system stimulants. These compounds also cause electrolyte and water retention in laboratory animals such as rats and dogs, and hence are useful to produce laboratory animals with larger than normal amounts of sodium ions, potassium ions, chloride ions, and water. Such animals are useful in pharmacological research, for example, in screening compounds for possible diuretic activity and in studying the action of known diuretics.

The novel compounds of Formula IA are produced according to the following reaction scheme:

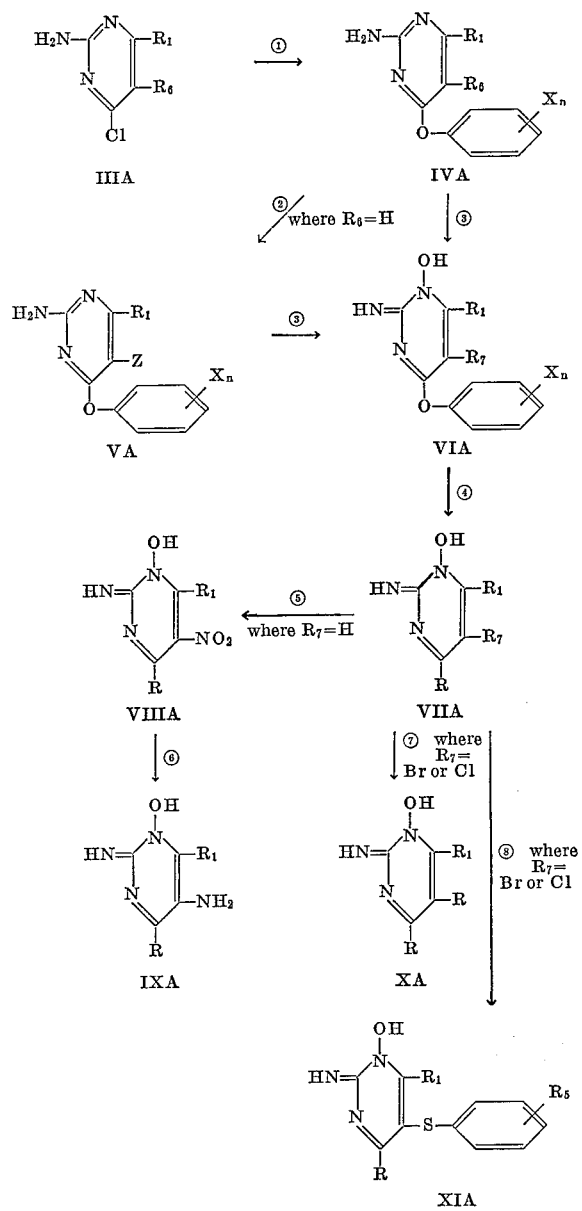

wherein R, $R_1$ and $R_5$ are defined as above, $R_6$ is selected from the group consisting of hydrogen and lower alkyl, Z is bromo and chloro, $R_7$ is selected from the group consisting of hydrogen, lower alkyl, bromine and chlorine, X is fluorine, chlorine and bromine, and $n$ is zero to 3, inclusive.

The 1,6-dihydro-1-hydroxy-2-lower-alkyl-6-iminopyrimidines of Formula IB are also produced according to the reaction scheme outlined above, namely,

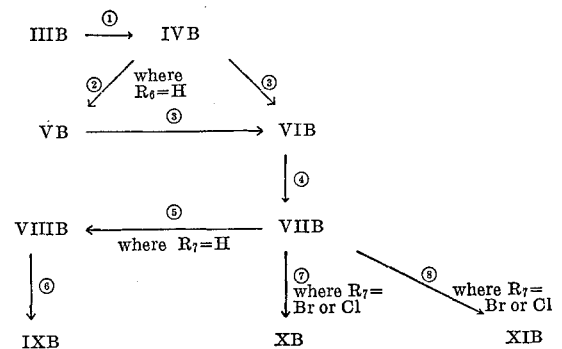

by substituting the corresponding 2-lower-alkyl-6-aminopyrimidines of Formula IIIB for the 2-amino-6-loweralkylpyrimidines of Formula IIIA.

The starting compounds of Formula IIIA are known in the art or can be prepared according to methods well known in the art, such as the method described by Braker et al., J. Amer. Chem. Soc., 69, 3072 (1947). The starting compounds of Formula IIIB are known in the art or can be prepared according to methods well known in the art, such as the method described by Földi et al., Ber. Deut. Chem. Ges., 75, 755 (1942).

Hereinafter in the body of the specification wherever possible for convenience and brevity, reference will be made only to the A series compounds, that is, compounds in which the 6-position is occupied by a lower alkyl group, such as the 2-amino-6-lower-alkylpyrimidines (IIIA, IVA and VA), and the 1,2-dihydro-1-hydroxy-2-imino-6-loweralkylpyrimidines (VIA) and like compounds of the A series. However, it is to be understood that reference to the A series is not to be construed as limiting the invention to these compounds. Rather, reference to the A series is also intended to be inclusive of the compounds of the B series, such as the 2-lower-alkyl-6-aminopyrimidines (IIIB, IVB and VB), and the 1,6-dihydro-1-hydroxy-2-lower-alkyl-6-iminopyrimidines (VIB) and like compounds of the B series.

The novel 1,2-dihydro-1-hydroxypyrimidines of Formula VIIA are produced by mixing a compound of formula:

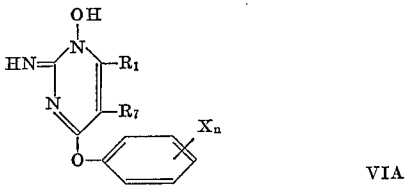

wherein $R_1$, $R_7$, X and $n$ are defined as above, with an amine of the formula RH wherein R is as defined above. The phenoxy moiety of the Formula VIA reactant is displaced by the R moiety of the amine (Reaction 4).

The 1,2-dihydro-1-hydroxy-4-phenoxypyrimidines of Formula VIA are novel compounds. In addition to being useful as reactants for the production of Formula VIIA 1,2-dihydro-1-hydroxypyrimidines, they are useful for various pharmacological purposes. For example, the Formula VIA compounds (and the VIB compounds) are orally and parenterally active in birds and mammals, including man, as antihypertensive agents having vasodilatory activity, and are useful for lowering blood pressure and for the treatment of shock. They are also useful as antifertility agents and antiviral agents, and as agents causing electrolyte and water retention in laboratory animals.

The novel 1,2-dihydro-1-hydroxy-4-phenoxypyrimidines of Formula VIA are produced by mixing a pyrimidine of the formulas:

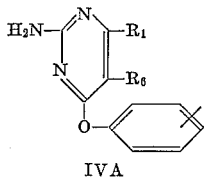 and 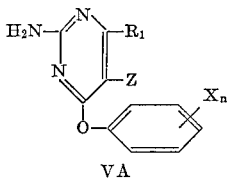

IVA                    VA wherein X, n, R₁, Z and R₆ are as defined above, with a percarboxylic acid (Reaction 3). Particularly preferred for this purpose are perbenzoic acids of the formula:

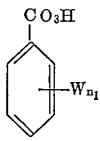

XII wherein W is selected from the group consisting of halogen, lower alkyl, lower alkoxy, and nitro, and $n_1$ is zero to 5, inclusive. However, other percarboxylic acids can be used for this oxidation, examples being performic acid, peracetic acid, perpropionic acid, perbutyric acid, perphthalic acid, percamphoric acid, and the like.

Pyrimidines of Formula IVA are prepared by mixing a pyrimidine of the formula:

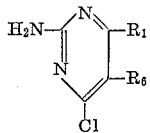

IIIA wherein R₁ and R₆ are as defined above, with a phenoxide salt of a phenol of the formula:

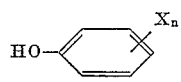

XIII wherein X and n are as defined above (Reaction 1).

The novel 1,2-dihydro-1-hydroxy-5-nitropyrimidines of Formula VIIIA are produced by nitrating Formula VIIA 1,2-dihydro-1-hydroxypyrimidines wherein R₇ is hydrogen (Reaction 5).

The novel 1,2-dihydro-1-hydroxy-5-aminopyrimidines of Formula IXA are produced by mixing a Formula VIIIA 1,2-dihydro-1-hydroxy-5-nitropyrimidine with hydrogen in the presence of a hydrogenation catalyst (Reaction 6).

Quite unexpectedly, the carbon-carbon and carbonnitrogen unsaturation in the 1,2-dihydropyrimidine ring is not hydrogenated with the same ease as the nitro moiety. Therefore, the hydrogenation conditions can easily be selected to hydrogenate only the nitro moiety. It should be noted, however, that 5-aminopyrimidines of Formula IXA wherein R contains an alkenyl moiety cannot be prepared by catalytic hydrogenation of Formula VIIIA 5-nitropyrimidines because any alkenyl moieties will be transformed by hydrogenation to alkyl moieties. Alternatively, the nitro moiety in the Formula VIIIA compounds can be reduced by a chemical reducing agent which does not alter carbon-carbon unsaturation, for example, sodium dithionite or sodium hydrosulfite. See, for example, J. Chem. Soc. (London) 985 (1956); J. Am. Chem. Soc. 79, 1518 (1957); Ber. Deut. Chem. Ges. 88, 1306 (1955); ibid. 90, 2272 (1957); ibid. 89, 2799 (1956).

The novel 1,2-dihydro-1-hydroxyprimidines of Formula VIA wherein R₇ is chlorine or bromine are produced by the reaction sequence,

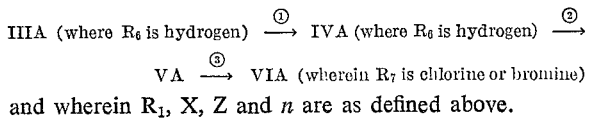

and wherein R₁, X, Z and n are as defined above.

Suitable percarboxylic acids for the transformation (Reaction 3) of the Formula VA pyrimidines to VIA 1,2-dihydro-1-hydroxypyrimidines are those listed above as suitable for the transformation of Formula IVA (wherein R₆ is lower alkyl or hydrogen) pyrimidines to Formula VIA 1,2-dihydro-1-hydroxypyrimidines (wherein R₇ is lower alkyl or hydrogen). Especially preferred for this purpose are the above-mentioned perbenzoic acids of Formula XII. Suitable halogenation agents for converting the compounds of Formula IVA (where R₆ is hydrogen) to the compounds of Formula VA are the halogens themselves, i.e., chlorine and bromine, and the so-called positive halogen compounds (Reaction 2).

The term, positive halogen compounds, as used herein, refers to organic or inorganic compounds which contain chlorine or bromine with a valence number +1. Such compounds usually contain a chlorine or bromine atom bonded to some other atom, usually oxygen or nitrogen, in an inorganic or organic compound by a polar covalent bond wherein the halogen atom is the positive end of the dipole. Examples of inorganic positive halogen compounds are the hypohalous acids, e.g., hypochlorous acid and hypobromous acid, and the hypohalites, e.g., lithium, sodium, potassium, and calcium hypochlorites and hypobromites. Examples of organic positive halogen compounds are hypohalite esters, e.g., t-butyl hypochlorite; N-haloamides, e.g., N-chloroacetamide, N-bromoacetamide, N,p-dichloroacetanilide, N-chloro-p-nitroacetanilide, and N-chlorobenzenesulfonamide; N-haloimides, e.g., N-chlorosuccinimide, N-bromosuccinimide, and N-chlorophthalimide; and other N-halo compounds, e.g., N-bromohydantoin, 1,3-dibromo-5,5-dimethylhydantoin, 1,3-dichloro-5,5-dimethylhydantoin, and the like. These halogenations are carried out by methods known in the art for halogenation of diaminopyrimidines. See, for example, Brown, "The Pyrimidines," Interscience Publishers, New York, pp. 169 (1962) and Phillips et al., J. Am. Chem. Soc., 74, 3922 (1952).

The novel 1,2-dihydro-1-hydroxypyrimidines of Formula XIA wherein the substituent at the 5-position is

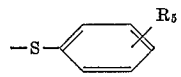

R₅ being defined as above, are produced (Reaction 8) by mixing a 1,2-dihydro-1-hydroxy-5-halopyrimidine of Formula VIIA (wherein R₇ is chlorine or bromine) with a thiophenol of the formula:

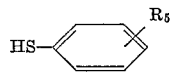

XIV wherein R₅ is as defined above.

The novel 1,2-dihydro-1-hydroxypyrimidines of Formula XA are produced by mixing (Reaction 7) a 1,2-dihydro-1-hydroxy-5-halopyrimidine of Formula VIIA with an amine of the formula RH, wherein R is as defined above. The R group attached at the 5-position can be the same or different than the R group attached at the 4-position.

The reaction, 1, between a Formula IIIA 4-chloropyrimidine and a phenoxide salt of the Formula XIII phenol is carried out by heating a mixture of the pyrimidine and the salt in the range about 100° to about 200° C., preferably in the range about 140° to about 180° C., until the desired displacement reaction takes place. Usually about one to about 10 hours of heating is sufficient, less time usually being required at higher temperature, e.g., 180° C. than at lower temperature, e.g., 140° C.

Alkali metal phenoxides, especially sodium or potassium phenoxides, are preferred although phenoxides of other metals, e.g., magnesium, calcium, and aluminum, can be used. One molecular equivalent of the phenoxide salt is required to react with with each molecular equivalent of 4-chloropyrimidine, and there is usually no reason to use other than those molecular proportions. It is advantageous, however, to heat the phenoxide salt and the 4-chloropyrimidine in the presence of about one to about 10 or even more molecular equivalents of the phenol corresponding to the phenoxide salt. The phenol then serves as a diluent, and can also serve as a source of the phenoxide salt. In the latter case, one molecular equivalent of a metal hydroxide corresponding to the desired metal phenoxide salt, e.g., sodium hydroxide or potassium hydroxide, is added to sufficient Formula XIII phenol to produce the desired amount of phenoxide salt and leave enough to serve as the diluent.

In preparing the mixture of phenoxide salt and phenol diluent, it is often advantageous to add the metal hydroxide in solid form, and then remove water by a preliminary heating at about 100° C. The chloropyrimidine is then added to the phenoxide-phenol mixture.

Alternatively, chloropyrimidine, metal hydroxide, and sufficient phenol to form phenoxide and to serve as a diluent are mixed together and heated.

In place of or in addition to a phenol diluent, another inert liquid diluent, for example, dimethylformamide, can be used to aid in forming a suitably mobile reaction mixture.

The desired Formula IVA 4-phenoxypyrimidine can be isolated from the reaction mixture by conventional methods, for example, by addition of sufficient aqueous alkali metal hydroxide solution to dissolve the phenol diluent, if one is used, followed by separation of the desired product by filtration or centrifugation. The phenoxypyrimidine can then be purified, if desired, by conventional methods, for example, by recrystallization from a suitable solvent or mixture of solvents.

The reaction, 3, between a Formula IVA or VA 4-phenoxypyrimidine and a percarboxylic acid to produce a Formula VIA 1,2-dihydro-1-hydroxy-4-phenoxypyrimidine is carried out by mixing those two reactants, preferably in the presence of an inert liquid diluent. Although, as mentioned above, percarboxylic acids generally are useful for this oxidation, it is preferred to use perbenzoic acids of Formula XII. Acids of Formula XII are known in the art or can be prepared by methods known in the art. See, for example, Braun, Organic Syntheses, Coll. Vol. 1, 2nd ed., 431 (1941) and Silbert et al., J. Org. Chem. 27, 1336 (1962). In Formula XII, when $n_1$ is 2 or more, the W's can be the same or different, examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula XII include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid, and the like.

In carrying out the reaction between the Formula IVA or VA pyrimidine and the Formula XII perbenzoic acid, the two reactants are mixed advantageously below about 50° C., preferably between about −10° and +10° C., although higher or lower temperatures can be used. It is preferred to mix the reactants in the presence of an inert liquid diluent and to stir the mixture until the reaction is substantially complete. The reaction usually requires about one to about 8 hours. Suitable diluents include N-lower-alkylpyrrolidones, e.g., N-methylpyrrolidone; lower alkanols, e.g., methanol, ethanol, propanol, isopropyl alcohol, the butanols and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula IVA or VA pyrimidine and Formula XII perbenzoic acid can be varied widely. Ratios from about 1:1 to 1:5, preferably from about 1:1.5 to 1:2.5, are suitable.

The 1,2-dihydro-1-hydroxy-4-phenoxypyrimidine of Formula VIA can be isolated from the oxidation reaction mixture by conventional techniques, for example, by successive evaporation of the reaction solvent at reduced pressure, solution of the basic Formula VIA product in aqueous acid, e.g., hydrochloric acid, removal of undesired water-insoluble reaction products by filtration, neutralization of the acidic filtrate, and isolation of the Formula VIA product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

The reaction, 4, between a Formula VIA 1,2-dihydro-1-hydroxy-5-$R_7$-4-phenoxypyrimidine (where $R_7$ is hydrogen or lower alkyl) and an amine of Formula RH, wherein R is as defined above, to produce a Formula VIIA 1,2-dihydro-1-hydroxy-5-$R_7$-pyrimidine (where $R_7$ is hydrogen or lower alkyl) is carried out by mixing those two reactants and heating the mixture in the range about 100° to about 200° C., preferably in the range about 125° to about 175° C. The reaction, 4, between a Formula VIA 1,2-dihydro-1-hydroxy-5-$R_7$-4-phenoxypyrimidine (where $R_7$ is bromine or chlorine) and an amine of Formula RH, wherein R is as defined above, to produce a Formula VIIA 1,2-dihydro-1-hydroxy-5-$R_7$-pyrimidine (where $R_7$ is bromine or chlorine) is carried out by mixing those two reactants and heating the mixture in the range about 25° to about 100° C., preferably in the range about 50° to about 80° C. At least one molecular equivalent of the amine should be mixed with each molecular equivalent of the pyrimidine reactant. It is usually advantageous to use an excess of the amine, for example, about 2 to about 20 molecular equivalents or even more of amine per molecular equivalent of the pyrimidine, the excess amine then acting as a diluent. An inert organic diluent can also be present in the reaction mixture. Especially suitable for that purpose are dialkylformamides, particularly those where the dialkyl substituents are the same as those on the displacing amine, and alkanols.

When the reactant amine has a relatively low boiling point and is likely to escape from the reaction vessel during heating, it is advantageous to use a closed reaction vessel, for example, a heavy-wall, sealed, glass tube or a closed metal autoclave for the heating step.

A reaction time of about one to about 20 hours is usually required. The desired displacement reaction usually takes place more rapidly at higher temperatures than at lower. Moreover, when the phenoxy moiety has 2 or 3 halogen substituents, i.e., when $n$ in Formula VIA is 2 or 3, the displacement usually takes place more rapidly and at a lower temperature than when fewer or no halogen is present. In the latter instances, especially when no halogen is present in the phenoxy moiety, the displacement reaction is often accelerated by adding sodium or potassium metal to the reaction mixture. Preferably, about one atomic equivalent of the alkali metal is added per molecular equivalent of the pyrimidine reactant. Addition of a catalytic amount of a Lewis acid such as ferric chloride with the alkali metal will also often accelerate the displacement reaction or make feasible a lower reaction temperature. About 0.01 to 0.001 molecular equivalent of ferric chloride per atomic equivalent of alkali metal is usually a suitable catalytic amount.

Examples of suitable primary amine reactants for this displacement reaction are methylamine, ethylamine, propylamine, isopropylamine, butylamine, sec-butylamine, pentylamine, isopentylamine, hexylamine, heptylamine, octylamine, allylamine, 2-methylallylamine, 2-butenylamine, 3-butenylamine, 3-pentenylamine, 4-hexenylamine, 4-4-dimethyl - 2 - pentenylamine, cyclobutylamine, cyclohexylamine, 4 - tert - butylcyclohexylamine, benzylamine, phenethylamine, and the like. Examples of suitable secondary amines for this purpose are dimethylamine, diethylamine, N - methylethylamine, dipropylamine, N - ethylisopropylamine, di - sec - butylamine, N - methylbutylamine, dipentylamine, N - ethyl - 2,4 - dimethylpentylamine, N - methyloctylamine, diheptylamine, diallylamine, N - methylallylamine, di - (1 - methylallyl)amine, di - (2 - methylallyl)amine, N-ethyl - 1 - methylallylamine, N - propyl - 2 - ethylallylamine, di - (2 - pentenyl)amine, di - (3 - butenyl)amine, di - (4 - hexenyl)amine, N - butyl - 2 - butenylamine, N-methylcyclohexylamine, dicyclohexylamine, N - ethylbenzylamine, dibenzylamine, di - (4 - methyl - 3 - hexenyl)amine, aziridine, 2 - methylaziridine, 2,2 - dimethylaziridine, azetidine, 2 - ethylazetidine, 3 - octylazetidine, 3,3 - dimethylazetidine, 2,2,4 - trimethylazetidine, pyrrolidine, 2 - propylpyrrolidine, 3 - butylpyrrolidine, 2 - isohexylpyrrolidine, 2,3 - dimethylpyrrolidine, 2,2,4-trimethylpyrrolidine, 2,5 - diethylpyrrolidine, 3,4 - dioctylpyrrolidine, piperidine, 2 -methylpiperidine, 3-ethylpiperidine, 4 - butylpiperidine, 2,4,6 - trimethylpiperidine, 2 - methyl - 5 - ethylpiperidine, 3,5 - dipentylpiperidine, hexahydroazepine, 2 - ethylhexahydroazepine, 4 - tertbutylhexahydroazepine, 3,3 - dimethylhexahydroazepine, 2,4,6 - tripropylhexahydroazepine, heptamethylenimine, 2 - methylheptamethylenimine, 2,4 - diisopropylheptamethylenimine, octamethylenimine, 4 - isooctyloctamethylenimine, morpholine, 2 - ethylmorpholine, 2 - methyl - 5 - ethylmorpholine, 2,6 - dimethylmorpholine, N - methylpiperazine, and the like.

The desired Formula VIIA 1,2-dihydro-1-hydroxypyrimidine can usually be isolated from the reaction mixture in free base form by cooling the reaction mixture to about 0° to about 25° C. The free base form usually precipitates and can be isolated by conventional techniques, for example, by filtration or centrifugation. Alternatively, excess amine and other diluent, if one is used, can be removed by distillation or evaporation, and the desired 1,2 - dihydro - 1 - hydroxypyrimidine isolated by conventional techniques, for example, fractional recrystallization or extraction. The isolated pyrimidine can then be purified, if desired, by conventional techniques, for example, recrystallization from a solvent or mixture of solvents, or by chromatography. Alternatively, an acid addition salt, e.g., the hydrochloride or acid phosphate of the pyrimidine product can be prepared, purified by recrystallization, and then, if desired, reconverted to the free base in the usual manner.

Nitration, 5, of the Formula VIIA (where $R_7$ is hydrogen) 1,2 - dihydro - 1 - hydroxypyrimidines is advantageously carried out by mixing the pyrimidine reactant with concentrated sulfuric acid (95%), cooling the resulting solution, and then slowly adding a mixture of concentrated sulfuric acid (95%) and concentrated nitric acid (70%) with continued cooling in the range about 0° to about 25° C., preferably about 10° to 15° C. A total reaction time of about one to about 5 hours is usually sufficient. One molecular equivalent of nitric acid is required for each molecular equivalent of pyrimidine reactant.

In some instances, a less concentrated sulfuric acid or less concentrated nitric acid can be used if the pyrimidine reactant is especially easily nitrated. It will be apparent to those skilled in the art that the optimum nitration conditions for each particular pyrimidine reactant of Formula VIIA, including nitric acid and sulfuric acid concentrations and amounts, reaction time, and reaction temperature must be determined by preliminary small scale experiments.

The nitrated 1,2 - dihydro - 1 - hydroxypyrimidine of Formula VIIIA can be isolated from the reaction mixture by pouring the mixture onto crushed ice, making the resulting mixture basic, and then isolating the desired nitration product by conventional methods, for example, filtration, centrifugation, or extraction. The nitration products are usually solids and can be purified by recrystallization from a suitable solvent or mixture of solvents or by chromatography.

Reduction, 6, of the Formula VIIIA 1,2-dihydro-1-hydroxy - 5 - nitropyrimidines is advantageously carried out by catalytic hydrogenation in the presence of a hydrogenation catalyst, for example, a noble metal, e.g., platinum, palladium, rhodium, or a base metal, e.g., Raney nickel, Raney cobalt, and in the presence of an inert diluent, for example, methanol, ethanol, dioxane, ethyl acetate, and the like. Palladium catalysts are preferred. Hydrogenation pressures ranging from about atmospheric to about 100 p.s.i., and hydrogenation temperatures ranging from about 10° to about 100° C. are preferred.

It is also preferred to add sufficient strong acid, for example, a mineral acid such as hydrochloric acid, sulfuric acid, or phosphoric acid, to the pyrimidine reactant before hydrogenation so that the protonated form of the reactant is hydrogenated and the protonated or acid addition salt form of the 5-aminopyrimidine product is produced. In some instances, the acid addition salt form of the product is substantially more stable and more easily isolated than the free base form.

The Formula IXA 5-aminopyrimidine reduction products are isolated from the hydrogenation reaction mixtures by conventional techniques, for example, by removal of the catalyst by filtration or centrifugation, and then removal of the diluent by distillation or evaporation. If the 5-nitropyrimidine reactant is pure, it is usually unnecessary to purify the 5-aminopyrimidine product. When purification is necessary, however, it is preferred to purify a suitable acid addition salt by recrystallization from a suitable solvent or mixture of solvents.

Halogenation, 2, of Formula IVA (where $R_6$ is hydrogen) 4-phenoxypyrimidines is carried out by mixing the pyrimidine reactant with the halogenating agent, preferably in the presence of a diluent. For example, in the case of bromination, the pyrimidine reactant is dissolved in a diluent such as acetic acid, and the resulting solution is gradually mixed in the range about 10° to about 100° C. with one molecular equivalent of bromine, also dissolved in a diluent such as acetic acid. In some instances, it is advantageous to carry out the bromination in the presence of water, although enough organic diluent, e.g., acetic acid, should also be present to maintain a homogeneous reaction mixture. The presence of a base such as calcium carbonate, or sodium acetate where the diluent is acetic acid, to neutralize the hydrobromic acid which is formed is also desirable. In a similar manner, use of chlorine yields the corresponding formula VA 5-chloropyrimidines.

Alternatively, one of the so-called positive halogen compounds, examples of which have been given above, can be used to halogenate a Formula IVA (where $R_6$ is hydrogen) 4-phenoxypyrimidine. For example, a mixture of a Formula IVA (where $R_6$ is hydrogen) pyrimidine reactant, one molecular equivalent of the positive halogen compound, e.g., N-chlorosuccinimide or N-bromosuccinimide, and an inert diluent, for example, carbon tetrachloride, are mixed and heated in the range about 50° to about 100° C.

The desired 5-halo-4-phenoxypyrimidines of Formula VA can be isolated from a halogenation reaction mixture by conventional methods, for example, by evaporation of the diluent, and the product can be purified, if desired, by conventional methods, for example, by recrystallization from a suitable solvent or mixture of solvents, or by chromatography.

thoyl chloride; furoyl chloride, 3-pyridinecarbonyl chloride, phthaloyl chloride, and the like, as well as the corresponding acid chlorides substituted with one or more of the above-mentioned substituents. At least one molecular equivalent of carboxyacylating agent should be used for the introduction of each carboxyacyl moiety.

The carboxyacylation usually takes place rapidly in the range about $-20°$ to about $+50°$ C. Suitable diluents are ethers, e.g., diethyl ether and tetrahydrofuran; ketones, e.g., acetone and methyl ethyl ketone; esters, e.g., methyl acetate and ethyl acetate; acetonitrile; pyridine; and the like. The desired carboxyacylate often separates from the reaction mixture in crystalline form, and can be separated in the usual manner, for example, by filtration or centrifugation. Alternatively, the diluent can be evaporated, preferably at reduced pressure. The carboxyacylates can be purified by conventional techniques, for example, by recrystallization from a suitable solvent or mixture of solvents.

Dihydropyrimidine carboxyacylates prepared as described above are easily transformed back to the Formula IA dihydropyrimidine free base, preferably by warming with a lower alkanol, e.g., methanol or ethanol. Simultaneous treatment with a base, for example, gaseous ammonia, or an acid, for example, hydrochloric acid, usually accelerates the alcoholysis.

As mentioned above, the novel compounds of this invention, i.e., compounds of Formulas IA, IIA and VIA (and IB, IIB and VIB), including the free bases and acid addition salts thereof, are useful as antihypertensive agents, antifertility agents, antiviral agents, anti-inflammatory agents, and as central nervous system stimulants in the treatment of birds and mammals, including man. For those purposes, especially as antihypertensive agents, said novel compounds can be used in the non-protonated (free base) form or in the protonated (acid addition salt) form either in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs, for example, in combination with diuretics, sympathetic blocking agents, ganglion-blocking agents, peripheral vasodilators, reserpinoids, tranquilizers, sedatives, muscle relaxants, anti-histamines and other anti-hypertensives.

Powders are prepared by comminuting the active ingredient to a suitable fine size and mixing with a similarly comminuted diluent. The diluent can be an edible carbohydrate material such as starch. Advantageously, a sweetening agent is present as well as a flavoring agent.

Capsules are produced by preparing a powder mixture as hereinbefore described and filling into formed gelatin sheets. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the active ingredient suitably comminuted, with a diluent or base such as starch, lactose, kaolin, dicalcium phosphate, calcium sulfate, and the like. The powder mixture can be granulated by wetting with a binder such as syrup, gelatin solution, methylcellulose solution or acacia mucilage and forcing through a screen. As an alternative to wet granulating, the powder mixture can be slugged, i.e., run through a tablet machine and the resulting large tablets broken down into granules. The granules are further lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of active ingredient for administration.

A syrup is prepared by dispersing the active ingredient in a suitably flavored aqueous sucrose solution. Similarly an elixir is prepared utilizing an aqueous-alcoholic vehicle. Elixirs are advantageous vehicles for use when a therapeutic agent, which is not sufficiently water-soluble, is in the composition.

For parenteral administration aqueous fluid unit dosage forms can be prepared. In preparing the parenteral form, a measured amount of active ingredient is placed in a vial, and the vial and its contents are sterilized and sealed. An accompanying vial of sterile water for injection is provided as a vehicle to form a dispersion prior to administration. Advantageously, the sterile water can have dissolved therein a local anesthetic and buffering agent. Parenteral aqueous solutions can also be made by utilizing a pharmacologically acceptable salt of the active ingredient, such as those mentioned above.

Alternatively, a parenteral suspension can be prepared by suspending the active ingredient in a parenterally acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in the specification, these being features of the present invention. Examples of suitable unit dosage forms in accord with this invention are tablets, capsules, pills, powder packets, granules, wafers, cachets, suppositories, segregated multiples of any of the foregoing, and other forms as herein described.

The amount of active ingredient that is to be administered depends on the age, weight of the patient, the particular condition to be treated, the frequency of administration, and the route of administration. The dose range is from about 0.1 to about 30 mg. per kg. of body weight, preferably about 0.3 to about 10 mg. per kg. of body weight. The human dose ranges from about 5 to about 500 mg. daily given as a single dose or in 3 or 4 divided doses; preferably, the adult dose is from 25 to about 200 mg. Veterinary dosages will correspond to human dosages with amounts administered being in proportion to the weight of the animal as compared to adult humans.

The active ingredient is compounded with a suitable pharmaceutical diluent in unit dosage form, either alone or in combination with other active ingredients. The amount of such other active ingredients is to be determined with reference to the usual dosage of each such ingredient. Thus the novel compounds of the invention can be combined with other hypotensive agents such as α-methyldopa 100–250 mg.; with diuretics such as amino- Oxidation, 3, of the Formula VA 5-halo-4-phenoxypyrimidine with a percarboxylic acid to produce a Formula VIA 1,2-dihydro-1-hydroxy-5-halo-4-phenoxypyrimidine is carried out in the same manner described above for the percarboxylic acid oxidation of Formula IVA (where $R_6$ is hydrogen or lower alkyl) 4-phenoxypyrimidines to Formula VIA (where $R_6$ is hydrogen or lower alkyl) 1,2-dihydro-1-hydroxy-4-phenoxypyrimidines.

The reaction, 8, between a Formula VIIA 1,2-dihydro-1-hydroxy-5-halopyrimidine and a thiophenol of Formula XIV to produce a Formula XIA 1,2-dihydro-1-hydroxy-5-arylthiopyrimidine is advantageously carried out by heating a mixture of those two reactants in the presence of a strong base, preferably an alkali metal hydroxide such as sodium hydroxide or potassium hydroxide, in the range about 50° to about 200° C., preferably in the range about 75° to about 125° C., until the desired displacement of halogen takes place. For this displacement, it is preferred that the displaced halogen be bromine, i.e., that $R_7$ in Formula VIIA be bromine. It is also preferred that an excess of the Formula XIV thiophenol be used, preferably about 2 to about 10 or even more molecular equivalents of thiophenol per molecular equivalent of the pyrimidine reactant. It is also preferred that about one molecular equivalent of the strong base be used per molecular equivalent of the pyrimidine reactant. A reaction time of about 1 to about 10 hours is usually required in the preferred temperature range. It is usually advantageous to add a small amount of water, preferably about 5 to about 25 percent by weight of the base used, to aid in forming a homogeneous reaction mixture. An inert diluent of appropriate boiling point can also be added for that purpose.

The desired Formula XIA 1,2-dihydro-1-hydroxy-5-arylthiopyrimidine can be isolated from the reaction mixture by diluting said mixture with water containing enough alkali metal hydroxide to dissolve the excess thiophenol. The remaining desired product is usually a solid which can be separated by conventional methods, for example, by filtration, centrifugation, or extraction, and can usually be purified, if desired, by recrystallization from a suitable solvent or mixture of solvents.

The reaction, 7, between a Formula VIIA 1,2-dihydro-1-hydroxy-5-halopyrimidine and a primary or secondary amine of the Formula RH to produce a Formula XA, 1,2-dihydro-1-hydroxy-5-substituted-aminopyrimidine is advantageously carried out by heating a mixture of those two reactants in the range about 100° to about 150° C., preferably in the range about 105° to about 125° C. The reaction conditions and manipulations are otherwise similar to the above-described displacement of the phenoxy moiety of a Formula VIA 1,2-dihydro-1-hydroxy-4-phenoxypyrimidine with an amine of the Formula RH. At least one molecular equivalent of the displacing amine should be used. Preferably about 2 to about 10 molecular equivalents are used so that the excess amine acts as a diluent which results in a homogeneous reaction mixture. Although either the 5-bromo or 5-chloro substituent within the scope of Formula VIIA can be displaced with an amine, it is preferred that the displaced halogen be bromine.

Examples of suitable amines for this halogen displacement are those listed above as suitable for the phenoxy displacement. A closed reaction vessel is preferred when using those amines whose boiling point at atmospheric pressure is lower than the desired reaction temperature.

The desired Formula XA 1,2-dihydro-1-hydroxy-5-substituted-aminopyrimidine can be isolated from the reaction mixture by evaporating excess amine and diluent, if one is used, followed by treatment with dilute aqueous base to transform any amine salts to the free base form. The crude amine product is then purified by distillation at reduced pressure, recrystallization from a suitable solvent or mixture of solvents, or chromatography, or by a combination of those methods.

The 1,2-dihydro-1-hydroxypyrimidines of Formula IA are transformed to monoacid and diacid addition salts by neutralization with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula IA amine, the acid, and the acid addition salt. If the acid is soluble in water, the basic compound for Formula IA can be dissolved in water containing either one or two equivalent amounts of the acid, and thereafter, the water can be removed by evaporation. If the acid is soluble in a relatively non-polar solvent, for example, diethyl ether or diisopropyl ether, separate solutions of the acid and the basic Formula IA compound in such a solvent can be mixed in equivalent amounts, whereupon the acid addition salt will usually precipitate because of its relatively low solubility in the non-polar solvent. Alternatively, the basic Formula IA compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively lower polarity, for example, diethyl ether or hexane, will usually cause precipitation of the acid addition salt. Either monoacid or diacid salts can be formed by using one or two equivalents, respectively, of the acid. Similarly, the 1,2-dihydro-1-hydroxy-4-phenoxypyrimidines of Formula VIA are converted to their acid addition salts.

Acid addition salts of Formula IA and VIA pyrimidines can be transformed to other acid addition salts by a metathetical exchange of the original acid addition salt anion, e.g., the chloride ion, with another anion, for example, as described above with regard to the formation of penicillin salts.

The carboxyacylates of Formula IIA are produced by mixing a Formula IA 1,2-dihydro-1-hydroxyprimidine with the appropriate amount of a carboxyacylating agent, preferably in the presence of a diluent.

Although substantially any carboxyacylating agent can be used to produce these carboxyacylates, especially suitable are the anhydrides, mixed anhydrides, and acid chlorides of alkanoic, cycloalkanoic, alkenoic, cycloalkenoic, aralkanoic, aromatic, and heterocyclic carboxylic acids. These anhydrides and acid chlorides can also be substituted on any carbon but the carbonyl carbon with any of a wide variety of atomic or molecular moieties unreactive with the dihydropyrimidine reactants. Examples of such substituents are alkyl, e.g., methyl, butyl, decyl; alkoxy, e.g., methoxy, ethoxy, pentyloxy; alkylthio, e.g., methylthio, propylthio, heptylthio; dialkylamino, e.g., dimethylamino, diethylamino, dihexylamino; alkoxycarbonyl, e.g., methoxycarbonyl, propoxycarbonyl, nonoxycarbonyl; carboxyacyl, e.g., acetyl, butyryl; carboxamido, e.g., benzamido, acetamido; nitro; fluoro; cyano; and the like. Chlorine, bromine, and iodine can also be substituents on aromatic portions of the carboxyacylating agents.

Examples of suitable anhydrides are acetic anhydride, propionic anhydride, butyric anhydride, isobutyric anhydride, acrylic anhydride, crotonic anhydride, cyclohexanecarboxylic anhydride, benzoic anhydride, naphthoic anhydride, furoic anhydride, and the like, as well as the corresponding anhydrides substituted with one or more of the above-mentioned substituents. Examples of suitable acid chlorides are acetyl chloride, propionyl chloride, butyryl chloride, isobutyryl chloride, decanoyl chloride, acryloyl chloride, crotonoyl chloride, cyclohexanecarbonyl chloride, 3-cyclohexenecarbonyl chloride, phenylacetyl chloride, succinyl chloride, benzoyl chloride, naphphylline 100–200 mg., bendroflumethiazide 2.5–5 mg., hydrochlorothiazide 10–50 mg., trichlormethiazide 2–4 mg., triamterene 25–100 mg., ethoxozolamide 50–250 mg., amisometradine 200–400 mg., spironolactone 25–100 mg.; sympathetic blocking agents such as guanethidine sulfate 10–50 mg., bethanidine sulfate 5–20 mg.; ganglion-blocking agents such as pentolinium bitatrate 20–200 mg., mecamylamine hydrochloride 2.5–5 mg., hexamethonium chloride 125–250 mg., chlorisondamine chloride 25–100 mg.; peripheral vasodilators such as hydralazine 10–100 mg., beta-pyridyl carbinol 50–150 mg., mebutamate 100–300 mg.; reserpine type drugs such as reserpine 0.1–1 mg., alseroxylon 2–4 mg., syrosingopine 0.5–2 mg., deserpidine 0.1–1 mg.; tranquilizers such as meprobamate 200–400 mg., ectylurea 100–300 mg., chlordiazepoxide hydrochloride 5–20 mg., promazine hydrochloride 25–150 mg., diazepan 2–10 mg.; sedatives such as phenobarbital 8–60 mg., methyprylon 50–100 mg., amobarbital 20–40 mg., ethchlorvynol 100–200 mg.; muscle relaxants such as papaverine hydrochloride 20–10 mg., carisoprodol 200–400 mg., phenaglycodol 200–400 mg.

As has been stated above, reference to the A series compounds, namely, IIIA, IVA, VA, VIA, VIIA, VIIIA, IXA, XA and XIA, in the body of the specification is not to be construed as limiting. Rather, it is to be construed as inclusive of the B series of compounds, namely, IIIB, IVB, VB, VIB, VIIB, VIIIB, IXB, XB and XIB, in which the lower alkyl group $R_1$ is in the 2-position, rather than the 6-position.

The following examples illustrate the best mode contemplated by the inventors for carrying out their invention.

EXAMPLE 1.—1,2 - DIHYDRO - 1 - HYDROXY-2-IMINO-6-METHYL-4-PIPERIDINO-PYRIMIDINE

Part A.—2-amino-6-methyl-4-phenoxypyrimidine

A mixture of 28.6 g. (0.2 mole) of 2-amino-6-methyl-4-chloropyrimidine, 94 g. (1.0 mole) of phenol and 13.2 g. (0.2 mole) of solid 85% potassium hydroxide was heated at 95–100° C. for 2 hours and a solution of 60.0 g. of potassium hydroxide in 600 ml. of water was added with stirring. The thus-obtained mixture was cooled to room temperature and filtered. The solid was washed with water and recrystallized from 700 ml. of methanol to yield 31.5 g. (79% of theory) of 2-amino-6-methyl-4-phenoxypyrimidine; M.P. 192° to 194° C. [J. Org. Chem. 17, 1457 (1952) gives M.P. 194° to 195° C.]

U.V. (ethanol) 277 mμ ($\epsilon$=14,170); 280 mμ ($\epsilon$=6870). (0.01 N alc. $H_2SO_4$) sh. 220 mμ ($\epsilon$=16,450); 278 mμ ($\epsilon$=7480). (0.01 N alc. KOH) 227 mμ ($\epsilon$=14,170); 280 mμ ($\epsilon$=6870).

I.R. (principal bands; mineral oil mull) 3340, 3180, 1650, 1575, 1485, 1210, 1185, 790, 760, 680 cm.$^{-1}$.

Following the procedure of Example 1, Part A, but using in place of phenol, 2,4-dichlorophenol; p-chlorophenol; p-bromophenol; 2,4-dibromophenol; m-fluorophenol; 2,4,6-trichlorophenol, and the like, there are obtained 2-amino-6-methyl-4-(2,4-dichlorophenoxy)pyrimidine;
2-amino-6-methyl-4-(p-chlorophenoxy)pyrimidine;
2-amino-6-methyl-4-(p-bromophenoxy)pyrimidine;
2-amino-6-methyl-4-(2,4-dibromophenoxy)pyrimidine;
2-amino-6-methyl-4-(m-fluorophenoxy)pyrimidine;
2-amino-6-methyl-4-(2,4,6-trichlorophenoxy)pyrimidine;

and the like, respectively.

Similarly, substituting for example, 2-amino-6-ethyl-4-chloropyrimidine;
2-amino-6-propyl-4-chloropyrimidine;
2-amino-6-tert-butyl-4-chloropyrimidine;
2-amino-6-octyl-4-chloropyrimidine;
2-amino-5,6-dimethyl-4-chloropyrimidine;
2-amino-5-methyl-6-ethyl-4-chloropyrimidine;
2-amino-5-octyl-6-propyl-4-chloropyrimidine;
2-amino-5-tert-butyl-6-propyl-4-chloropyrimidine, and the like, for 2-amino-6-methyl-4-chloropyrimidine and following the procedure of Example 1, Part A, is productive of 2-amino-6-ethyl-4-phenoxypyrimidine;
2-amino-6-propyl-4-phenoxypyrimidine;
2-amino-6-tert-butyl-4-phenoxypyrimidine;
2-amino-6-octyl-4-phenoxypyrimidine;
2-amino-5,6-dimethyl-4-phenoxypyrimidine;
2-amino-5-methyl-6-ethyl-4-phenoxypyrimidine;
2-amino-5-octyl-6-propyl-4-phenoxypyrimidine;
2-amino-5-tert-butyl-6-propyl-4-phenoxypyrimidine;

and the like, respectively.

Also following the procedure of Example 1, Part A, but using in place of the combination of the 2-amino-6-methyl-4-chloropyrimidine and the phenol, each of the specific 2-amino-6-lower-alkyl-4-chloropyrimidines and 2-amino-5,6-di-lower-alkyl - 4 - chloropyrimidines mentioned above, and each of the specific halophenols mentioned above, there are obtained the corresponding 2-amino-6-lower-alkyl-4-phenoxypyrimidines, 2-amino-6-lower-alkyl - 4 - halophenoxypyrimidines, 2-amino-5,6-di-lower-alkyl-4-phenoxypyrimidines and 2-amino - 5,6 - di-lower-alkyl-4-halophenoxypyrimidines.

Part B.—1,2-dihydro-1-hydroxy-2-imino-6-methyl-4-phenoxypyrimidine

A solution of 14.2 g. (0.66 mole) of 2-amino-6-methyl-4-phenoxypyrimidine and 0.14 mole of peracetic acid in 150 ml. of acetic acid was heated at 58° C. for 20 hours. The thus-obtained solution was concentrated to a syrup at 58° C. under reduced pressure, dissolved in water, followed by pH adjustment to 9 and filtering. The thus-obtained solid was heated in 5% ethanol and filtered, the filtrate was cooled to 5° C., and kept at that temperature for about 12 hours and filtered to yield 4.0 g. (28% of theory) of 1,2-dihydro-1-hydroxy-2-imino-6-methyl-4-phenoxypyrimidine as the hydrate. After drying over phosphorous pentoxide 1,2-dihydro - 1 - hydroxy-2-imino-6-methyl-4-phenoxypyrimidine was obtained; M.P. 190°–193° C.

Analysis.—Calcd. for $C_{11}H_{11}N_3O_2$: C, 60.81; H, 5.10; N, 19.34; O, 14.73. Found: C, 60.49; H, 5.21; N, 18.79; O, 15.63.

U.V. (ethanol) sl. sh. 220 mμ ($\epsilon$=17,790); 255 mμ ($\epsilon$=7590); 316 mμ ($\epsilon$=7280). (0.01 N alc. $H_2SO_4$) sh. 223 mμ ($\epsilon$=14,320); sh. 262 mμ ($\epsilon$=4040); 285 mμ ($\epsilon$=6070); sh. 318 mμ ($\epsilon$=1903). (0.01 N alc. KOH) 265 mμ ($\epsilon$=7900); 316 mμ ($\epsilon$=6870).

I.R. (principal bands; mineral oil mull) 3360, 3040, 1660, 1650, 1600, 1585, 1560, 1490 cm.$^{-1}$.

Following the procedure of Example 1, Part B, but using in place of peracetic acid, in separate experiments, m-chloroperbenzoic acid; perbenzoic acid; perphthalic acid; 2,4-dichloroperbenzoic acid; p-methylperbenzoic acid; m-nitroperbenzoic acid; and p-methoxyperbenzoic acid, the same product, 1,2-dihydro-1-hydroxy-2-imino-6-methyl-4-phenoxypyrimidine, is obtained.

Similarly, substituting for example, 2-amino-6-ethyl-4-phenoxypyrimidine;
2-amino-6-propyl-4-phenoxypyrimidine;
2-amino-6-tert-butyl-4-phenoxypyrimidine;
2-amino-6-octyl-4-phenoxypyrimidine;
2-amino-5,6-dimethyl-4-phenoxypyrimidine;
2-amino-5-methyl-6-ethyl-4-phenoxypyrimidine;
2-amino-5-octyl-6-propyl-4-phenoxypyrimidine;
2-amino-5-tert-butyl-6-propyl-4-phenoxypyrimidine;

and the like, for 2-amino-6-methyl-4-phenoxypyrimidine, and following the procedure of Example 1, Part B, is productive of 1,2-dihydro-1-hydroxy-2-imino-6-ethyl-4-phenoxypyrimidine,
1,2-dihydro-1-hydroxy-2-imino-6-propyl-4-phenoxypyrimidine,
1,2-dihydro-1-hydroxy-2-imino-6-tert-butyl-4-phenoxypyrimidine,
1,2-dihydro-1-hydroxy-2-imino-6-octyl-4-phenoxypyrimidine,
1,2-dihydro-1-hydroxy-2-imino-5,6-dimethyl-4-phenoxypyrimidine,
1,2-dihydro-1-hydroxy-2-imino-5-methyl-6-ethyl-4-phenoxypyrimidine,
1,2-dihydro-1-hydroxy-2-imino-5-octyl-6-propyl-4-phenoxypyrimidine,
1,2-dihydro-1-hydroxy-2-imino-5-tert-butyl-6-propyl-4-phenoxypyrimidine, and the like, respectively.

Also following the procedure of Example 1, Part B, but using in place of 2-amino-6-methyl-4-phenoxypyrimidine, each of the other 2-amino-6-lower-alkyl-4-phenoxypyrimidines, 2-amino-6-lower-4-halophenoxypyrimidines, 2-amino-5,6-di-lower-alkyl - 4 - phenoxypyrimidines, and 2-amino - 5,6 - di-lower-alkyl-4-halophenoxypyrimidines, there are obtained the corresponding 1,2-dihydro-1-hydroxy-2-imino-6-lower-alkyl - 4 - phenoxypyrimidines, 1,2-dihydro-1-hydroxy-2-imino - 6 - lower - alkyl-4-halophenoxypyrimidines, 1,2-dihydro-1-hydroxy - 5,6 - di-lower-alkyl-4-phenoxypyrimidines and 1,2-dihydro-1-hydroxy-5,6-di-lower-alkyl-4-halophenoxypyrimidines.

Part C.—1,2-dihydro-1-hydroxy-2-imino-6-methyl-4-piperidinopyrimidine

A mixture of 20 ml. of piperidine, 0.96 g. (0.0046 mole) of sodium and 0.005 g. (0.00002 mole) of ferric chloride was stirred until solution was complete and 1.0 g. (0.0046 mole) of 1,2-dihydro-1-hydroxy-2-imino-6-methyl-4-phenoxypyrimidine was added. This mixture was slowly heated to reflux over 1.5 hours, maintained at reflux for 2 hours, 1 ml. of ethanol was added and the mixture was cooled and filtered, concentrated to dryness, the residue chromatographed on two 19 x 19/1 mm. plates of silica-gypsum using a 50% ethyl acetate-methanol mixture. The solids in the middle chromatographic zone were removed and continuously extracted with chloroform. The chloroform solution was concentrated to dryness at 60° C. to yield 0.7 g. of material, which after recrystallization from acetonitrile yielded 0.4 g. (41% of theory) of 1,2-dihydro-1-hydroxy-2-imino-6-methyl-4-piperidinopyrimidine.

Analysis.—Calcd. for $C_{10}H_{16}N_4O$: C, 57.67; H, 7.75; N, 26.90; O, 7.68. Found: C, 58.10; H, 7.32; N, 26.19; O, 6.98.

U.V. (water) 211 m$\mu$ ($\epsilon$=26,250); 264 m$\mu$ ($\epsilon$=13,740); 391 m$\mu$ ($\epsilon$=10,480). (0.01 N $H_2SO_4$) 211 m$\mu$ ($\epsilon$=21,880); sh. 240 m$\mu$ ($\epsilon$=10,880); 250 m$\mu$ ($\epsilon$=12,070); 286 m$\mu$ ($\epsilon$=11,960). (0.01 N KOH) 211 m$\mu$ ($\epsilon$=25,600); 264 m$\mu$ ($\epsilon$=13,780); 319 m$\mu$ ($\epsilon$=10,600).

I.R. (principal bands; mineral oil mull) 3370, 3240, 3040, 1640, 1630, 1615, 1525, 1435, 1250, 1175, 1105, 1080 cm.$^{-1}$.

Following the procedure of Example 1, Part C, but using in place of the piperidine, dimethylamine; diethylamine; dibutylamine; N-methylbutylamine; N-ethylhexylamine; butylamine; octylamine; diallylamine; dicrotylamine; di-(2-hexenyl)amine; N-methylallylamine; allylamine; 2-octenylamine; dibenzylamine; diphenethylamine; N-methylbenzylamine; N-ethyl-(1-naphthylmethyl)amine; benzylamine; 3-phenylpropylamine; cyclohexylamine; dicyclohexylamine; cyclobutylamine; N-methyl-(4-tert-butylcyclohexyl)amine; azetidine; pyrrolidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and N-methylpiperazine, there are obtained 1,2-dihydro-1-hydroxy-2-imino-6-methyl-4-dimethylaminopyrimidine;
1,2-dihydro-1-hydroxy-2-imino-6-methyl-4-diethylaminopyrimidine;
1,2-dihydro-1-hydroxy-2-imino-6-methyl-4-dibutylaminopyrimidine;
1,2-dihydro-1-hydroxy-2-imino-6-methyl-4-(N-methylbutylamino)pyrimidine;
1,2-dihydro-1-hydroxy-2-imino-6-methyl-4-(N-ethylhexylamino)pyrimidine;
1,2-dihydro-1-hydroxy-2-imino-6-methyl-4-butylaminopyrimidine;
1,2-dihydro-1-hydroxy-2-imino-6-methyl-4-octylaminopyrimidine;
1,2-dihydro-1-hydroxy-2-imino-6-methyl-4-diallylaminopyrimidine;
1,2-dihydro-1-hydroxy-2-imino-6-methyl-4-dicrotylaminopyrimidine;
1,2-dihydro-1-hydroxy-2-imino-6-methyl-4-[di-(2-hexenyl)amino]pyrimidine;
1,2-dihydro-1-hydroxy-2-imino-6-methyl-4-(N-methylallylamino)pyrimidine;
1,2-dihydro-1-hydroxy-2-imino-6-methyl-4-allylaminopyrimidine;
1,2-dihydro-1-hydroxy-2-imino-6-methyl-4-(2-octenylamino)pyrimidine;
1,2-dihydro-1-hydroxy-2-imino-6-methyl-4-dibenzylaminopyrimidine;
1,2-dihydro-1-hydroxy-2-imino-6-methyl-4-diphenethylaminopyrimidine;
1,2-dihydro-1-hydroxy-2-imino-6-methyl-4-(N-methylbenzylamino)pyrimidine;
1,2-dihydro-1-hydroxy-2-imino-6-methyl-4-[N-ethyl-(1-napthylmethyl)amino]pyrimidine;
1,2-dihydro-1-hydroxy-2-imino-6-methyl-4-benzylaminopyrimidine;
1,2-dihydro-1-hydroxy-2-imino-6-methyl-4-(3-phenylpropylamino)pyrimidine;
1,2-dihydro-1-hydroxy-2-imino-6-methyl-4-cyclohexylaminopyrimidine;
1,2-dihydro-1-hydroxy-2-imino-6-methyl-4-dicyclohexylaminopyrimidine;
1,2-dihydro-1-hydroxy-2-imino-6-methyl-4-cyclobutylaminopyrimidine;
1,2-dihydro-1-hydroxy-2-imino-6-methyl-4-[N-methyl-4-tertbutylcyclohexyl)amino]pyrimidine;
1,2-dihydro-1-hydroxy-2-imino-6-methyl-4-(1-azetidinyl)pyrimidine;
1,2-dihydro-1-hydroxy-2-imino-6-methyl-4-(1-pyrrolidinyl)pyrimidine;
1,2-dihydro-1-hydroxy-2-imino-6-methyl-4-[1-(2-methylpyrrolidinyl)]pyrimidine;
1,2-dihydro-1-hydroxy-2-imino-6-methyl-4-[1-3-ethylpyrrolidinyl)]pyrimidine;
1,2-dihydro-1-hydroxy-2-imino-6-methyl-4-[1-(2,5-dimethylpyrrolidinyl)]pyrimidine;
1,2-dihydro-1-hydroxy-2-imino-6-methyl-4-(2-methyl-5-ethylpiperidino)pyrimidine;
1,2-dihydro-1-hydroxy-2-imino-6-methyl-4-(3-isopropylpiperidino)pyrimidine;
1,2-dihydro-1-hydroxy-2-imino-6-methyl-4-(2,4,6-trimethylpiperidino)pyrimidine;
1,2-dihydro-1-hydroxy-2-imino-6-methyl-4-(1-hexahydroazepinyl)pyrimidine;
1,2-dihydro-1-hydroxy-2-imino-6-methyl-4-[1-(4-tert-butylhexahydroazepinyl)]pyrimidine;
1,2-dihydro-1-hydroxy-2-imino-6-methyl-4-heptamethyleniminopyrimidine;
1,2-dihydro-1-hydroxy-2-imino-6-methyl-4-octamethyleniminopyrimidine;
1,2-dihydro-1-hydroxy-2-imino-6-methyl-4-morpholinopyrimidine;

1,2-dihydro-1-hydroxy-2-imino-6-methyl-4-(2-ethyl-morpholino)pyrimidine; and
1,2-dihydro-1-hydroxy-2-imino-6-methyl-4-(4-methyl-1-piperazinyl)pyrimidine, respectively.

Also following the procedure of Example 1, Part C, but using in place of the piperidine, each of the primary and secondary amines corresponding to each of the specific examples of

and heterocyclic moieties within the scope of R as defined above, there are obtained the corresponding 1,2-dihydro-1-hydroxy-2-imino-6-methylpyrimidines, substituted at the 4-position with a mono-substituted or di-substituted, including heterocyclic, amino moiety.

Also following the procedure of Example 1, Part C, but using in place of 1,2-dihydro-1-hydroxy-2-imino-6-methyl-4-phenoxypyrimidine, 1,2-dihydro-1-hydroxy-2-imino-6-ethyl-4-phenoxypyrimidine;
1,2-dihydro-1-hydroxy-2-imino-6-propyl-4-phenoxypyrimidine;
1,2-dihydro-1-hydroxy-2-imino-6-tert-butyl-4-phenoxypyrimidine;
1,2-dihydro-1-hydroxy-2-imino-6-octyl-4-phenoxypyrimidine;
1,2-dihydro-1-hydroxy-2-imino-5,6-dimethyl-4-phenoxypyrimidine;
1,2-dihydro-1-hydroxy-2-imino-5-methyl-6-ethyl-4-phenoxypyrimidine;
1,2-dihydro-1-hydroxy-2-imino-5-octyl-6-propyl-4-phenoxypyrimidine;
1,2-dihydro-1-hydroxy-2-imino-5-tert-butyl-6-propyl-4-phenoxypyrimidine;

and the like, there are obtained 1,2-dihydro-1-hydroxy-2-imino-6-ethyl-4-piperidinopyrimidine;
1,2-dihydro-1-hydroxy-2-imino-6-propyl-4-piperidinopyrimidine;
1,2-dihydro-1-hydroxy-2-imino-6-tert-butyl-4-piperidinopyrimidine;
1,2-dihydro-1-hydroxy-2-imino-6-octyl-4-piperidinopyrimidine;
1,2-dihydro-1-hydroxy-2-imino-5,6-dimethyl-4-piperidinopyrimidine;
1,2-dihydro-1-hydroxy-2-imino-5-methyl-6-ethyl-4-piperidinopyrimidine;
1,2-dihydro-1-hydroxy-2-imino-5-octyl-6-propyl-4-piperidinopyrimidine;
1,2-dihydro-1-hydroxy-2-imino-5-tert-butyl-6-propyl-4-piperidinopyrimidine;

and the like, respectively.

Also following the procedure of Example 1, Part C, but using in place of the combination of 1,2-dihydro-1-hydroxy-2-imino-6-methyl-4-phenoxypyrimidine and piperidine, each of the above-mentioned 1,2-dihydro-1-hydroxy-2-imino-6-lower-alkyl-4-phenoxypyrimidines, 1,2-dihydro-1-hydroxy-2-imino-6-lower-alkyl - 4 - halophenoxypyrimidines, 1,2-dihydro-1-hydroxy-2-imino-5,6-di-lower-alkyl-4-phenoxypyrimidines, and 1,2-dihydro-1-hydroxy-2-imino-5,6-di-lower - alkyl-4-halophenoxypyrimidines, and each of the above-mentioned primary and secondary amines, there are obtained the corresponding 1,2-dihydro-1-hydroxy-2-imino-6-lower-alkylpyrimidines and 1,2-dihydro - 1 - hydroxy - 2 - imino-5,6-di-lower-alkylpyrimidines wherein the 4-phenoxy or 4-halophenoxy substituent has been replaced with a mono-substituted or di-substituted, including heterocyclic, amino moiety.

EXAMPLE 2.—1,2-DIHYDRO-1-HYDROXY-2-IMINO-6-METHYL-4-PIPERIDINOPYRIMIDINE

Part A (1).—2-amino-6-methyl-4-(2,4-dichlorophenoxy)pyrimidine 57.2 g. (0.4 mole) of 2-amino-6-methyl-4-chloropyrimidine was added to a stirred mixture of 26.4 g. (0.4 mole) of 85% potassium hydroxide and 326 g. (2.0 moles) of 2,4-dichlorophenol at 50° C. The reaction mixture was stirred at 90–100° C. for 2.5 hours, diluted with a solution of 120 g. of potassium hydroxide and 1000 ml. of water, cooled to room temperature and filtered. The solid thus-obtained was washed with water, extracted with 3000 ml. of methanol, and slurried 1 hr. in 1000 ml. of water to yield 76.0 g. (54.4% of theory) of 2-amino-6-methyl-4-(2,4-dichlorophenoxy)pyrimidine; M.P. 195°–196° C.

Analysis.—Calcd. for $C_{11}H_9Cl_2N_3O$: C, 48.91; H, 3.36; Cl, 26.25; N, 15.55; O, 5.92. Found: C, 49.21; H, 3.34; Cl, 26.81; N, 15.05; O, 5.05.

U.V. (ethanol) 223 m$\mu$ ($\epsilon$=20,650); sh. 276 m$\mu$ ($\epsilon$=7380); 281 m$\mu$ ($\epsilon$=7710). (0.01 N $H_2SO_4$) 219 m$\mu$ ($\epsilon$=25,980); 276 m$\mu$ ($\epsilon$=7765); 283 m$\mu$ ($\epsilon$=8440). (0.01 N KOH) 224 m$\mu$ ($\epsilon$=19,830); sh. 275 m$\mu$ ($\epsilon$=6580); 281 m$\mu$ ($\epsilon$=7730).

I.R. (principal bands; mineral oil mull) 3476, 3288, 3135, 1650, 1595, 1570, 1500, 1254, 1230, 1170, 1095, 1055, 856, 818, 793 cm.$^{-1}$.

Part A (2).—2-amino-6-methyl-4-(2,4-dichlorophenoxy)pyrimidine

A mixture of 225 g. (1.57 moles) of 2-amino-6-methyl-4-chloropyrimidine, 489 g. (3.0 moles) of 2,4-dichlorophenol, 500 ml. of dimethylformamide and 105 g. (1.57 moles) of 85% potassium hydroxide was heated at 90°–100° C. for 3 hours. The reaction mixture was poured into a solution of 105 g. of potassium hydroxide and 2000 ml. of water, stirred for 1 hour and filtered. The thus-obtained solid was washed thoroughly with water, extracted with 4000 ml. of ethanol, filtered and dried to yield 265.1 g. (67% of theory) of 2-amino-6-methyl-4-(2,4-dichlorophenoxy)pyrimidine; M.P. 195°–196° C.

Part B. (1).—1,2-dihydro-1-hydroxy-2-amino-6-methyl-4-(2,4-dichlorophenoxy)pyrimidine A solution of 27 g. (0.1 mole) of 2-amino-6-methyl-4-(2,4-dichlorophenoxy)pyrimidine and 0.1 mole of peracetic acid in 100 ml. of acetic acid was heated at 60° C. for 20 hours. The reaction mixture was filtered and the filtrate was concentrated to a syrup, which was shaken with water and filtered. The thus-obtained solid was washed with water and recrystallized from 2000 ml. of 50% ethanol to give 17.2 g. (60% of theory) of 1,2-dihydro-1-hydroxy-2-imino-6-methyl-4-(2,4 - dichlorophenoxy)pyrimidine; M.P. slight darkening at 185° C., melted with decomposition at 207°–208.5° C. Recrystallization from acetonitrile raised the M.P. to 216°–218° C.

Analysis.—Calcd. for $C_{11}H_9Cl_2N_3O_2$: C, 46.34; H, 3.18; Cl, 24.87; N, 14.74. Found: C, 47.59; H, 3.59; Cl, 25.88; N, 14.08.

U.V. (ethanol) 257.5 m$\mu$ ($\epsilon$=7335); 281 m$\mu$ ($\epsilon$=2920); 315 m$\mu$ ($\epsilon$=6130). (0.01 N. alc. $H_2SO_4$) f. 274 m$\mu$ ($\epsilon$=5530); 282 m$\mu$ ($\epsilon$=6520); f. 292 m$\mu$ ($\epsilon$=5840). (0.01 N KOH) 256 m$\mu$ ($\epsilon$=7840); 281 m$\mu$ ($\epsilon$=3160); 316 m$\mu$ ($\epsilon$=6820).

I.R. (principal bands; mineral oil mull) 3330, 3080, 1631, 1600, 1568, 1259, 1230, 1187, 1185, 1060, 855, 815 cm.$^{-1}$.

Part B (2).—1,2-dihydro-1-hydroxy-2-imino-6-methyl-4-(2,4-dichlorophenoxy)pyrimidine A mixture of 28.0 g. (0.1 mole) of 2-amino-6-methyl-4-(2,4-dichlorophenoxy)pyrimidine, 600 ml. of acetone and 100 ml. of ethanol was cooled to 0° C. and 34.4 g. (0.2 mole) of m-chloroperbenzoic acid was added over a 15-minute interval. The entire mixture was stirred for 4 hours and poured into a solution of 1 equivalent of potassium hydroxide and 1500 ml. of water, refrigerated overnight and filtered. The thus-obtained solid was refluxed in 1500 ml. of acetonitrile, allowed to cool and filtered to yield 17.9 g. (64% of theory) of 1,2-dihydro-1-hydroxy - 2 - imino - 6 - methyl - 4 - (2,4 - dichlorophenoxy)pyrimidine; m.p. 216°–218° C.

Part C.—1,2-dihydro-1-hydroxy-2-imino-6-methyl-4-piperidinopyrimidine

A solution of 8.5 g. (0.029 mole) of 1,2-dihydro-1-hydroxy - 2 - imino - 6 - methyl - 4 - (2,4 - dichlorophenoxy)pyrimidine and 35 ml. of piperidine was heated to 145° C. over 1 hour and held at that temperature for an additional 4 hours. The reaction mixture was slowly cooled to room temperature, and filtered to yield 4.1 g. of material, which was recrystallized from 400 ml. of acetonitrile to give 3.7 g. (61% of theory) of 1,2-dihydro-1 - hydroxy - 2 - imino - 6 - methyl - 4 - piperidinopyrimidine; m.p. 260°–261° C.

*Analysis.*—Calcd. for $C_{10}H_{16}N_4O$: C, 57.67; H, 7.75; N, 26.90; O, 7.68. Found: C, 57.93; H, 7.47; N, 26.35; O, 6.98.

U.V. (ethanol) 213 m$\mu$ ($\epsilon$=27,650); 267 m$\mu$ ($\epsilon$=14,460); 322 m$\mu$ ($\epsilon$=22,570); sh. 240 m$\mu$ ($\epsilon$=11,660); 251 m$\mu$ ($\epsilon$=12,600); 288 m$\mu$ ($\epsilon$=11,980). (0.01 N KOH) f. 217 m$\mu$ ($\epsilon$=23,350); 267 m$\mu$ ($\epsilon$=14,370); 323 m$\mu$ ($\epsilon$=10,880).

I.R. (principal bands; mineral oil mull) 3370, 3240, 3040, 1640, 1630, 1615, 1525, 1435, 1250, 1175, 1105, 1080, cm.$^{-1}$.

EXAMPLE 3. — 1,2 - DIHYDRO - 1 - HYDROXY - 2 - IMINO - 6 - METHYL - 4 - (1 - PYRROLIDINYL) PYRIMIDINE

A mixture of 8.5 g. (0.03 mole) of 1,2-dihydro-1-hydroxy - 2 - imino - 6 - methyl - 4 - (2,4 - dichlorophenoxy)pyrimidine and 35 ml. of piperidine was heated to 85° C. over a 30-minute period. The reaction mixture was allowed to cool to room temperature and filtered. The solid was washed with pyrrolidine and recrystallized from 200 ml. of acetonitrile to yield 2.4 g. (41% of theory) of 1,2 - dihydro - 1 - hydroxy - 2 - imino - 6 - methyl - 4 - (1-pyrrolidinyl)pyrimidine; m.p. 271°–273° C.

*Analysis.*—Calcd. for $C_9H_{14}N_4O$: C, 55.65; H, 7.26; N, 28.84. Found: C, 55.27; H, 7.19; N, 28.07.

U.V. (ethanol) 213 m$\mu$ ($\epsilon$=27,900); 264 m$\mu$ ($\epsilon$=14,550); 321 m$\mu$ ($\epsilon$=11,150). (0.01 N $H_2SO_4$) 213 m$\mu$ ($\epsilon$=24,150); 227 m$\mu$ ($\epsilon$=11,750); 249 m$\mu$ ($\epsilon$=12,050); 287 m$\mu$ ($\epsilon$=12,100). (0.01 N KOH) 264 m$\mu$ ($\epsilon$=15,100); 321 m$\mu$ ($\epsilon$=11,550).

I.R. (principal bands; mineral oil mull) 3360, 2720, 2600, 1645, 1610, 1555 cm.$^{-1}$.

EXAMPLE 4. — 1,2 - DIHYDRO - 1 - HYDROXY - 2 - IMINO - 6 - METHYL - 4 - MORPHOLINOPYRIMIDINE

A solution of 5.0 g. (0.017 mole) of 1,2-dihydro-1-hydroxy - 2 - imino - 6 - methyl - 4 - (2,4 - dichlorophenoxy)pyrimidine and 25 ml. of morpholine was heated in an oil bath, under pressure, at 165° C. for 3 hours. The reaction mixture was allowed to cool slowly to 25° C. and filtered. The thus-obtained solid was washed successively with morpholine and ether, and dried to yield 3.0 g. (44% of theory) of 1,2-dihydro-1-hydroxy-2-imino-6-methyl-4-morpholinopyrimidine; m.p., blackened at 255° C., melted at 261° C., decomposed with foaming at 264°–267° C.

*Analysis.*—Calcd. for $C_9H_{14}N_4O_2$: C, 51.41; H, 6.71; N, 25.16; O, 15.22. Found: C, 51.38; H, 6.73; N, 24.69; O, 14.83.

U.V. (ethanol) 213 m$\mu$ ($\epsilon$=25,450); 265 m$\mu$ ($\epsilon$=11,800); 322 m$\mu$ ($\epsilon$=9,800). (0.01 N $H_2SO_4$) 215 m$\mu$ ($\epsilon$=20,450; 251 m$\mu$ ($\epsilon$=10,300); 289 m$\mu$ ($\epsilon$=11,000). (0.01 N KOH) 265 m$\mu$ ($\epsilon$=11,850); 322 m$\mu$ ($\epsilon$=9,950).

I.R. (principal bands; mineral oil mull) 3360, 1650, 1600, 1545, 1230, 1170, 1115, 1075, 1030 cm.$^{-1}$.

EXAMPLE 5. — 1,2 - DIHYDRO - 1 - HYDROXY - 2 - IMINO - 6 - METHYL - 4 - [1 - (4 - METHYL-PIPERAZINYL)]PYRIMIDINE

A solution of 5.0 g. (0.017 mole) of 1,2-dihydro-1-hydroxy - 2 - imino - 6 - methyl - 4 - (2,4 - dichlorophenoxy)pyrimidine and 25 ml. of N-methylpiperazine was heated in a glass bomb at an oil bath temperature of 180° C. (internal temperature=140° C.) for 3 hours. The clear solution obtained was concentrated to dryness, shaken twice with 75 ml. of ether, decanted, and the residue recrystallized from 75 ml. of acetonitrile to yield 1.4 g. of material containing the 2,4-dichlorophenol salt of 1,2 - dihydro - 1 - hydroxy - 2 - imino - 6 - methyl - 4 - [1 - (4 - methylpiperazinyl)]pyrimidine. Concentration of the ether solution yielded an additional 0.9 g. of material containing the 2,4-dichlorophenol salt which was combined with the 1.4 g. previously obtained. The combined material was recrystallized twice from acetonitrile to yield 1.4 g. of the 2,4-dichlorophenol salt of 1,2-dihydro - 1 - hydroxy - 2 - imino - 6 - methyl - 4 - [1 - (4-methylpiperazinyl)]pyrimidine; m.p. 151°–152° C.

*Analysis.*—Calcd. for $C_{16}H_{21}Cl_2N_5O_2$: C, 49.74; H, 5.48; N, 18.13. Found: C, 49.37; H, 5.75; N, 18.04.

The salt was stirred in sodium hydroxide solution and adjusted to pH 6 with acetic acid, allowed to stand and decanted. The solution was made alkaline and extracted with chloroform. The chloroform solution was dried over sodium sulfate and concentrated to dryness. The residue was recrystallized from acetonitrile to yield 0.3 g. of 1,2 - dihydro - 1 - hydroxy - 2 - imino - 6 - methyl - 4 - [1-(4-methylpiperazinyl)]pyrimidine; m.p. 212°–213° C.

*Analysis.*—Calcd. for $C_{10}H_{17}N_5O$: C, 53.79; H, 7.68; O, 7.16. Found: C, 53.38; H, 7.95; O, 6.86.

U.V. (ethanol) 212.5 m$\mu$ ($\epsilon$=28,150); 265 m$\mu$ ($\epsilon$=13,300); 321 m$\mu$ ($\epsilon$=10,950). (0.01 N $H_2SO_4$) 214 m$\mu$ ($\epsilon$=25,450); 247 m$\mu$ ($\epsilon$=12,750); 286 m$\mu$ ($\epsilon$=11,900); sl. sh. 297 m$\mu$ ($\epsilon$=9150); (0.01 N KOH) 214 m$\mu$ ($\epsilon$=29,400); 265 m$\mu$ ($\epsilon$=14,450); 322 m$\mu$ ($\epsilon$=11,850).

I.R. (principal bands; mineral oil mull) 3660, 3340, 3140, 2790, 2750, 1670, 1635, 1610, 1545, 1495, 1230, 1175, 1140, 1005 cm.$^{-1}$.

EXAMPLE 6. — 1,2 - DIHYDRO - 1 - HYDROXY - 2 - IMINO - 6 - METHYL - 4 - (1 - HEXAHYDRO-AZEPINYL)PYRIMIDINE

A solution of 7.0 g. (0.026 mole) of 1,2-dihydro-1-hydroxy - 2 - imino - 6 - methyl - 4 - (2,4 - dichlorophenoxy)pyrimidine and 50 ml. of hexamethylenimine was heated in a closed vessel at an oil bath temperature of 170° C. After 3.5 hours the solution was cooled and concentrated to dryness under reduced pressure. The residue was shaken with a solution of 1.0 g. of sodium hydroxide and 50 ml. of water and extracted 4 times with 250-ml. portions of chloroform. The combined chloroform extracts were dried over sodium sulfate and concentrated to dryness. The residue was recrystallized from 400 ml. of acetonitrile to yield 2.2 g. (38% of theory) of 1,2-dihydro-1-hydroxy-2-imino-6-methyl-4-(1-hexahydroazepinyl)pyrimidine; M.P. 208°–210° C.

*Analysis.*—Calcd. for $C_{11}H_{18}N_4O$: C, 59.43; H, 8.16; N. 25.21. Found: C, 59.13; H, 8.49; N, 25.47.

U.V. (ethanol) 212.5 m$\mu$ ($\epsilon$=27,000); 265 m$\mu$ ($\epsilon$=13,100); 321 m$\mu$ ($\epsilon$=10,150). (0.01 N $H_2SO_4$) 213 m$\mu$ ($\epsilon$=22,100); 249 m$\mu$ ($\epsilon$=10,550); 289 m$\mu$ ($\epsilon$=11,150). (0.01 N KOH) 214 m$\mu$ ($\epsilon$=26,100); 265 m$\mu$ ($\epsilon$=13,200); 320 m$\mu$ ($\epsilon$=10,150).

I.R. (principal bands; mineral oil mull) 3350, 1670, 1635, 1610, 1545, 1500, 1200, 1180, 1170 cm.$^{-1}$.

EXAMPLE 7. — 1,2 - DIHYDRO - 1 - HYDROXY - 2-IMINO - 6 - METHYL - 4 - DIMETHYL - AMINO-PYRIMIDINE

A solution of 5.0 g. (0.017 mole) of 1,2-dihydro-1-hydroxy - 2 - imino - 6 - methyl - 4 - (2,4 - dichlorophenoxy)pyrimidine and 35 ml. of dimethylamine was magnetically stirred in a glass bomb. The reaction mixture was heated in an oil bath at 135° C. for 1 hour, then at 165° C. for 1 hour, allowed to cool to 25° C., held in an ice bath until crystallization occurred and filtered. The solid was washed with ether and dried to yield 1.7 g. (60% of theory) of 1,2-dihydro-1-hydroxy-2-imino-6-methyl-4-dimethyl-aminopyrimidine; M.P. 228°–229° C.

*Analysis.*—Calcd. for $C_7H_{12}N_4O$: C, 49.98; H, 7.19; N, 33.31. Found: C, 50.28; H, 7.27; N, 32.54.

U.V. (ethanol) 212 m$\mu$ ($\epsilon$=29,250); 263 m$\mu$ ($\epsilon$=13,050); 321 m$\mu$ ($\epsilon$=9,950). (0.01 N $H_2SO_4$) 212 m$\mu$ ($\epsilon$=23,850); sh. 235 m$\mu$ ($\epsilon$=11,100); 246 m$\mu$ ($\epsilon$=11,000); 286 m$\mu$ ($\epsilon$=10,600). (0.01 N KOH) 263 m$\mu$ ($\epsilon$=13,100); 301 m$\mu$ ($\epsilon$=10,000).

I.R. (principal bands; mineral oil mull) 3360, 1670, 1625, 1545, 1515, 1245, 1125, 1170, 1075 cm.$^{-1}$.

EXAMPLE 8. — 1,2 - DIHYDRO - 1 - HYDROXY - 2-IMINO - 6 - METHYL - 4 - ALLYLAMINO-PYRIMIDINE

A solution of 5.0 g. (0.017 mole) of 1,2-dihydro-1-hydroxy - 2 - imino - 6 - methyl - 4 - (2,4 - dichlorophenoxy)pyrimidine and 25 ml. of allylamine was sealed in a glass bomb and heated in an oil bath at 165° C. for 3 hours. The reaction mixture was allowed to cool to 25° C. and filtered. Following successively washing the solid with allylamine and ether there was obtained 2.5 g. (83% of theory) of 1,2-dihydro-1-hydroxy-2-imino-6-methyl-4-allylamino-pyrimidine; M.P., darkens at 249°–250° C., melts (dec.) at 252°–255° C.

*Analysis.*—Calcd. for $C_8H_{12}N_4O$: C, 53.31; H, 6.71; N, 31.09. Found: C, 53.16; H, 6.63; N, 30.66.

U.V. (ethanol) 210 m$\mu$ ($\epsilon$=27,600); 262 m$\mu$ ($\epsilon$=10,700); 314 m$\mu$ ($\epsilon$=8,100). (0.01 N $H_2SO_4$) 212 m$\mu$ ($\epsilon$=24,700); 242 m$\mu$ ($\epsilon$=13,800); 279 m$\mu$ ($\epsilon$=10,100). (0.01 N KOH) 262 m$\mu$ ($\epsilon$=11,950); 315 m$\mu$ ($\epsilon$=9,000).

I.R. (principal bands; mineral oil mull) 3430, 3360, 1640, 1580, 1505, 1220, 1180, 1080, 1055 cm.$^{-1}$.

EXAMPLE 9. — 1,2 - DIHYDRO - 1 - HYDROXY - 2-IMINO - 6 - METHYL - 4 - BENZYL - AMINOPYRIMIDINE

A solution of 5.0 g. (0.017 mole) of 1,2-dihydro-1-hydroxy - 2 - imino - 6 - methyl - 4 - (2,4 - dichlorophenoxy)pyrimidine and 35 ml. of benzylamine was heated at 180° C. for 4 hours, cooled, filtered and recrystallized from acetonitrile to yield 3.0 g. (77% of theory) of 1,2-dihydro-1-hydroxy - 2 - imino-6-methyl-4-benzyl-amino-pyrimidine; M.P. 227°–229° C.

*Analysis.*—Calcd. for $C_{12}H_{14}N_4O$: C, 62.59; H, 6.13; N, 24.33. Found: C, 62.38; H, 6.17; N, 24.62.

U.V. (ethanol) 211 m$\mu$ ($\epsilon$=37,000); sl. sh. 160 m$\mu$ ($\epsilon$=12,350); 264 m$\mu$ ($\epsilon$=12,700); 316 m$\mu$ ($\epsilon$=9,300). (0.01 N $H_2SO_4$) 211 m$\mu$ ($\epsilon$=28,500); 244 m$\mu$ ($\epsilon$=14,600); 280 m$\mu$ ($\epsilon$=10,900). (0.01 N KOH) 211 m$\mu$ ($\epsilon$=3,500); sl. sh. 264 m$\mu$ ($\epsilon$=12,700); 316 m$\mu$ ($\epsilon$=9,300).

I.R. (principal bands; mineral oil mull) 3400, 3180, 3140, 3020, 1650, 1620, 1560, 1535, 1485, 1245, 1175, 1050, 705 cm.$^{-1}$.

EXAMPLE 10. — 1,2 - DIHYDRO - 1 - HYDROXY - 2-IMINO - 5,6 - DIMETHYL - 4 - PIPERIDINOPYRIMIDINE

Part A.—2-amino-5,6-dimethyl-4-(2,4-dichlorophenoxy)pyrimidine

A mixture of 62.8 g. (0.4 mole) of 2-amino-5,6-dimethyl-4-chloropyrimidine and 195 g. (1.2 moles) of 2,4-dichlorophenol was heated to 65° C. and 26.4 g. (0.4 mole) of 85% potassium hydroxide was added thereto. The reaction mixture was heated at 95°–100° C. for 3 hours, 100 ml. of dimethylformamide was added thereto, followed by cooling to about 60° C., after which a solution of 1500 ml. of water and 56 g. of potassium hydroxide was added. This mixture was allowed to stand overnight and filtered. The solid was washed 4 times with 800-ml. portions of water, dried in air, and recrystallized from 1000 ml. of 95% ethanol to yield 70.1 g. (61% of theory) of 2 - amino - 5,6 - dimethyl - 4 - (2,4 - dichlorophenoxy)pyrimidine; M.P. 157°–158° C.

*Analysis.*—Calcd. for $C_{12}H_{11}Cl_2N_3O$: C, 50.72; H, 3.90; Cl, 24.96; N, 14.79. Found: C, 51.23; H, 4.61; Cl. 25.06; N, 14.68.

U.V. (ethanol) 222 m$\mu$ ($\epsilon$=19,550); sl. sh. 276 m$\mu$ ($\epsilon$=6,300); 284 m$\mu$ ($\epsilon$=7,750). (0.01 N $H_2SO_4$) sh. 218 m$\mu$ ($\epsilon$=25,500); sh. 224 m$\mu$ ($\epsilon$=23,300); sh. 274 m$\mu$ ($\epsilon$=6,350); 282 m$\mu$ ($\epsilon$=8,250); 289 m$\mu$ ($\epsilon$=8,600); sl. sh. 301 m$\mu$ ($\epsilon$=6,350). (0.01 N KOH) 222 m$\mu$ ($\epsilon$=19,600); sh. 226 m$\mu$ ($\epsilon$=19,350); sh. 274 m$\mu$ $\epsilon$=6,200); 284 m$\mu$ ($\epsilon$=7,850).

I.R. (principal bands; mineral oil mull) 3480, 3290, 3140, 1645, 1585, 1570, 1260, 1235, 1100, 855, 815, 770 cm.$^{-1}$.

Part B.—1,2-dihydro-1-hydroxy-2-imino-5,6-dimethyl-4-(2,4-dichlorophenoxy)pyrimidine A mixture of 56.8 g (0.2 mole) of 2-amino-5,6 dimethyl-4-(2,4-dichlorophenoxy)pyrimidine and 1500 ml. of methanol was cooled to 0°C. and 41.04 g. (0.24 mole) of m-chloroperbenzoic acid was added over 1.5 hours. The reaction mixture was stirred for an additional 3 hours, concentrated to about 400 ml. under reduced pressure, and mixed with a solution of 1500 ml. of water and 17 g. of potassium hydroxide. This mixture was allowed to stand overnight and filtered. The solid was recrystallized from 1500 ml. of acetonitrile to yield 27.5 g. (46% of theory) of 1,2-dihydro-1-hydroxy-2-imino-5, 6-dimethyl - 4 - (2,4-dichlorophenoxy)pyrimidine; M.P. 225°–226° C.

*Analysis.*—Calcd. for $C_{12}H_{11}Cl_2N_3O_2$: C, 48.00; H, 3.69; Cl, 23.62; N, 13.99. Found: C, 47.86; H, 3.78; Cl, 23.68; N, 13.64.

U.V. (ethanol) sh. 210 m$\mu$ ($\epsilon$=28,800); 246 m$\mu$ ($\epsilon$=8500); 274 m$\mu$ ($\epsilon$=2000); 313 m$\mu$ ($\epsilon$=8500). (0.01 N $H_2SO_4$) 218 m$\mu$ ($\epsilon$=25,300); sh. 226, m$\mu$ ($\epsilon$=21,600); sh. 274 m$\mu$ ($\epsilon$=4200); 296 m$\mu$ ($\epsilon$=7200). (0.01 N KOH) 218 m$\mu$ ($\epsilon$=29,250); 253 m$\mu$ ($\epsilon$—8300); 282 m$\mu$ ($\epsilon$=1900); 321 m$\mu$ ($\epsilon$=8350).

I.R. (principal bands; mineral oil mull) 3410, 3370, 3280, 1650, 1560, 1230, 1210, 1085, 900 cm.

Part C. — 1,2-dihydro-1-hydroxy-2-imino-5,6-dimethyl-4-piperidinopyrimidine

A mixture of 10.0 g. (0.033 mole) of 1,2-dihydro-1-hydroxy-2-imino-5,6 = dimethyl-4-(2,4-dichlorophenoxy) pyrimidine and 50 ml. of piperidine was sealed in a glass bomb and heated at an oil temperature of 165° C. (about 135° C. internal temperature) for 4 hours. The reaction mixture was cooled and filtered. The solid was washed with ether and dried to yield 3.6 g. (50% of theory) of 1,2-dihydro-1-hydroxy-2-imino-5,6-dimethyl-4- piperidinopyrimidine; M.P. 172°–173° C.

*Analysis.*—Calcd. for $C_{11}H_{18}N_4O$: C, 57.87; H, 7.95; N, 24.54. Found: C, 58.63; H, 7.60; N, 24.85.

U.V. (ethanol) 215 m$\mu$ ($\epsilon$=22,550); 269 m$\mu$ ($\epsilon$=9600); 330 m$\mu$ ($\epsilon$=12,450). (0.01 N $H_2SO_4$) 217 m$\mu$ ($\epsilon$=20,750); 236 m$\mu$ ($\epsilon$=9200); 260 m$\mu$ ($\epsilon$=8050); 302 m$\mu$ ($\epsilon$=12,900). (0.01 N KOH) 217 m$\mu$ ($\epsilon$=21,800); 269 m$\mu$ ($\epsilon$=9700); 330 m$\mu$. ($\epsilon$=12,650).

I.R. (principal bands; mineral oil mull) 3340, 1650, 1625, 1585, 1565, 1230, 1100, 1075 cm.$^{-1}$.

EXAMPLE 11. — (1,2 - DIHYDRO - 1 - HYDROXY-2-IMINO - 6 - METHYL - 5 - BROMO - 4-1-PYRROLI-DINYL)PYRIMIDINE

Part A.—2-amino-6-methyl-5-bromo-4-(2,4-dichlorophenoxy)pyrimidine

A mixture of 59.7 g. (0.3 mole) of impure 2-amino-6-methyl-4-(2,4-dichlorophenoxy)pyrimidine, 52.8 g. (0.3 mole) of N-bromo-succinimide, and 600 ml. of carbon tetrachloride was refluxed for 1 hour and then concentrated to dryness. The solid was washed with water and filtered and after 3 recrystallizations from methanol yielded 33.0 g. (31% of theory) of 2-amino-6-methyl-5-bromo-4-(2,4-dichlorophenoxy)pyrimidine; M.P. 155°–156.5° C.

Analysis.—Calcd. for $C_{11}H_8BrCl_2N_3O$: C, 37.85; H, 2.31; N, 12.04. Found: C, 37.65; H, 2.30; N, 12.49.

U.V. (ethanol) sh. 220 m$\mu$ ($\epsilon$=18,000); sh. 283 m$\mu$ ($\epsilon$=5100); 294 m$\mu$ ($\epsilon$=5900). (0.01 N $H_2SO_4$) sh. 218 m$\mu$ ($\epsilon$=19,980); 226 m$\mu$ ($\epsilon$=19,340); sh. 238 m$\mu$ ($\epsilon$—15,940); 296 m$\mu$ ($\epsilon$=6080). (0.01 N KOH) 226 m$\mu$ ($\epsilon$=1960); sh. 242 m$\mu$ ($\epsilon$=14290); sh. 282 m$\mu$ ($\epsilon$=5410); 293 m$\mu$ ($\epsilon$=6510).

I.R. (principal bands; mineral oil mull) 3480, 3280, 3140, 1640, 1585, 1560, 1250, 1235, 1100, 1000, 855, 820 cm.$^{-1}$.

Following the procedure of Example 11, Part A, but substituting for the N-bromosuccinimide, N-chlorosuccinimide, there is obtained the corresponding 2-amino-6-methyl-5-chloro-4-(2,4-dichlorophenoxy)pyrimidine.

Also following the procedure of Example 11, Part A, but substituting other 2-amino-6-lower-alkyl-4-phenoxypyrimidines and 2-amino-6-lower-alkyl-4-halophenoxypyrimidines, such as 2-amino-6-ethyl-4-phenoxypyrimidine;
2-amino-6-propyl-4-phenoxypyrimidine;
2-amino-6-tert-butyl-4-phenoxypyrimidine;
2-amino-6-octyl-4-phenoxypyrimidine;

and the like, and 2-amino-6-ethyl-4-(2,4-dichlorophenoxy)pyrimidine;
2-amino-6-propyl-4-(2,4-dichlorophenoxy)pyrimidine;
2-amino-6-tert-butyl-4-(2,4-dichlorophenoxy) pyrimidine;
2-amino-6-octyl-4-(2,4-dichlorophenoxy)pyrimidine;

and the like, for 2-amino-6-methyl-4-(2,4-dichlorophenoxy)pyrimidine; there are obtained the corresponding 5-bromo compounds, such as 2-amino-6-ethyl-5-bromo-4-phenoxypyrimidine;
2-amino-6-propyl-5-bromo-4-phenoxypyrimidine;
2-amino-6-tert-butyl-5-bromo-4-phenoxypyrimidine;
2-amino-6-octyl-5-bromo-4-phenoxypyrimidine;

and the like, and 2-amino-6-ethyl-5-bromo-4-(2,4-dichlorophenoxy)pyrimidine;
2-amino-6-propyl-5-bromo-4-(2,4-dichlorophenoxy) pyrimidine;
2 - amino - 6 - tert-butyl-5-bromo-4-(2,4-dichlorophenoxy) pyrimidine;
2-amino-6-octyl-5-bromo-4-(2,4-dichlorophenoxy)pyrimidine;

and the like, respectively.

Likewise by reacting the appropriate 2-amino-6-lower-alkyl-4-phenoxypyrimidines and 2-amino-6-lower-alkyl-4-halophenoxypyrimidines with N-chlorosuccinimide there are obtained 2-amino-6-lower-alkyl-5-chloro-4-phenoxypyrimidines and 2 - amino - 6 - lower -alkyl - 5 - chloro-4-halophenoxypyrimidines.

Part B.—1,2-dihydro-1-hydroxy-2-imino-6-methyl-5-bromo-4-(2,4-dichlorophenoxy)pyrimidine A solution of 22.0 g. (0.062 mole) of 2-amino-6-methyl-5-bromo-4-(2,4-dichlorophenoxy)pyrimidine, 400 ml. of acetone and 100 ml. of ethanol was cooled to 0° C. and 24.0 g. (0.14 mole) of m-chloroperbenzoic acid was added over a 25-minute period. The reaction mixture was stirred at 0°–5° C. for 4 hours and filtered into a solution of 1500 ml. of water containing 0.14 mole of 85% potassium hydroxide. The thus-obtained mixture was stirred and filtered. The thus-obtained solid was washed with 600 ml. of acetonitrile to yield 19.0 g. (84% of theory) of 1,2-dihydro-1-hydroxy-2-imino-6-methyl-5-bromo-4-(2,4-dichlorophenoxy)pyrimidine; M.P. 212°–214° C.

Analysis.—Calcd. for $C_{11}H_8BrCl_2N_3O_2$: C, 36.19; H, 2.21; N, 11.51. Found: C, 36.56; H, 2.54; N, 12.07.

U.V. (ethanol) sh. 236 m$\mu$ ($\epsilon$=22,810); 264 m$\mu$ ($\epsilon$=9125); sh. 281 m$\mu$ ($\epsilon$=3650); 333 m$\mu$ ($\epsilon$=7885). (0.01 N $H_2SO_4$) 226 m$\mu$ ($\epsilon$=22,920); 263 m$\mu$ ($\epsilon$=7485); 329 m$\mu$ ($\epsilon$=6130). (0.01 N KOH) 226 mu ($\epsilon$=22,375); 262 m$\mu$ ($\epsilon$=9670); 334 m$\mu$ ($\epsilon$=7520).

I.R. (principal bands; mineral oil mull) 3330, 3000, 1650, 1625, 1588, 1560, 1495, 1230, 1180, 1095, 1055, 1015, 860, 850, 835, 805 cm.$^{-1}$.

Following the procedure of Example 11, Part B, but using in place of m-chloroperbenzoic acid, in separate experiments, peracetic acid; perbenzoic; perphthalic acid; 2,4-dichlorobenzoic acid; p-methylperbenzoic acid; m-nitroperbenzoic acid, and p-methoxyperbenzoic acid, the same product, 1,2-dihydro-1-hydroxy-2-imino-6-methyl-5-bromo-4-(2,4-dichlorophenoxy)pyrimidine, is obtained.

Also following the procedure of Example 11, Part B, but substituting other 2-amino-6-lower-alkyl-5-bromo-4-phenoxypyrimidines, and 2-amino - 6 - lower-alkyl-5-bromo-4-halophenoxypyrimidines, such as 2-amino-6-ethyl-5-bromo-4-phenoxypyrimidine;
2-amino-6-propyl-5-bromo-4-phenoxypyrimidine;
2-amino-6-tert-butyl-5-bromo-4-phenoxypyrimidine;
2-amino-6-octyl-5-bromo-4-phenoxypyrimidine;

and the like, and 2-amino-6-ethyl-5-bromo-4-(2,4-dichlorophenoxy) pyrimidine;
2-amino-6-propyl-5-bromo-4-(2,4-dichlorophenoxy) pyrimidine;
2-amino-6-tert-butyl-5-bromo-4-(2,4-dichlorophenoxy pyrimidine;
2-amino-6-octyl-5-bromo-4-(2,4-dichlorophenoxy) pyrimidine;

and the like, is productive of 1,2-dihydro-1-hydroxy-2-imino-6-ethyl-5-bromo-5-phenoxypyrimidine;
1,2-dihydro-1-hydroxy-2-imino-6-propyl-5-bromo-4-phenoxy-pyrimidine
1,2-dihydro-1-hydroxy-2-imino-6-tert-butyl-5-bromo-4-phenoxypyrimidine
1,2-dihydro-1-hydroxy-2-imino-6-octyl-5-bromo-4-phenoxypyrimidine;

and the like, and 1,2-dihydro-1-hydroxy-2-imino-6-ethyl-5-bromo-4-(2,4-dichlorophenoxy)pyrimidine;
1,2-dihydro-1-hydroxy-2-imino-6-propyl-5-bromo-4-(2,4-dichlorophenoxy)pyrimidine;
1,2-dihydro-1-hydroxy-2-imino-6-tert-butyl-5-bromo-4-2,4-dichlorophenoxy)pyrimidine;
1,2-dihydro-1-hydroxy-2-imino-6-octyl-5-bromo-4-(2,4-dichlorophenoxy)pyrimidine;

and the like, respectively.

Likewise, by reacting the appropriate 2-amino-6-lower-alkyl - 5 - chloro - 4-phenoxypyrimidines and 2-amino-6-lower-alkyl-5-chloro-4-halophenoxypyrimidines there are obtained the corresponding 1,2 - dihydro-1-hydroxy-2-imino - 6-lower-alkyl-5-chloro-4-phenoxypyrimidines and 1,2 - dihydro - 1-hydroxy-2-imino-6-lower-alkyl-5-chloro-4-halophenoxypyrimidines.

Part C.—1,2-dihydro-1-hydroxy-2-imino-6-methyl-5-bromo-4-(1-pyrrolidinyl)pyrimidine A mixture of 3.5 g. (0.01 mole) of 1,2-dihydro-1-hydroxy - 2 - imino - 6-methyl-5-bromo-4-(2,4-dichlorophenoxy)pyrimidine and 25 ml. of pyrrolidine was heated at 70° C. for 2 hours, cooled and filtered. The solid was washed successively with pyrolidine and ether to yield 1.9 g. (70% of theory) of 1,2-dihydro-1-hydroxy-2-imino-6 - methyl - 5-bromo-4-(1-pyrrolidinyl)pyrimidine, M.P. 166°–167° C.

Analysis.—Calcd. for $C_9H_{13}BrN_4O$: C, 39.57; H, 4.80; N, 20.51; Br, 29.36. Found: C, 39.80; H, 4.47; N, 20.65; Br, 30.03.

U.V. (ethanol) 221 m$\mu$ ($\epsilon$=25,250); 276 m$\mu$ ($\epsilon$=9200); 338 m$\mu$ ($\epsilon$=11,350). (0.01 N $H_2SO_4$) 223 m$\mu$ ($\epsilon$=26,700); 259 m$\mu$ ($\epsilon$=10,650); 308 m$\mu$ ($\epsilon$=11,600); sl. sh. 321 m$\mu$ ($\epsilon$=5850). (0.01 N KOH) 221 m$\mu$ ($\epsilon$=24,250); 276 m$\mu$ ($\epsilon$=9150); 338 m$\mu$ ($\epsilon$=11,300).

I.R. (principal bands; mineral oil mull) 3410, 2800, 1645, 1575, 1485, 1180, 1135, 1010 cm.$^{-1}$.

Following the procedure of Example 11, Part C, but using in place of the pyrrolidine, dimethylamine; diethylamine; dibutylamine; N-methylbutylamine; N-ethylhexylamine; butylamine; octylamine; diallylamine; dicrotylamine; di-(2-hexenyl)amine; N-methylallylamine; allylamine; 2-octenylamine; dibenzylamine; diphenethylamine; N - methylbenzylamine; N-ethyl - (1 - naphthylmethyl) - amine; benzylamine; 3-phenylpropylamine; cyclohexylamine; dicyclohexylamine; cyclobutylamine; N-methyl-(4-tert-butylcyclohexyl)amine; azetidine; piperidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and N-methylpiperazine, there are obtained 1,2-dihydro-1-hydroxy-2-imino-6-methyl-5-bromo-4-dimethylaminopyrimidine;
1,2-dihydro-1-hydroxy-2-imino-6-methyl-5-bromo-4-diethylaminopyrimidine;
1,2-dihydro-1-hydroxy-2-imino-6-methyl-5-bromo-4-dibutylaminopyrimidine;
1,2-dihydro-1-hydroxy-2-imino-6-methyl-5-bromo-4-(N-methylbutylamino)pyrimidine;
1,2-dihydro-1-hydroxy-2-imino-6-methyl-5-bromo-4-(N-ethylhexylamino)pyrimidine;
1,2-dihydro-1-hydroxy-2-imino-6-methyl-5-bromo-4-butylaminopyrimidine;
1,2-dihydro-1-hydroxy-2-imino-6-methyl-5-bromo-4-octylaminopyrimidine;
1,2-dihydro-1-hydroxy-2-imino-6-methyl-5-bromo-4-diallylaminopyrimidine;
1,2-dihydro-1-hydroxy-2-imino-6-methyl-5-bromo-4-dicrotylaminopyrimidine;
1,2-dihydro-1-hydroxy-2-imino-6-methyl-5-bromo-4-[di-(2-hexenyl)amino]pyrimidine;
1,2-dihydro-1-hydroxy-2-imino-6-methyl-5-bromo-4-(N-methylallylamino)pyrimidine;
1,2-dihydro-1-hydroxy-2-imino-6-methyl-5-bromo-4-allylaminopyrimidine;
1,2-dihydro-1-hydroxy-2-imino-6-methyl-5-bromo-4-(2-octenylamino)pyrimidine;
1,2-dihydro-1-hydroxy-2-imino-6-methyl-5-bromo-4-dibenzylaminopyrimidine;
1,2-dihydro-1-hydroxy-2-imino-6-methyl-5-bromo-4-diphenethylaminopyrimidine;
1,2-dihydro-1-hydroxy-2-imino-6-methyl-5-bromo-4-(N-methylbenzylamino)pyrimidine;
1,2-dihydro-1-hydroxy-2-imino-6-methyl-5-bromo-4-[N-ethyl-(1-naphthylmethyl)amino]pyrimidine;
1,2-dihydro-1-hydroxy-2-imino-6-methyl-5-bromo-4-benzylaminopyrimidine;
1,2-dihydro-1-hydroxy-2-imino-6-methyl-5-bromo-4-(3-phenylpropylamino)pyrimidine;
1,2-dihydro-1-hydroxy-2-imino-6-methyl-5-bromo-4-cyclohexylaminopyrimidine;
1,2-dihydro-1-hydroxy-2-imino-6-methyl-5-bromo-4-dicyclohexylaminopyrimidine;
1,2-dihydro-1-hydroxy-2-imino-6-methyl-5-bromo-4-cyclobutylaminopyrimidine;
1,2-dihydro-1-hydroxy-2-imino-6-methyl-5-bromo-4-[N-methyl-(4-tert-butylcyclohexyl)amino]pyrimidine;
1,2-dihydro-1-hydroxy-2-imino-6-methyl-5-bromo-4-[1-azetidinyl]pyrimidine;
1,2-dihydro-1-hydroxy-2-imino-6-methyl-5-bromo-4-piperidinopyrimidine;
1,2-dihydro-1-hydroxy-2-imino-6-methyl-5-bromo-4-[1-(2-methylpyrrolidinyl)]pyrimidine;
1,2-dihydro-1-hydroxy-2-imino-6-methyl-5-bromo-4-[1-(3-ethylpyrrolidinyl)]pyrimidine;
1,2-dihydro-1-hydroxy-2-imino-6-methyl-5-bromo-4-[1-(2,5-dimethylpyrrolidinyl)]pyrimidine;
1,2-dihydro-1-hydroxy-2-imino-6-methyl-5-bromo-4-(2-methyl-5-ethylpiperidino)pyrimidine;
1,2-dihydro-1-hydroxy-2-imino-6-methyl-5-bromo-4-(3-isopropylpiperidino)pyrimidine;
1,2-dihydro-1-hydroxy-2-imino-6-methyl-5-bromo-4-(2,4,6-trimethylpiperidino)pyrimidine;
1,2-dihydro-1-hydroxy-2-imino-6-methyl-5-bromo-4-(1-hexahydroazepinyl)pyrimidine;
1,2-dihydro-1-hydroxy-2-imino-6-methyl-5-bromo-4-[1-(4-tert-butylhexahydroazepinyl)]pyrimidine;
1,2-dihydro-1-hydroxy-2-imino-6-methyl-5-bromo-4-heptamethyleniminopyrimidine;
1,2-dihydro-1-hydroxy-2-imino-6-methyl-5-bromo-4-octamethyleniminopyrimidine;
1,2-dihydro-1-hydroxy-2-imino-6-methyl-5-bromo-4-morpholinopyrimidine;
1,2-dihydro-1-hydroxy-2-imino-6-methyl-5-bromo-4-(2-ethylmorpholino)pyrimidine; and
1,2-dihydro-1-hydroxy-2-imino-6-methyl-5-bromo-4-(4-methyl-1-piperazinyl)pyrimidine;

respectively.

Also following the procedure of Example 11, Part C, but using in place of the pyrrolidine, each of the primary and secondary amines corresponding to each of the specific examples of

and heterocyclic moieties within the scope of R as defined above, there are obtained the corresponding 1,2-dihydro-1 - hydroxy - 2 - imino - 6 - methyl-5-bromopyrimidines, substituted at the 4-position with a mono-substituted or di-substituted, including heterocyclic, amino moiety.

Also following the procedure of Example 11, Part C, but using in place of 1,2-dihydro-1-hydroxy-2-imino-6-methyl-5-bromo-4-(2,4-dichlorophenoxy)pyrimidine, 1,2-dihydro-1-hydroxy-2-imino-6-ethyl-5-bromo-4-phenoxypyrimidine;
1,2-dihydro-1-hydroxy-2-imino-6-propyl-5-bromo-4-phenoxypyrimidine;
1,2-dihydro-1-hydroxy-2-imino-6-tert-butyl-5-bromo-4-phenoxypyrimidine;
1,2-dihydro-1-hydroxy-2-imino-6-octyl-5-bromo-4-phenoxypyrimidine;

and the like, or 1,2-dihydro-1-hydroxy-2-imino-6-ethyl-5-bromo-4-(2,4-dichlorophenoxy)pyrimidine;
1,2-dihydro-1-hydroxy-2-imino-6-propyl-5-bromo-4-(2,4-dichlorophenoxy)pyrimidine;
1,2-dihydro-1-hydroxy-2-imino-6-tert-butyl-5-bromo-4-(2,4-dichlorophenoxy)pyrimidine;
1,2-dihydro-1-hydroxy-2-imino-6-octyl-5-bromo-4-(2,4-dichlorophenoxy)pyrimidine;

and the like, there are obtained 1,2-dihydro-1-hydroxy-2-imino-6-ethyl-5-bromo-4-(1-pyrrolidinyl)pyrimidine;
1,2-dihydro-1-hydroxy-2-imino-6-propyl-5-bromo-4-(1-pyrrolidinyl)pyrimidine;
1,2-dihydro-1-hydroxy-2-imino-6-tert-butyl-5-bromo-4-(1-pyrrolidinyl)pyrimidine;
1,2-dihydro-1-hydroxy-2-imino-6-octyl-5-bromo-4-(1-pyrrolidinyl)pyrimidine;

and the like, respectively.

Also following the procedure of Example 11, Part C, but using in place of the combination of 1,2-dihydro-1-hydroxy-2-imino-6-methyl - 5 - bromo-4-phenoxypyrimidine and pyrrolidine, each of the above-mentioned 1,2-dihydro - 1 - hydroxy - 2 - imino-6-lower-alkyl-5-bromo-4-phenoxypyrimidines and 1,2-dihydro - 1 - hydroxy-2-imino - 6 - lower-alkyl - 5 - bromo-4-halophenoxypyrimidines, and each of the above-mentioned primary and secondary amines, there are obtained the corresponding 1,2 - dihydro - 1 - hydroxy - 2 - imino - 6 - lower-alkyl-5-bromopyrimidines, wherein the 4-phenoxy or 4-halophenoxy substituent has been replaced with a mono-substituted or di-substituted, including heterocyclic, amino moiety.

Likewise by reacting the appropriate 1,2-dihydro-1-hydroxy - 2 - imino - 6 - lower-alkyl - 5 - chloro - 4 - phenoxypyrimidines and 1,2-dihydro - 1 - hydroxy-2-imino-6-lower-alkyl-5-chloro-4-halophenoxypyrimidines with each of the primary and secondy amines corresponding to each of the specific examples of

and heterocyclic moieties within the scope of R as defined above, there are obtained the corresponding 1,2-dihydro - 1 - hydroxy - 2 - imino - 6 - lower-alkyl-5-chloropyrimidines, substituted at the 4-position with a mono-substituted or di-substituted, including heterocyclic, amino moiety.

EXAMPLE 12.—1,2-DIHYDRO-1-HYDROXY-2-IMINO-6-METHYL-5-NITRO-4-PIPERIDINOPYRIMIDINE 2.0 g. (0.01 mole) of 1,2-dihydro-1-hydroxy-2-imino-6-methyl-4-piperidinopyrimidine was dissolved in 10 ml. of concentrated sulfuric acid and cooled to 10°–15° C. A solution of 1 ml. (0.015 mole) of 70% nitric acid and 5 ml. of 95% sulfuric acid was added over a 45-minute period. The reaction mixture was stirred for 30 minutes, poured into 400 ml. of crushed ice, and a total of 30.0 g. of solid potassium hydroxide was slowly added, followed by stirring and the slow addition of 10 g. of potassium hydroxide. The thus-obtained mixture was filtered, the solid was slurried in water, followed by washing with water until free of inorganic salts, and recrystallized from dimethylformamide to yield 0.65 g. (26% of theory) of 1,2 - dihydro - 1 - hydroxy - 2 - imino - 6 - methyl-5-nitro-4-piperidinopyrimidine; M.P. 196–199° C.

*Analysis.*—Calcd. for $C_{10}H_{15}N_5O_3$: C, 47.72; H, 5.97; N, 27.65; O, 18.95. Found: C, 46.81; H, 5.73; N, 26.68; O, 18.95.

U.V. (ethanol) 215 m$\mu$ ($\epsilon$=22,100); 263 m$\mu$ ($\epsilon$=15,550); 324 m$\mu$ ($\epsilon$=8950); 400 m$\mu$ ($\epsilon$=2500). (0.01 N $H_2SO_4$) 214 m$\mu$ ($\epsilon$=24,500); 259 m$\mu$ ($\epsilon$=15,850); sh. 290 m$\mu$ ($\epsilon$=16,700). (0.01 N KOH) 219 m$\mu$ ($\epsilon$=18,100); 263 m$\mu$ ($\epsilon$=14,700); 325 m$\mu$ ($\epsilon$=8250); 400 m$\mu$ ($\epsilon$=4950).

I.R. (principal bands; mineral oil mull) 3390, 3300, 2720, 2600, 1655, 1595, 1510, 1335, 1200, 1175, 1115, 1050, 815, 790, 755 cm.$^{-1}$.

The above was repeated using 0.043 mole of 1,2-dihydro - 1 - hydroxy - 2 - imino - 6 - methyl - 4 - piperidinopyrimidine (and proportionately increasing the other materials used in the reaction). The product was re-crystallized from 50% ethanol, rather than dimethylformamide, to give a 64% yield of 1,2-dihydro-1-hydroxy-2-imino-6-methyl-5-nitro - 4 - piperidinopyrimidine; M.P. 199°–201° C.

Following the procedure of example 12 but using in place of the 1,2-dihydro-1-hydroxy-2-imino-6-methyl-4-piperidinopyrimidine, each of the specific 1,2-dihydro-1-hydroxy-2-imino-6-lower-alkylpyrimidines substituted at the 4-position with a mono-substituted or di-substituted, including heterocyclic, amino moiety, and unsubstituted at the 5-position, there are obtained the corresponding 1,2-dihydro-1-hydroxy - 2 - imino-6-lower-alkyl-5-nitropyrimidines, substituted at the 4-position as in the reactant.

EXAMPLE 13.—1,2-DIHYDRO-1-HYDROXY-2-IMINO-6-METHYL-5-AMINO-4-PIPERIDINOPYRIMIDINE

A mixture of 2.5 g. (0.01 mole) of 1,2-dihydro-1-hydroxy - 2 - imino - 6 - methyl - 5 - nitro - 4 - piperidinopyrimidine, 0.1 g. of platinum oxide and 200 ml. of ethanol were shaken under 50 lbs. per square inch gauge initial hydrogen pressure. The theoretical hydrogen absorption was achieved within 15 minutes. The reaction mixture was filtered through diatomaceous earth and the filtrate concentrated to dryness under reduced pressure. The residue thus-obtained was twice chromatographed over 100 g. of silica (0.05–0.2 mesh) using 2,000 ml. each of a 5–40/95–60 methanol/methylene chloride mixture. The 1,2 - dihydro - 1 - hydroxy-2-imino-6-methyl-5-amino - 4 - piperidinopyrimidine weighed 1.4 g., was amorphous and developed a reddish cast upon exposure to air.

*Analysis.*—Calcd. for $C_{10}H_{17}N_5O$: C, 53.79; H, 7.68; O, 7.16. Found: C, 52.91; H. 7.79; O, 7.60.

U.V. (ethanol) 215 m$\mu$ ($\epsilon$=17,238); 243 m$\mu$ ($\epsilon$=13,825); 268 m$\mu$ ($\epsilon$=8470); 353 m$\mu$ ($\epsilon$=9590). (0.01 N $H_2SO_4$) 215 m$\mu$ ($\epsilon$=14,940); 250 m$\mu$ ($\epsilon$=12,375); 333 m$\mu$ ($\epsilon$=7580). (0.01 N KOH) 216 m$\mu$ ($\epsilon$=14,050); 243 m$\mu$ ($\epsilon$=13,380); 268 m$\mu$ ($\epsilon$=12,835); 351 m$\mu$ ($\epsilon$=9590).

I.R. (principal bands; mineral oil mull) 3400, 3100, 1625, 1590, 1200, 1125, 1110, 1025 cm.$^{-1}$.

Following the procedure of Example 13 but using in place of the 1,2-dihydro-1-hydroxy-2-imino-6-methyl-5-nitro - 4 - piperidinopyrimidine, each of the above-mentioned, 1,2-dihydro - 1 - hydroxy-2-imino-6-alkyl-5-nitropyrimidines substituted at the 4-position with a mono-substituted or di-substituted, including heterocyclic, amino moiety is catalytically hydrogenated to give the corresponding 1,2-dihydro - 1 - hydroxy - 2 - imino-6-lower-alkyl-5-aminopyrimidines, substituted at the 4-position as in the reactant.

EXAMPLE 14.—1,2-DIHYDRO - 1 - HYDROXY-2-IMINO - 6 - METHYL-4,5-BIS(1-PYRROLIDINYL)PYRIMIDINE

A mixture of 2.7 g. (0.01 mole) of 1,2-dihydro-1-hydroxy-2-imino - 6 - methyl - 5 - bromo-4-(1-pyrrolidinyl) pyrimidine and 25 ml. of pyrrolidine was heated in a glass bomb at an oil bath temperature of 120° C. for 2.5 hours, followed by concentration of the reaction mixture under reduced pressure. The thus-obtained residue was shaken with a solution of 0.4 g. sodium hydroxide and 50 ml. of water and the mixture was extracted 4 times with 100-ml. portions of chloroform. The chloroform extracts were combined, dried over sodium sulfate and concentrated to yield 2.4 g. of crude material which was heated in 300 ml. of acetonitrile containing activated charcoal and filtered. The filtrate was concentrated at 40 ml. and refrigerated overnight to obtain a solid which was recrystallized from acetonitrile to yield 0.3 g. (11% of theory) of 1,2-dihydro-1-hydroxy - 2 - imino-6-methyl-4,5-bis(1-pyrrolidinyl)pyrimidine; M.P. 224°–226° C.

*Analysis.*—Calcd. for $C_{13}H_{21}N_5O$: C, 59.24; H, 8.04; N, 26.60. Found: C, 59.03; H, 8.01; N, 27.10.

U.V. (ethanol) 214 mμ (ε=26,300); 269 mμ (ε=10,940); 331 mμ (ε=9315). (0.01 N $H_2SO_4$) 214.5 mμ (ε=23,250); 250 mμ (ε=9645); 289 mμ (ε=8740). (0.01 N KOH) 269 mμ (ε=10,760); 331 mμ (ε=9110).

I.R. (principal bands; mineral oil mull) 3420, 3280, 2950, 1640, 1575, 1550, 1490, 1185, 1145, 1085, 1015 cm.$^{-1}$.

Following the procedure of Example 14, but using in place of 1,2-dihydro - 1 - hydroxy-2-imino-6-methyl-5-bromo-4-(1-pyrrolidinyl)pyrimidine, each of the above-mentioned 1,2-dihydro - 1 - hydroxy-2-imino-6-lower-alkyl - 5 - bromopyrimidines and 1,2-dihydro-1-hydroxy-2-imino - 6 - lower-alkyl-5-chloropyrimidines, substituted at the 4-position with a mono-substituted or di-substituted, including heterocyclic, amino moiety, is productive of the corresponding 1,2-dihydro-1-hydroxy-2-imino-6-lower-alkyl - 5 - (1-pyrrolidinyl)pyrimidines substiuted at the 4-position as in the reactant.

Also following the procedure of Example 14, but using in place of the pyrrolidine each of the primary and secondary amines corresponding to each of the specific examples of

and heterocyclic moieties within the scope of R as defined above, and substituting the appropriate 1,2-dihydro-1-hydroxy-2-imino - 6 - lower-alkyl - 5 - bromo-4-R-pyrimidine or 1,2-dihydro - 1 - hydroxy-2-imino-6-lower-alkyl - 5 - chloro-4-R-pyrimidine, wherein R is defined as above, there are obtained the correpsonding 1,2-dihydro-1-hydroxy - 2 - imino-6-lower-alkylpyrimidines, substituted at the 4- and 5-positions with a mono-substituted or di-substituted, including heterocyclic, amino moiety.

EXAMPLE 15.—1,2-DIHYDRO - 1 - HYDROXY-2-IMINO - 6 - METHYL-5-PIPERIDINO-4-(1-PYRROLIDINYL)PYRIMIDINE

A solution of 5.0 g. (0.019 mole) of 1,2-dihydro-1-hydroxy - 2 - imino-6-methyl-5-bromo-4-(1-pyrrolidinyl)pyrimidine and 30 ml. of piperidine was refluxed for 20 hours, cooled and filtered. The filtrate was concentrated to dryness and the residue refluxed in cyclohexane and filtered. The filtrate was chromatographed over 750 g. of silica (0.05–0.2 mesh) and developed using 6000 ml. of a 10% acetone–10% methanol–2% diethylamine–78% commercial hexanes solution, followed by 8000 ml. of a 20% methanol–10% acetone–2% diethylamine–68% commercial hexanes solution. The eluates obtained were taken to dryness and those which thin layer chromatography showed to contain the desired product were combined and recrystallized from acetonitrile to yield 0.4 g. (10% of theory) of 1,2-dihydro-1-hydroxy-2-imino-6-methyl - 5 - piperidino-4-(1-pyrrolidinyl)pyrimidine monohydrate, M.P. 204°–206° C.

*Analysis.*—Calcd. for $C_{14}H_{25}N_5O_2$: C, 56.92; H, 8.53; N, 23.71. Found: C, 56.78; H, 8.73; N, 23.86.

U.V. (ethanol) 214 mμ (ε=27,090); 269 mμ (ε=12,280); 331 mμ (ε=10,680). (0.01 N $H_2SO_4$) 214 mμ (ε=24,200); 245 mμ (ε=10,420); 291 mμ (ε=9705). (0.01 N KOH) 269 mμ (ε=12,290); 331 mμ (ε=10,810).

I.R. (principal bands; mineral oil mull) 3620, 3520, 3430, 3000, 1640, 1570, 1540, 1240, 1145, 1115, 1080, 1010 cm.$^{-1}$ Heating 1,2 - dihydro - 1-hydroxy-2-imino-6-methyl-5-piperidino-4-(1 - pyrrolidinyl)pyrimidine monohydrate at 65° C. and 0.1 millimeter pressure is productive of 1,2-dihydro-1-hydroxy-2-imino-6-methyl - 5 - piperidino - 4-(1-pyrrolidinyl)pyrimidine.

The filtrates from the recrystallization of 1,2-dihydro-1-hydroxy - 2 - imino - 6 - methyl - 5 - piperidino-4-(1-pyrrolidinyl)pyrimidine monohydrate were concentrated to dryness and the residue was rechromatographed over 300 g. of silica to yield 0.4 g. (10% of theory) of 1,2-dihydro-1-hydroxy-2-imino - 6 - (piperidinomethyl)-4-(1-pyrrolidinyl)pyrimidine.

*Analysis.*—Calcd. for $C_{14}H_{23}N_5O$: C, 60.61; H, 8.35; N, 25.25. Found: C, 60.32; H, 9.10; N, 25.01.

U.V. (ethanol) 214 mμ (ε=29,350); 264 mμ (ε=14,550); 324 mμ (ε=9650). (0.01 N $H_2SO_4$) 215 mμ (ε=24,350); 236 mμ (ε=17,200); 299 mμ (ε=8690). (0.01 N KOH) 265 mμ (ε=14,640); 324 mμ (ε=9710).

I.R. (principal bands; mineral oil mull) 3380, 2850, 1650, 1610, 1550, 1535, 1495, 1165 cm.$^{-1}$.

EXAMPLE 16.—1,2 - dihydro - 1 - hydroxy - 2 - imino-6 - methyl - 5 - (p - chlorophenylthio) - 4 - (1 - pyrrolidinyl)pyrimidine.

A mixture of 2.3 g. (0.016 mole) of purified p-chlorothiophenol, 15 ml. of dimethylformamide and 0.2 g. of sodium hydroxide was stirred until solution was complete and 1.5 g. (0.0053 mole) of 1,2-dihydro-1-hydroxy-2-imino-6 - methyl-5-bromo-4-(1 - pyrrolidinyl)pyrimidine was added thereto. The reaction mixture was heated at 95° C. for 3 hours and filtered, followed by the addition of 0.6 g. sodium hydroxide and 100 ml. of water. The thus-obtained mixture was filtered. Upon cooling the filtrate, a solid precipitated and was recovered by filtration. The thus-obtained solid was recrystallized from acetonitrile to yield 80 mg. (5% of theory) of 1,2-dihydro-1-hydroxy - 2 - imino - 6 - methyl - 5 - (p - chlorophenylthio)-4-(1-pyrrolidinyl)pyrimidine; M.P. 169°–170° C.

*Analysis.*—Calcd. for $C_{15}H_{17}ClN_4OS$: C,53.48; H, 5.09; N, 16.63. Found: C, 53.41; H, 4.44; N, 17.22.

U.V. (ethanol) 225 mμ (ε=30,280); sh. 248 mμ (ε=18,560); 283 mμ (ε=14,300); 334 mμ (ε=9190). (0.01 N $H_2SO_4$) 224 mμ (ε=28,200); 248 mμ (ε=24,680); sl. sh. 293 mμ (ε=8730). (0.01 N KOH) 226 mμ (ε=29,990); 248 mμ (ε=18,740); 283 mμ (ε=14,550); 339 mμ (ε=9460).

I.R. (principal bands; mineral oil mull) 3440, 3380, 3290, 3230, 1670, 1640, 1565, 1535, 1165, 1090, 1005, 885, 805 cm.$^{-1}$.

Following the procedure of Example 16 but substituting for p - chlorothiophenol, thiophenol; p - methylthiophenol; o-ethylthiophenol; m-bromothiophenol; o-fluorothiophenol; p-nitrothiophenol; and o-aminothiophenol; and the like, there are obtained 1,2-dihydro-1-hydroxy-2-imino-6-methyl-5-phenylthio-4-(1-pyrrolidinyl)pyrimidine;
1,2-dihydro-1-hydroxy-2-imino-6-methyl-5-(p-methylphenylthio)-4-(1-pyrrolidinyl)pyrimidine;
1,2-dihydro-1-hydroxy-2-imino-6-methyl-5-(o-ethylphenylthio)-4-(1-pyrrolidinyl)pyrimidine;
1,2-dihydro-1-hydroxy-2-imino-6-methyl-5-(m-bromophenylthio)-4-(1-pyrrolidinyl)pyrimidine;
1,2-dihydro-1-hydroxy-2-imino-6-methyl-5-(o-fluorophenylthio)-4-(1-pyrrolidinyl)pyrimidine;
1,2-dihydro-1-hydroxy-2-imino-6-methyl-5-(p-nitrophenylthio)-4-(1-pyrrolidinyl)pyrimidine;
1,2-dihydro-1-hydroxy-2-imino-6-methyl-5-(o-aminophenylthio)-4-(1-pyrrolidinyl)pyrimidine;

and the like, respectively.

Also following the procedure of Example 16 but substituting 1,2 - dihydro-1-hydroxy-2-imino-6-lower-alkyl-5-bromopyrimidines and 1,2-dihydro-1-hydroxy-2-imino-6-lower-alkyl-5-chloropyrimiydines substituted at the 4-position with mono-substituted and di-substituted, including heterocyclic, amino moieties, there are obtained the corresponding 1,2-dihydro-1-hydroxy-2-imino-6-lower - alkyl-5-(p-chlorophenylthio)pyrimidines, substitutedy at the 4-position as in the reactant.

Also following the procedure of Example 16 but substituting for the combination of the 1,2-dihydro-1-hydroxy- 2-imino-6-methyl-5-bromo-4-(1 - pyrrolidinyl)pyrimidine and p-chlorothiophenol, each of the above-mentioned 1,2-dihydro - 1 - hydroxy - 2 - imino-6-lower-alkyl-5-bromopyrimidines and 1,2 - dihydro-1-hydroxy-2-imino-6-lower-alkyl-5-chloropyrimidines substituted at the 4-position with mono - substituted and di-substituted, including heterocyclic, amino moieties and each of the other above-mentioned thiophenols within the scope of Formula XIV, above, there are obtained the corresponding 1,2-dihydro-1-hydroxy-2-imino-6-lower - alkylpyrimidines, substituted at the 4-position as in the pyrimidine reactant and substituted at the 5-position with an arylthio moiety corresponding to the particular thiophenol used.

EXAMPLE 17.—1,2-dihydro-1-hydroxy-2-imino-6-methyl-4-(1-pyrrolidinyl)pyrimidine

A solution of 5.4 g. (0.2 mole) of 1,2-dihydro-1-hydroxy - 2 - imino-6-methyl-5-bromo-4-(1 - pyrrolidinyl)pyrimidine and 50 ml. of anhydrous pyrrolidine was heated at 108°–110° C. for 3.5 hours, cooled, and filtered. The solid was washed successively with pyrrolidine and ether to yield 0.5 g. of starting material. The combined filtrate and washings were concentrated under reduced pressure. The residue was shaken twice with 150-ml. portions of ether and decanted. The residue was shaken with a solution of 1.0 g. of sodium hydroxide and 100 ml. of water and filtered. The filtrate was extracted 4 times with 250-ml. portions of chloroform. The chloroform solutions were combined, dried over sodium sulfate and taken to dryness. The residue (4.4 g.) was chromatographed over 350 g. of silica (0.05–0.1 mesh) using a 30% methanol–70% methylene chloride mixture. The eluates obtained were taken to dryness and those which thin layer chromatography showed to contain 1,2 - dihydro-1-hydroxy-2-imino-6-methyl-4-(1 - pyrrolidinyl)pyrimidine (the same compound as described in Example 3) were combined; yield, 200 mg.

Similarly, those fractions which thin layer chromatography showed to contain 1,2-dihydro - 1 - hydroxy-2-imino-6-(1 - pyrrolidinylmethyl) - 4 - (1 - pyrrolidinyl)pyrimidine were combined; M.P. 186°–187° C.; yield, 200 mg.

Analysis.—Calcd. for $C_{13}H_{21}N_5O$: C, 59.29; H, 8.04; N, 26.60. Found: C, 58.05; H, 7.88; N, 26.96.

U.V. (ethanol) 213 mμ ($\epsilon=28,260$); 264 mμ ($\epsilon=13,910$); 325 mμ ($\epsilon=9276$). (0.01 N $H_2SO_4$) 216 mμ ($\epsilon=23,920$); 236 mμ ($\epsilon=11,760$); sl. sh. 260 mμ ($\epsilon=7720$); 297 mμ ($\epsilon=8665$). (0.01 N KOH) 220 mμ ($\epsilon=26,050$); 270 mμ ($\epsilon=15,280$); 330 mμ ($\epsilon=9990$).

I.R. (principal bands; mineral oil mull) 3360, 2900, 1650, 1620, 1560, 1505, 1495, 1180 cm.$^{-1}$.

EXAMPLE 18.—1,6-DIHYDRO-1-HYDROXY-2-METHYL-6-IMINO-4-PIPERIDINO-PYRIMIDINE

Part A.—2-methyl-6-amino-4-(2,4-dichlorophenoxy)pyrimidine

A mixture of 26 g. (0.16 mole) of 2,4-dichlorophenol and 2.2 g. (0.055 mole) of 2-methyl-6-amino-4-chloropyrimidine was heated at 100° C. for 4 hours and a solution of 6.0 g. of sodium hydroxide and 150 ml. of water was added thereto. This mixture was stirred until homogeneous and filtered. The resulting solid was washed with water and recrystallized from 75 ml. of 30% ethanol to yield 1.7 g. (11% of theory) of 2-methyl-6-amino-4-(2,4-dichlorophenoxy)pyrimidine; M.P. 157°–158° C.

Analysis.—Calcd. for $C_{11}H_9Cl_2N_3O$: C, 48.91; H, 3.36; Cl, 26.25; N, 15.55. Found: C, 48.61; H, 3.11; Cl, 25.92; N, 15.58.

U.V. (ethanol) 229 mμ ($\epsilon=1700$); sh. 265 mμ ($\epsilon=3600$); sh. 273 mμ ($\epsilon=2700$); sh. 281 mμ ($\epsilon=1500$). (0.01 N $H_2SO_4$) sh. 238 mμ ($\epsilon=13,450$); 266 mμ ($\epsilon=6950$); sh. 274 mμ ($\epsilon=6750$); sh. 281 mμ ($\epsilon=5600$). (0.01 N KOH) 228.5 mμ ($\epsilon=17,850$); sh. 265 mμ ($\epsilon=3750$); sh. 273 mμ ($\epsilon=2800$); sh. 281 mμ ($\epsilon=1600$).

I.R. (principal bands; mineral oil mull) 3440, 3300, 3100, 1650, 1595, 1570, 1260, 1235, 1180, 1100, 1010, 835, 825 cm.$^{-1}$.

By increasing the reaction temperature from 100° C. to 135° C. the yield of 2-methyl-6-amino-4-(2,4-dichlorophenoxy)pyrimidine, having a M.P. of 157°–158° C., was increased to 46% of theory.

Following the procedure of Example 18, Part A, but using in place of 2,4-dichlorophenol, phenol; p-chlorophenol; p-bromophenol; 2,4-dibromophenol; m-fluorophenol; 2,4,6-trichlorophenol, and the like, there are obtained 2-methyl-6-amino-4-phenoxypyrimidine;
2-methyl-6-amino-4-(p-chlorophenoxy)pyrimidine;
2-methyl-6-amino-4-(p-bromophenoxy)pyrimidine;
2-methyl-6-amino-4-(2,4-dibromophenoxy)pyrimidine;
2-methyl-6-amino-4-(m-fluorophenoxy)pyrimidine;
2-methyl-6-amino-4-(2,4,6-trichlorophenoxy)pyrimidine;

and the like, respectively.

Similarly substituting, for example, 2-ethyl-6-amino-4-chloropyrimidine;
2-propyl-6-amino-4-chloropyrimidine;
2-tert-butyl-6-amino-4-chloropyrimidine;
2-octyl-6-amino-4-chloropyrimidine;
2,5-dimethyl-6-amino-4-chloropyrimidine;
2-ethyl-5-methyl-6-amino-4-chloropyrimidine;
2-propyl-5-octyl-6-amino-4-chloropyrimidine;
2-propyl-5-tert-butyl-6-amino-4-chloropyrimidine;

and the like for 2-methyl-6-amino-4-chloropyrimidine, and following the procedure of Example 18, Part A, is productive of 2-ethyl-6-amino-4-(2,4-dichlorophenoxy)pyrimidine;
2-propyl-6-amino-4-(2,4-dichlorophenoxy)pyrimidine;
2-tert-butyl-6-amino-4-(2,4-dichlorophenoxy)pyrimidine;
2-octyl-6-amino-4-(2,4-dichlorophenoxy)pyrimidine;
2,5-dimethyl-6-amino-4-(2,4-dichlorophenoxy) pyrimidine;
2-ethyl-5-methyl-6-amino-4-(2,4-dichlorophenoxy) pyrimidine;
2-propyl-5-octyl-6-amino-4-(2,4-dichlorophenoxy) pyrimidine;
2-propyl-5-tert-butyl-6-amino-4-(2,4-dichlorophenoxy) pyrimidine;

and the like, respectively.

Also following the procedure of Example 18, Part A, but using in place of the combination of the 2-methyl-6-amino-4-chloropyrimidine and the 2,4-dichlorophenol, each of the 2-lower-alkyl-6-amino-4-chloropyrimidines and 2,5-di-lower-alkyl-6-amino-4-chloropyrimidines described above, and each of the specific halophenols mentioned above, there are obtained the corresponding 2-lower-alkyl - 6 - amino-4-phenoxypyrimidines, 2-lower-alkyl - 6 - amino - 4 - halophenoxypyrimidines, 2,5 - di-lower-alkyl-6-amino-4-phenoxypyrimidines and 2,5-di-lower-alkyl-6-amino-4-halophenoxypyrimidines.

Part B.—1,6-dihydro-1-hydroxy-2-methyl-6-imino-4-(2,4-dichlorophenoxy)pyrimidine A solution of 4.5 g. (0.0175 mole) of 2-methyl-6-amino-4-(2,4-dichlorophenoxy)pyrimidine, 100 ml. of acetone and 30 ml. of ethanol was cooled to 0° C. and 6.0 g. (0.035 mole) of m-chloroperbenzoic acid was added thereto. This mixture was stirred for 3.5 hours and filtered. The filtrate was concentrated under reduced pressure to about 30 ml. and a solution of 1.3 g. of 85% potassium hydroxide and 300 ml. of water was added. The thus-obtained mixture was filtered, the solid washed with water and recrystallized from 200 ml. of acetonitrile to yield 3.5 g. (70% of theory) of 1,6-dihydro-1-hydroxy-2 - methyl-6-imino-4-(2,4-dichlorophenoxy)pyrimidine; M.P. 214°–216° C.

U.V. (ethanol 229) mμ (ε=46,550); sl. sh. 258 mμ (ε=6950); 283 mμ (ε=2700); 296 mμ (ε=2150). (0.01 N H₂SO₄) 214 mμ (ε=35,250); 221 mμ (ε=35,150); sh. 228 mμ (ε=34,000); sh. 259 mμ (ε=5950); sh. 265 mμ (ε=5550); sh. 274 mμ (ε=4850); sh. 281 mμ (ε=3700). (0.01 N KOH) 229 mμ (ε=44,600); sh. 260 mμ (ε=7400); sh. 283 mμ (ε=2900); 296 mμ (ε=2300).

I.R. (principal bands; mineral oil mull) 3320, 3250, 3200, 1675, 1565, 1475, 1250, 1205, 870, 815 cm.⁻¹.

Following the procedure of Example 18, Part B, but using in place of m-chloroperbenzoic acid, in separate experiments, peracetic acid, perbenzoic acid, perphthalic acid, 2,4-dichloroperbenzoic acid, p-methylperbenzoic acid, m-nitroperbenzoic acid, and p-methoxyperbenzoic acid, the same product, 1,6-dihydro-1-hydroxy-2-methyl-6-imino-(2,4-dichlorophenoxy)pyrimidine is obtained.

Similarly, substituting, for example 2-ethyl-6-amino-4-(2,4-dichlorophenoxy)pyrimidine;
2-propyl-6-amino-4-(2,4-dichlorophenoxy)pyrimidine;
2-tert-butyl-6-amino-4-(2,4-dichlorophenoxy)pyrimidine;
2-octyl-6-amino-4-(2,4-dichlorophenoxy)pyrimidine;
2,5-dimethyl-6-amino-4-(2,4-dichlorophenoxy)pyrimidine;
2-ethyl-5-methyl-6-amino-4-(2,4-dichlorophenoxy)pyrimidine;
2-propyl-5-octyl-6-amino-4-(2,4-dichlorophenoxy)pyrimidine;
2-propyl-5-tert-butyl-6-amino-4-(2,4-dichlorophenoxy)pyrimidine;

and the like, for 2- methyl-6-amino-4-(2,4-dichlorophenoxy)pyrimidine, and following the procedure of Example 18, Part B, is productive of 1,6-dihydro-1-hydroxy-2-ethyl-6-imino-4-(2,4-dichlorophenoxy)pyrimidine;
1,6-dihydro-1-hydroxy-2-propyl-6-imino-4-(2,4-dichlorophenoxy)pyrimidine;
1,6-dihydro-1-hydroxy-2-tert-butyl-6-imino-4-(2,4-dichlorophenoxy)pyrimidine;
1,6-dihydro-1-hydroxy-2-octyl-6-imino-4-(2,4-dichlorophenoxy)pyrimidine;
1,6-dihydro-1-hydroxy-2,5-dimethyl-6-imino-4-(2,4-dichlorophenoxy)pyrimidine;
1,6-dihydro-1-hydroxy-2-ethyl-5-methyl-6-imino-4-(2,4-dichlorophenoxy)pyrimidine;
1,6-dihydro-1-hydroxy-2-propyl-5-octyl-6-imino-4-(2,4-dichlorophenoxy)pyrimidine;
1,6-dihydro-1-hydroxy-2-propyl-5-tert-butyl-6-imino-4-(2,4-dichlorophenoxy)pyrimidine, and the like, respectively.

Also following the procedure of Example 18, Part B, but using in place of 2methyl-6-amino-4-(2,4-dichlorophenoxy) pyrimidine each of the other 2-lower-alkyl-6-amino - 4 - phenoxypyrimidines, 2-lower-alkyl-6-amino-4-halophenoxypyrimidines, 2,5-di-lower-alkyl - 6 - amino-4-phenoxypyrimidines, and 2,5-di-lower-alkyl - 6 - amino-4-halophenoxypyrimidines, there are obtained the corresponding 1,6 - dihydro-1-hydroxy-2-lower-alkyl-6-imino-4-phenoxypyrimidines, 1,6-dihydro-1-hydroxy-2-lower-alkyl-6-imino - 4 - halophenoxypyrimidines, 1,6-dihydro - 1 - hydroxy-2,5-di-lower-alkyl-6-imino - 4 - phenoxypyrimidines, and 1,6 - dihydro-1-hydroxy-2,5-di-lower-alkyl-6-imino-4-halophenoxypyrimidines.

Part C.—1,6-dihydro-1-hydroxy-2-methyl-6-imino-4-piperidinopyrimidine

A mixture of 5.0 g. (0.017 mole) of 1,6-dihydro-1-hydroxy-2-methyl - 6 - imino-4-(2,4-dichlorophenoxy)pyrimidine and 35 ml. of piperidine was heated in a glass bomb at an oil bath temperature of 185° C. for 4 hours, cooled and concentrated to dryness. The solid was recrystallized 3 times from acetonitrile containing about 2% piperidine to yield 0.8 g. (23% of theory) of 1,6-dihydro-1-hydroxy-2-methyl-6-imino-4-piperidinopyrimidine; M.P. 200°–200.5° C.

Analysis.—Calcd. for C₁₀H₁₆N₄O: C, 57.67; H, 7.75; N, 26.90. Found: C, 57.49; H, 8.03; N, 27.15.

U.V. (ethanol) 233 mμ (ε=24,335); sh. 240 mμ (ε=23,500); 275 mμ (ε=17,790). (0.01 N H₂SO₄) 216 mμ (ε=17,170); 238 mμ (ε=26,000); 279 mμ (ε=19,550). (0.01 N KOH) 234 mμ (ε=24,750); sh. 242 mμ (ε=23,255); 276 mμ (ε=17,890).

I.R. (principal bands; mineral oil mull) 3230, 3100, 1655, 1610, 1550, 1500, 1230, 1215, 1200, 1190, 1025, 1015, 870,, 770 cm.⁻¹.

Following the procedure of Example 18, Part C, but using in place of the piperidine, dimethylamine; diethylamine; dibutylamine; N-methylbutylamine; N-ethyl-exylamine; butylamine; octylamine; diallylamine; dicrotylamine; di-(2-hexenyl)amine; N-methylallylamine; allylamine; 2-octenylamine; dibenzylamine; diphenethylamine; N-methylbenzylamine; N-ethyl - 1 - (1 - naphthylmethyl)-amine; benzylamine; 3-phenylpropylamine; cyclohexylamine; dicyclohexylamine; cyclobutylamine; N-methyl-(4-tert - butylcyclohexyl)amine; azetidine; pyrrolidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and N-methylpiperazine, there are obtained 1,6-dihydro-1-hydroxy-2-methyl-6-imino-4-dimethylaminopyrimidine;
1,6-dihydro-1-hydroxy-2-methyl-6-imino-4-diethylaminopyrimidine;
1,6-dihydro-1-hydroxy-2-methyl-6-imino-4-dibutylaminopyrimidine;
1,6-dihydro-1-hydroxy-2-methyl-6-imino-4-(N-methylbutylamino)pyrimidine;
1,6-dihydro-1-hydroxy-2-methyl-6-imino-4-(N-ethylhexylamino)pyrimidine;
1,6-dihydro-1-hydroxy-2-methyl-6-imino-4-butylaminopyriminidine;
1,6-dihydro-1-hydroxy-2-methyl-6-imino-4-octylaminopyrimidine;
1,6-dihydro-1-hydroxy-2-methyl-6-imino-4-diallylaminopyrimidine;
1,6-dihydro-1-hydroxy-2-methyl-6-imino-4-dicrotylaminopyrimidine;
1,6-dihydro-1-hydroxy-2-methyl-6-imino-4-[di-(2-hexenyl)-amino]pyrimidine;
1,6-dihydro-1-hydroxy-2-methyl-6-imino-4-(N-methylallylamino)pyrimidine;
1,6-dihydro-1-hydroxy-2-methyl-6-imino-4-allylaminopyrimidine;
1,6-dihydro-1-hydroxy-2-methyl-6-imino-4-(2-octenylamino)pyrimidine;
1,6-dihydro-1-hydroxy-2-methyl-6-imino-4-dibenzylaminopyrimidine;
1,6-dihydro-1-hydroxy-2-methyl-6-imino-4-diphenethylaminopyrimidine;
1,6-dihydro-1-hydroxy-2-methyl-6-imino-4-(N-methylbenzylamino)pyrimidine;
1,6-dihydro-1-hydroxy-2-methyl-6-imino-4-[N-ethyl-(1-naphthylmethyl)amino]pyrimidine;
1,6-dihydro-1-hydroxy-2-methyl-6-imino-4-benzylaminopyrimidine;
1,6-dihydro-1-hydroxy-2-methyl-6-imino-4-(3-phenylpropylamino)pyrimidine;
1,6-dihydro-1-hydroxy-2-methyl-6-imino-4-cyclohexylaminopyrimidine;
1,6-dihydro-1-hydroxy-2-methyl-6-imino-4-dicyclohexylaminopyrimidine;
1,6-dihydro-1-hydroxy-2-methyl-6-imino-4-cyclobutylaminopyrimidine;
1,6-dihydro-1-hydroxy-2-methyl-6-imino-4-[N-methyl-(4-tert-butylcyclohexyl)amino]pyrimidine;
1,6-dihydro-1-hydroxy-2-methyl-6-imino-4-(1-azetidinyl)pyrimidine;

1,6-dihydro-1-hydroxy-2-methyl-6-imino-4-(1-pyr-
  rolidinyl)pyrimidine;
1,6-dihydro-1-hydroxy-2-methyl-6-imino-4-[1-(2-methyl-
  pyrrolidinyl)]pyrimidine;
1,6-dihydro-1-hydroxy-2-methyl-6-imino-4-[1-(3-ethyl-
  pyrrolidinyl)]pyrimidine;
1,6-dihydro-1-hydroxy-2-methyl-6-imino-4-[1-(2,5-
  dimethylpyrrolidinyl)]pyrimidine;
1,6-dihydro-1-hydroxy-2-methyl-6-imino-4-(2-methyl-
  5-ethylpiperidino)pyrimidine;
1,6-dihydro-1-hydroxy-2-methyl-6-imino-4-(3-isopropyl-
  piperidino)pyrimidine;
1,6-dihydro-1-hydroxy-2-methyl-6-imino-4-(2,4,6-tri-
  methylpiperidino)pyrimide;
1,6-dihydro-1-hydroxy-2-methyl-6-imino-4-(1-hexahydro-
  azepinyl)pyrimidine;
1,6-dihydro-1-hydroxy-2-methyl-6-imino-4-[1-(4-tert-
  butylhexahydroazepinyl)]pyrimidine;
1,6-dihydro-1-hydroxy-2-methyl-6-imino-4-heptamethyl-
  eniminopyrimidine;
1,6-dihydro-1-hydroxy-2-methyl-6-imino-4-octamethyl-
  eniminopyrimidine;
1,6-dihydro-1-hydroxy-2-methyl-6-imino-4-morpholino-
  pyrimidine;
1,6-dihydro-1-hydroxy-2-methyl-6-imino-4-(2-ethylmor-
  pholino)pyrimidine; and
1,6-dihydro-1-hydroxy-2-methyl-6-imino-4-(4-methyl-1-
  piperazinyl, pyrimidine, respectively.

Also following the procedure of Example 18, Part C, but using in place of the piperidine, each of the primary and secondary amines corresponding to each of the specific examples of

and heterocyclic moieties within the scope of R as defined above, there are obtained the corresponding 1,6-dihydro-1-hydroxy-2-methyl-6-iminopyrimidines, substituted at the 4-position with a mono-substituted or di-substituted, including heterocyclic, amino moiety.

Also following the procedure of Example 18, Part C, but using in place of 1,6-dihydro-1-hydroxy-2-methyl-6-imino-4-(2,4-dichlorophenoxy)pyrimidine, 1,6-dihydro-1-hydroxy-2-ethyl-6-imino-4-(2,4-dichloro-
  phenoxy)pyrimidine;
1,6-dihydro-1-hydroxy-2-propyl-6-imino-4-(2,4-dichloro-
  phenoxy)pyrimidine;
1,6-dihydro-1-hydroxy-2-tert-butyl-6-imino-4-(2,4-di-
  dichlorophenoxy)pyrimidine;
1,6-dihydro-1-hydroxy-2-octyl-6-imino-4-(2,4-dichloro-
  phenoxy)pyrimidine;
1,6-dihydro-1-hydroxy-2,5-dimethyl-6-imino-4-(2,4-
  dichlorophenoxy)pyrimidine;
1,6-dihydro-1-hydroxy-2-ethyl-5-methyl-6-imino-4-(2,4-
  dichlorophenoxy)pyrimidine;
1,6-dihydro-1-hydroxy-2-propyl-5-octyl-6-imino-4-(2,4-
  dichlorophenoxy)pyrimidine;
1,6-dihydro-1-hydroxy-2-propyl-5-tert-butyl-6-imino-4-
  (2,4-dichlorophenoxy)pyrimidine;
and the like, there are obtained 1,6-dihydro-1-hydroxy-2-ethyl-6-imino-4-piperidino-
  pyrimidine;
1,6-dihydro-1-hydroxy-2-propyl-6-imino-4-piperidino-
  pyrimidine;
1,6-dihydro-1-hydroxy-2-tert-butyl-6-imino-4-piperidino-
  pyrimidine;
1,6-dihydro-1-hydroxy-2-octyl-6-imino-4-piperidino-
  pyrimidine;
1,6-dihydro-1-hydroxy-2,5-dimethyl-6-imino-4-piperi-
  dinopyrimidine;
1,6-dihydro-1-hydroxy-2-ethyl-5-methyl-6-imino-4-
  piperidinopyrimidine;
1,6-dihydro-1-hydroxy-2-propyl-5-octyl-6-imino-4-
  piperidinopyrimidine;
1,6-dihydro-1-hydroxy-2-propyl-5-tert-butyl-6-imino-
  4-piperidinopyrimidine;

and the like, respectively.

Also following the procedure of Example 18, Part C, but using in place of the combination of 1,6-dihydro-1-hydroxy - 2 - methyl - 6 - imino - 4 - (2,4 - dichlorophenoxy)pyrimidine and piperidine, each of the above-mentioned 1,6-dihydro - 1 - hydroxy - 2 - lower - alkyl - 6-imino - 4 - phenoxypyrimidines, 1,6 - dihydro - 1 - hydroxy - 2 - lower - alkyl - 6 - imino - 4 - halophenoxypyrimidines, 1,6 - dihydro - 1 - hydroxy - 2,5 - di - lower-alkyl - 6 - imino - 4 - phenoxypyrimidines, and 1,6-dihydro - 1 - hydroxy - 2,5 - di - lower - alkyl - 6 - imino-4 - halophenoxypyrimidines, and each of the above-mentioned primary and secondary amines, there are obtained the corresponding 1,6 - dihydro - 1 - hydroxy - 2-lower - alkyl - 6 - iminopyrimidines and 1,6 - dihydro-1 - hydroxy - 2,5 - di - lower - alkyl - 6 - iminopyrimidines wherein the 4-phenoxy or 4-halophenoxy substituent has been replaced with a mono-substituted or di-substituted, including hetero-cyclic, amino moiety.

EXAMPLE 19.—1,6 - DIHYDRO - 1 - HYDROXY-2-METHYL - 6 - IMINO - 5 - BROMO-4-(1 - PYRROLIDINYL)PYRIMIDINE

Part A.—2-methyl-6-amino-5-bromo-4-(2,4-dichlorophenoxy)-pyrimidine

Following the procedure of Example 11, Part A, but substituting 2 - methyl - 6 - amino - 4 - (2,4 - dichlorophenoxy)pyrimidine for 2 - amino - 6 - methyl - 4 - (2,4-dichlorophenoxy)pyrimidine is productive of 2 - methyl-6 - amino - 5 - bromo - 4 - (2,4 - dichlorophenoxy)pyrimidine.

Following the procedure of Example 11, Part A, making the same substitution, and in addition, substituting N-chlorosuccinimide for N-bromosuccinimide there is obtained the corresponding 2 - methyl - 6 - amino - 5-chloro - 4 - (2,4 - dichlorophenoxy) - pyrimidine.

Also following the procedure of Example 11, Part A, but substituting other 2 - lower - alkyl - 6 - amino - 4-phenoxypyrimidines and 2 - lower - alkyl - 6 - amino-4-halophenoxypyrimidines, such as 2-ethyl-6-amino-4-phenoxypyrimidine;
2-propyl-6-amino-4-phenoxypyrimidine;
2-tert-butyl-6-amino-4-phenoxypyrimidine;
2-octyl-6-amino-4-phenoxypyrimidine;

and the like, and 2-ethyl-6-amino-4-(2,4-dichlorophenoxy)pyrimidine;
2-propyl-6-amino-4-(2,4-dichlorophenoxy)pyrimidine;
2-tert-butyl-6-amino-4-(2,4-dichlorophenoxy)pyrimidine;
2-octyl-6-amino-4-(2,4-dichlorophenoxy)pyrimidine;

and the like, for 2-amino-6-methyl-4-(2,4-dichlorophenoxy)pyrimidine there are obtained the corresponding 5-bromo compounds, such as, 2-ethyl-6-amino-5-bromo-4-phenoxypyrimidine;
2-propyl-6-amino-5-bromo-4-phenoxypyrimidine;
2-tert-butyl-6-amino-5-bromo-4-phenoxypyrimidine;
2-octyl-6-amino-5-bromo-4-phenoxypyrimidine;

and the like, and 2-ethyl-6-amino-5-bromo-4-(2,4-dichlorophenoxy)
  pyrimidine;
2-propyl-6-amino-5-bromo-4-(2,4-dichlorophenoxy)
  pyrimidine;
2-tert-butyl-6-amino-5-bromo-4-(2,4-dichlorophenoxy)
  pyrimidine;
2-octyl-6-amino-5-bromo-4-(2,4-dichlorophenoxy)
  pyrimidine, and the like, respectively.

Likewise, by reacting the appropriate 2-lower-alkyl-6-amino - 4 - phenoxypyrimidines and 2 - lower - alkyl-6 - amino - 4 - halophenoxypyrimidines with N - chlorosuccinimide there are obtained 2 - lower - alkyl - 6-amino - 5 - chloro - 4 - phenoxypyrimidines and 2 - lower-alkyl-6-amino-5-chloro-4-halophenoxypyrimidines.

Part B.—1,6-dihydro-1-hydroxy-2-methyl-6-imino-5-bromo-4-(2,4-dichlorophenoxy)pyrimidine Following the procedure of Example 11, Part B, but substituting 2 - methyl - 6 - amino - 5 - bromo - 4 - (2,4-dichlorophenoxy)pyrimidine for 2-amino - 6 - methyl-5 - bromo - 4 - 2,4 - dichlorophenoxy)pyrimidine is productive of 1,6 - dihydro - 1 - hydroxy - 2 - methyl - 6-imino - 5 - bromo - 4 - (2,4 - dichlorophenoxy)pyrimidine.

Following the procedure of Example 11, Part B, making the same substitution, and in addition, substituting in place of m-chloroperbenzoic acid, in separate experiments, peracetic acid; perbenzoic acid, perphthalic acid; 2,4-dichloroperbenzoic acid; p-methylperbenzoic acid; m-nitroperbenzoic acid; and p-methoxyperbenzoic acid, the same product, 1,6 - dihydro - 1 - hydroxy - 2 - methyl - 6-imino - 5 - bromo - 4 - (2,4 - dichlorophenoxy)pyrimidine, is obtained.

Also following the procedure of Example 11, Part B, but substituting other 2 - lower - alkyl - 6 - amino - 5-bromo - 4 - phenoxy - pyrimidines and 2 - lower - alkyl-6-amino-5-bromo-4-halophenoxypyrimidines, such as 2-ethyl-6-amino-5-bromo-4-phenoxypyrimidine,
2-propyl-6-amino-5-bromo-4-phenoxypyrimidine,
2-tert-butyl-6-amino-5-bromo-4-phenoxypyrimidine,
2-octyl-6-amino-5-bromo-4-phenoxypyrimidine, and the like, and 2-ethyl-6-amino-5-bromo-4-(2,4-dichlorophenoxy)
pyrimidine;
2-propyl-6-amino-5-bromo-4-(2,4-dichlorophenoxy)
pyrimidine;
2-tert-butyl-6-amino-5-bromo-4-(2,4-dichlorophenoxy)
pyrimidine;
2-octyl-6-amino-5-bromo-4-(2,4-dichlorophenoxy)
pyrimidine;

and the like, is productive of 1,6-dihydro-1-hydroxy-2-ethyl-6-imino-5-bromo-4-
phenoxypyrimidine;
1,6-dihydro-1-hydroxy-2-propyl-6-imino-5-bromo-4-
phenoxypyrimidine;
1,6-dihydro-1-hydroxy-2-tert-butyl-6-imino-5-bromo-4-
phenoxypyrimidine;
1,6-dihydro-1-hydroxy-2-octyl-6-imino-5-bromo-4-
phenoxypyrimidine;

and the like, and 1,6-dihydro-1-hydroxy-2-ethyl-6-imino-5-bromo-4-
(2,4-dichlorophenoxy)pyrimidine;
1,6-dihydro-1-hydroxy-2-propyl-6-imino-5-bromo-4-
(2,4-dichlorophenoxy)pyrimidine;
1,6-dihydro-1-hydroxy-2-tert-butyl-6-imino-5-bromo-4-
(2,4-dichlorophenoxy)pyrimidine;
1,6-dihydro-1-hydroxy-2-octyl-6-imino-5-bromo-4-
(2,4-dichlorophenoxy)pyrimidine;

and the like, respectively.

Likewise, by reacting the appropriate 2-lower-alkyl-6-amino - 5 - chloro-4-phenoxypyrimidines and 2-lower-alkyl - 6 - amino - 5 - chloro - 4 - (2,4 - dichlorophenoxy)-pyrimidines, there are obtained the corresponding 1,6 - dihydro - 1 - hydroxy - 2 - lower - alkyl - 6 - imino-5 - chloro - 4 - phenoxypyrimidines and 1,6 - dihydro-1 - hydroxy - 2 - lower - alkyl - 6 - imino - 5 - chloro-4 - halophenoxypyrimidines.

Part C.—1,6-dihydro-1-hydroxy-2-methyl-6-imino-5-bromo-4-(1-pyrrolidinyl)pyrimidine Following the procedure of Example 11, Part C, but substituting 1,6 - dihydro - 1-hydroxy-2-methyl-6-imino-5-bromo-4-(2,4-dichlorophenoxy)pyrimidine for 1,2-dihydro - 1-hydroxy - 2-imino-6-methyl-5-bromo-4-(2,4-dichlorophenoxy)pyrimidine is productive of 1,6-dihydro-1-hydroxy - 2 - methyl-6-imino-5-bromo-4-(1-pyrrolidinyl)pyrimidine.

Following the procedure of Example 11, Part C, using the 1,6-dihydro compound and using in place of the pyrrolidine, dimethylamine; diethylamine; dibutylamine; N - methylbutylamine; N - ethylhexylamine; butylamine; octylamine; diallylamine; dicrotylamine; di-(2-hexenyl)-amine; N-methylallylamine; allylamine; 2-octenylamine; dibenzylamine; diphenethylamine; N-methylbenzylamine; N-ethyl-(1-naphthylmethyl)amine; benzylamine; 3-phenylpropylamine; cyclohexylamine; dicyclohexylamine; cyclobutylamine; N - methyl-(4-tert-butylcyclohexyl)amine; azetidine; piperidine; 2-methylpyrrolidine; 3-ethylpyrrolidine; 2,5-dimethylpyrrolidine; 2-methyl-5-ethylpiperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and N-methylpiperazine, there are obtained 1,6-dihydro-1-hydroxy-2-methyl-6-imino-5-bromo-
4-dimethylaminopyrimidine;
1,6-dihydro-1-hydroxy-2-methyl-6-imino-5-bromo-4-
diethylaminopyrimidine;
1,6-dihydro-1-hydroxy-2-methyl-6-imino-5-bromo-4-
dibutylaminopyrimidine;
1,6-dihydro-1-hydroxy-2-methyl-6-imino-5-bromo-
4-(N-methylbutylamino)pyrimidine;
1,6 - dihydro - 1-hydroxy-2-methyl-6-imino-5-bromo-4-(N-
ethylhexylamino)pyrimidine;
1,6-dihydro-1-hydroxy-2-methyl-6-imino-5-bromo-4-
butylaminopyrimidine;
1,6-dihydro-1-hydroxy-2-methyl-6-imino-5-bromo-4-
octylaminopyrimidine;
1,6-dihydro-1-hydroxy-2-methyl-6-imino-5-bromo-4-
diallylaminopyrimidine;
1,6-dihydro-1-hydroxy-2-methyl-6-imino-5-bromo-4-
dicrotylaminopyrimidine;
1,6-dihydro-1-hydroxy-2-methyl-6-imino-5-bromo
4-[di-(2-hexenyl)amino]pyrimidine;
1,6-dihydro-1-hydroxy-2-methyl-6-imino-5-bromo-4-
(N-methylallylamino)pyrimidine;
1,6-dihydro-1-hydroxy-2-methyl-6-imino-5-bromo-4-
allylaminopyrimidine;
1,6-dihydro-1-hydroxy-2-methyl-6-imino-5-bromo-4-(2-
octenylamino)pyrimidine;
1,6-dihydro-1-hydroxy-2-methyl-6-imino-5-bromo-4-
dibenzylaminopyrimidine;
1,6-dihydro-1-hydroxy-2-methyl-6-imino-5-bromo-4-di-
phenethylaminopyrimidine;
1,6-dihydro-1-hydroxy-2-methyl-6-imino-5-bromo-
4-(N-methylbenzylamino)pyrimidine;
1,6-dihydro-1-hydroxy-2-methyl-6-imino-5-bromo-
4-[N-ethyl-(1-naphthylmethyl)amino]pyrimidine;
1,6-dihydro-1-hydroxy-2-methyl-6-imino-5-bromo-4-
benzylaminopyrimidine;
1,6-dihydro-1-hydroxy-2-methyl-6-imino-5-bromo-4-(3-
phenylpropylamino)pyrimidine;
1,6-dihydro-1-hydroxy-2-methyl-6-imino-5-bromo-4-
cyclohexylaminopyrimidine;
1,6-dihydro-1-hydroxy-2-methyl-6-imino-5-bromo-4-di-
cyclohexylaminopyrimidine;
1,6-dihydro-1-hydroxy-2-methyl-6-imino-5-bromo-4-
cyclobutylaminopyrimidine;
1,6-dihydro-1-hydroxy-2-methyl-6-imino-5-bromo-4-[N-
methyl-(4-tert-butylcyclohexyl)amino]pyrimidine;
1,6-dihydro-1-hydroxy-2-methyl-6-imino-5-bromo-4-
(1-azetidinyl)pyrimidine;

1,6-dihydro-1-hydroxy-2-methyl-6-imino-5-bromo-4-piperidinopyrimidine;
1,6-dihydro-1-hydroxy-2-methyl-6-imino-5-bromo-4-[1-(2-methylpyrrolidinyl)]pyrimidine;
1,6-dihydro-1-hydroxy-2-methyl-6-imino-5-bromo-4-[1-(3-ethylpyrrolidinyl)]pyrimidine;
1,6-dihydro-1-hydroxy-2-methyl-6-imino-5-bromo-4-[1-(2,5-dimethylpyrrolidinyl)]pyrimidine;
1,6-dihydro-1-hydroxy-2-methyl-6-imino-5-bromo-4-(2-methyl-5-ethylpiperidino)pyrimidine;
1,6-dihydro-1-hydroxy-2-methyl-6-imino-5-bromo-4-(3-isopropylpiperidino)pyrimidine;
1,6-dihydro-1-hydroxy-2-methyl-6-imino-5-bromo-4-(2,4,6-trimethylpiperidino)pyrimidine;
1,6-dihydro-1-hydroxy-2-methyl-6-imino-5-bromo-4-(1-hexahydroaxepinyl)pyrimidine;
1,6-dihydro-1-hydroxy-2-methyl-6-imino-5-bromo-4-[1-(4-tert-butylhexahydroazepinyl)]pyrimidine;
1,6-dihydro-1-hydroxy-2-methyl-6-imino-5-bromo-4-heptamethyleniminopyrimidine;
1,6-dihydro-1-hydroxy-2-methyl-6-imino-5-bromo-4-octamethyleniminopyrimidine;
1,6-dihydro-1-hydroxy-2-methyl-6-imino-5-bromo-4-morpholinopyrimidine;
1,6-dihydro-1-hydroxy-2-methyl-6-imino-5-bromo-4-(2-ethylmorpholino)pyrimidine; and
1,6-dihydro-1-hydroxy-2-methyl-6-imino-5-bromo-4-(4-methyl-1-piperazinyl)pyrimidine, respectively.

Also following the procedure of Example 11, Part C, using the 1,6-dihydro compound and using in place of the pyrrolidine, each of the primary and secondary amines corresponding to each of the specific examples of

and heterocyclic moieties within the scope of R as defined above, there are obtained the corresponding 1,6-dihydro-1-hydroxy-2-methyl-6-imino-5-bromopyrimidine, substituted at the 4-position with a mono-substituted or di-substituted, including heterocyclic, amino moiety.

Also following the procedure of Example 11, Part C, but using in place of 1,2-dihydro-1-hydroxy-2-imino-6-methyl-5-bromo-4-(2,4-dichlorophenoxy)pyrimidine, 1,6-dihydro-1-hydroxy-2-ethyl-6-imino-5-bromo-4-phenoxypyrimidine;
1,6-dihydro-1-hydroxy-2-propyl-6-imino-5-bromo-4-phenoxypyrimidine;
1,6-dihydro-1-hydroxy-2-tert-butyl-6-imino-5-bromo-4-phenoxypyrimidine;
1,6-dihydro-1-hydroxy-2-octyl-6-imino-5-bromo-4-phenoxypyrimidine;

and the like, and 1,6-dihydro-1-hydroxy-2-ethyl-6-imino-5-bromo-4-(2,4-dichlorophenoxy)pyrimidine;
1,6-dihydro-1-hydroxy-2-tert-butyl-6-imino-5-bromo-4-(2,4-dichlorophenoxy)pyrimidine;
1,6-dihydro-1-hydroxy-2-tert-butyl-6-imino-5-bromo-4-(2,4-dichlorophenoxy)pyrimidine;
1,6-dihydro-1-hydroxy-2-octyl-6-imino-5-bromo-4-(2,4-dichlorophenoxy)pyrimidine;

and the like, there are obtained 1,6-dihydro-1-hydroxy-2-ethyl-6-imino-5-bromo-4-(1-pyrrolidinyl)pyrimidine;
1,6-dihydro-1-hydroxy-2-propyl-6-imino-5-bromo-4-(1-pyrrolidinyl)pyrimidine;
1,6-dihydro-1-hydroxy-2-tert-butyl-6-imino-5-bromo-4-(1-pyrrolidinyl)pyrimidine;
1,6-dihydro-1-hydroxy-2-octyl-6-imino-5-bromo-4-(1-pyrrolidinyl)pyrimidine;

and the like, respectively.

Also following the procedure of Example 11, Part C, but using in place of the combination of 1,2-dihydro-1-hydroxy-2-imino-6-methyl-5-bromo-4-(2,4-dichlorophenoxy)pyrimidine and the pyrrolidine, each of the above-mentioned 1,6-dihydro-1-hydroxy-2-lower-alkyl-6-imino-5-bromo-4-halophenoxypyrimidines and 1,6-dihydro-1-hydroxy-2-lower-alkyl-6-imino-5-bromo-4-phenoxypyrimidines, and each of the above-mentioned primary and secondary amines, there are obtained the corresponding 1,6-dihydro-1-hydroxy-2-lower-alkyl-6-imino-5-bromopyrimidines wherein the 4-phenoxy or 4-halophenoxy substituent has been replaced with a mono-substituted or di-substituted, including heterocyclic, amino moiety.

EXAMPLE 20.—1,6 - DIHYDRO - 1 - HYDROXY-2-METHYL - 6 - IMINO - 5-NITRO-4-PIPERIDINOPYRIMIDINE

Following the procedure of Example 12, but substituting 1,6-dihydro-1-hydroxy-2-methyl-6-imino-4-piperidinopyrimidine for 1,2-dihydro-1-hydroxy-2-imino-6-methyl-4-piperidinopyrimidine is productive of 1,6-dihydro-1-hydroxy-2-methyl-6-imino-5-nitro-4-piperidinopyrimidine.

Following the procedure of Example 12, but using in place of the 1,2-dihydro-1-hydroxy-2-imino-6-methyl-4-piperidinopyrimidine, each of the specific 1,6-dihydro-1-hydroxy-2-lower-alkyl-6-iminopyrimidines substituted at the 4-position with a mono-substituted or di-substituted, including heterocyclic, amino moiety, and unsubstituted at the 5-position, there are obtained the corresponding 1,6-dihydro - 1 - hydroxy-2-lower-alkyl-6-imino-5-nitropyrimidines substituted at the 4-position as in the reactants.

EXAMPLE 21.—1,6 - DIHYDRO - 1 - HYDROXY - 2-METHY-6-IMINO-5-AMINO - 4 - PIPERIDINOPYRIMIDINE

Following the procedure of Example 13, but substituting 1,6 - dihydro - 1-hydroxy-2-methyl-6-imino-5-nitro-4-piperidinopyrimidine for 1,2-dihydro-1-hydroxy-2-imino-6-methyl-5-nitro-4-piperidinopyrimidine is productive of 1,6 - dihydro - 1 - hydroxy-2-methyl-6-imino-5-amino-4-piperidinopyrimidine.

Following the procedure of Example 13, but using in place of 1,2-dihydro-1-hydroxy-2-imino-6-methyl-5-nitro-4-piperidinopyrimidine, each of the above-mentioned 1,6-dihydro - 1 - hydroxy - 2-lower - alkyl-6-imino-5-nitropyrimidines substituted at the 4-position with a mono-substituted or di-substituted, including heterocyclic, amino moiety is catalytically hydrogenated to give the corresponding 1,6 - dihydro-1-hydroxy-2-lower-alkyl-6-imino-5-aminopyrimidine substituted at the 4-position as in the reactant.

EXAMPLE 22.—1,6 - DIHYDRO - 1 - HYDROXY - 2-METHYL - 6 - IMINO - 4,5 - BIS(1 - PYRROLIDINYL)PYRIMIDINE

Following the procedure of Example 14, but substituting 1,6-dihydro-1-hydroxy-2-methyl-6-imino-5-bromo-4-(1-pyrrolidinyl)pyrimidine for 1,2-dihydro-1-hydroxy-2-imino-6-methyl-5-bromo-4-(1-pyrrolidinyl)pyrimidine is productive of 1,6-dihydro-1-hydroxy-2-methyl-6-imino-4,5-bis(1-pyrrolidinyl)pyrimidine.

Following the procedure of Example 14, but using in place of 1,2-dihydro-1-hydroxy-2-imino-6-methyl-5-bromo-4-(1-pyrrolidinyl)pyrimidine each of the above-described 1,6 - dihydro-1-hydroxy-2-lower-alkyl-6-imino-5-bromopyrimidines and 1,6-dihydro-1-hydroxy-2-lower-alkyl-6-imino-5-chloropyrimidines substituted at the 4-position with a mono-substituted or di-substituted, including heterocyclic, amino moiety is productive of the corresponding 1,6 - dihydro-1-hydroxy-2-lower-alkyl-6-imino-5-(1-pyrrolidinyl)pyrimidine substituted in the 4-position as in the reactant.

Also following the procedure of Example 14, but using in place of the pyrrolidine, each of the primary and secondary amines corresponding to each of the specific examples of

and heterocyclic moieties within the scope of R as defined above, and substituting the appropriate 1,6-dihydro-1-hydroxy - 2 - lower-alkyl-6-imino-5-bromo-4-R-pyrimidines or 1,6-dihydro-1-hydroxy-2-lower-alkyl-6-imino-5-chloro-4-R-pyrimidines, wherein R is defined as above, there are obtained the corresponding 1,6 - dihydro - 1-hydroxy-2-lower-alkyl-6-iminopyrimidines, substituted at the 4- and 5-positions with a mono-substituted or di-substituted, including heterocyclic, amino moiety.

EXAMPLE 23.—1,6 - DIHYDRO - 1 - HYDROXY - 2-METHYL - 6 - IMINO - 5 - (P - CHLOROPHENYLTHIO) - 4 - (1 - PYRROLIDINYL)PYRIMIDINE

Following the procedure of Example 16, but substituting 1,6 - dihydro-1-hydroxy-2-methyl-6-imino-5-bromo-4-(1-pyrrolidinyl)pyrimidine for 1,2-dihydro-1-hydroxy-2 - imino-6-methyl-5-bromo-4-(1-pyrrolidinyl)pyrimidine is productive of 1,6-dihydro-1-hydroxy-2-methyl-6-imino-5-(p-chlorophenylthio)-4-(1-pyrrolidinyl)pyrimidine.

Following the procedure of Example 16, but substituting for p-chlorothiophenol, thiophenol; p-methylthiophenol, o-ethylthiophenol; m-bromothiophenol; o-fluorothiophenol; p-nitrothiophenol; and o-aminothiophenol; and the like, and substituting the above-mentioned 1,6-dihydro compound for the 1,2-dihydro compound, there are obtained 1,6 - dihydro-1-hydroxy-2-methyl-6-imino-5-phenylthio-4-(1-pyrrolidinyl)pyrimidine;
1,6 - dihydro - 1-hydroxy-2-methyl-6-imino-5-(p-methylphenylthio)-4-(1-pyrrolidinyl)pyrimidine;
1,6 - dihydro-1-hydroxy-2-methyl-6-imino-5-(o-ethylphenylthio)-4-(1-pyrrolidinyl)pyrimidine;
1,6 - dihydro - 1-hydroxy-2-methyl-6-imino-5-(m-bromophenylthio)-4-(1-pyrrolidinyl)pyrimidine;
1,6 - dihydro - 1 - hydroxy-2-methyl-6-imino-5-(o-fluorophenylthio)-4-(1-pyrrolidinyl)pyrimidine;
1,6 - dihydro-1-hydroxy-2-methyl-6-imino-5-(p-nitrophenylthio)-4-(1-pyrrolidinyl)pyrimidine;
1,6 - dihydro - 1-hydroxy-2-methyl-6-imino-5-(o-aminophenylthio)-4-(1-pyrrolidinyl)pyrimidine;

and the like respectively.

Also following the procedure of Example 16, but substituting 1,6 - dihydro-1-hydroxy-2-lower-alkyl-6-imino-5-bromopyrimidines and 1,6-dihydro-1-hydroxy-2-lower-alkyl-6-imino-5-chloropyrimidines substituted at the 4-position with mono-substituted and di-substituted, including heterocyclic, amino moieties, there are obtained the corresponding 1,6-dihydro-1-hydroxy-2-lower-alkyl-6-imino-5-(p-chlorophenylthio)pyrimidines, substituted at the 4-position as in the reactant.

Also following the procedure of Example 16, but substituting for the combination of the 1,2-dihydro-1-hydroxy-2 - imino-6-methyl-5-bromo-4-(1-pyrrolidinyl)pyrimidine and p-chlorothiophenol, each of the above-mentioned 1,6-dihydro - 1 - hydroxy - 2-lower-alkyl-6-imino-5-bromopyrimidines and 1,6 - dihydro-1-hydroxy-2-lower-alkyl-6-imino-5-chloropyrimidines substituted at the 4-position with mono-substituted and di-substituted, including heterocyclic, amino moieties, and each of the other above-mentioned thiophenols within the scope of Formula XIV, above, there are obtained the corresponding 1,6-dihydro-1 - hydroxy-2-lower-alkyl-6-iminopyrimidines, substituted at the 4-position as in the pyrimidine reactant and substituted at the 5-position with an arylthio moiety corresponding to the particular thiophenol used.

EXAMPLE 24.—1,2 - DIHYDRO - 1 - HYDROXY - 2-IMINO - 6 - METHYL - 4 - PIPERIDINOPYRIMIDINE MONOHYDROCHLORIDE

To an absolute ethanol solution of 1,2-dihydro-1-hydroxy-2-imino-6-methyl - 4 - piperidinopyrimidine there is added absolute ethanol containing one equivalent of hydrogen chloride followed by the addition of about 4 volumes of diethyl ether to yield the corresponding 1,2-dihydro-1-hydroxy-2-imino-6-methyl - 4 - piperidinopyrimidine monohydrochloride.

Similar separate use of benzoic acid, lactic acid, maleic acid, phosphoric acid, sulfuric acid, and succinic acid gives the corresponding acid addition salts.

Following the procedure of Example 24, each of the above-mentioned 1,2-dihydro-1-hydroxypyrimidines and 1,6-dihydro-1-hydroxypyrimidines is transformed to the corresponding hydrochloric acid, benzoic acid, lactic acid, maleic acid, phosphoric acid, sulfuric acid, and succinic acid addition salts.

EXAMPLE 25.—1,2 - DIHYDRO - 1 - HYDROXY - 2-ACETYLIMINO - 6 - METHYL - 4 - PIPERIDINOPYRIMIDINE

A mixture of 1,2-dihydro-1-hydroxy-2-imino-6-methyl-4-piperidinopyrimidine (4.1 g.), acetic anhydride (4.0 ml.), and diethyl ether (200 ml.) is stirred at 25° C. for 60 hours. The solid which forms is filtered and washed with ether to give a solid which is recrystallized from dimethylformamide to give 1,2-dihydro-1-hydroxy-2-acetylimino-6-methyl-4-piperidinopyrimidine.

Following the procedure of Example 25 but using acetyl chloride in place of the acetic anhydride, the same product is obtained. Also following the procedure of Example 25 but using in place of the acetic anhydride, propionic anhydride; crotonic anhydride; cyclohexanecarboxylic anhydride; isobutyryl chloride; decanoyl chloride; phenylacetyl chloride; 3-methoxybutyric anhydride; p-tert-butylcyclohexanecarbonyl chloride; and p-nitrophenylacetyl chloride, there are obtained 1,2 - dihydro - 1-hydroxy-2-propionylimino-6-methyl-4-piperidinopyrimidine;
1,2 - dihydro - 1-hydroxy-2-crotonoylimino-6-methyl-4-piperidinopyrimidine;
1,2 - dihydro - 1-hydroxy-2-cyclohexanecarbonylimino-6-methyl-4-piperidinopyrimidine;
1,2 - dihydro - 1-hydroxy-2-isobutyrylimino-6-methyl-4-piperidinopyrimidine;
1,2-dihydro-1-hydroxy-2-decanoylimino-6-methyl-4-piperidinopyrimidine;
1,2-dihydro-1-hydroxy-2-phenylacetylimino-6-methyl-4-piperidinopyrimidine;
1,2-dihydro-1-hydroxy-2-(3-methoxybutyrylimino)-6-methyl-4-piperidinopyrimidine;
1,2-dihydro-1-hydroxy-2-(p-tert-butylcyclohexanecarbonylimino)-6-methyl-4-piperidinopyrimidine; and
1,2-dihydro-1-hydroxy-2-(p-nitrophenylacetylimino)-6-methyl-4-piperidinopyrimidine, respectively.

Also following the procedure of Example 25, but using in place of the 1,2 - dihydro - 1 - hydroxy-2-imino-6-methyl - 4 - piperidinopyrimidine, each of the above-mentioned 1,2 - dihydro - 1 - hydroxy-2-iminopyrimidines and 1,6 - dihydro - 1 - hydroxy-6-iminopyrimidines, substituted at the 4-position with a mono-substituted or di-substituted, including heterocyclic, amino moiety or with a phenoxy or halophenoxy moiety, and unsubstituted at the 5-position or substituted at the 5-position with $R_2$ as defined above, there are obtained the corresponding 1,2 - dihydro - 1 - hydroxy-2-acetyliminopyrimides and 1,6 - dihydro - 1 - hydroxy-6-acetyliminopyrimidines substituted at the 4-position and at the 5-position as in the reactant.

Also following the procedure of Example 25, but using in place of the combination of the 1,2-dihydro-1-hydroxy- 2 - imino - 6 - methyl-4-piperidinopyrimidine and the acetic anhydride, each of the above-mentioned 1,2-dihydro - 1 - hydroxy - 2 - iminopyrimidines, and 1,6-dihydro-1-hydroxy - 6 - iminopyrimidines, variously substituted at the 4-position as above-described and unsubstituted or variously substituted at the 5-position as above-described, and each of the above-mentioned carboxylic acid anhydrides or each of the above-mentioned carboxylic acid chlorides, there are obtained the corresponding 1,2-dihydro - 1 - hydroxy - 2 - carboxyacyliminopyrimidines and 1,6 - dihydro - 1 - hydroxy-6-carboxyacyliminopyrimidines substituted at the 4-position and at the 5-position as in the reactant.

The following examples relate to the use of the novel compounds of this invention as antihypertensive agents. Each example relates to that use of 1,2 - dihydro - 1 - hydroxy - 2 - imino - 6 - methyl-4-piperidinopyrimidine. The other Formula IA, IIA and VIA (and IB, IIB and VIB) novel compounds of this invention, including the free bases and acid addition salts thereof, can be used in a similar manner, and these examples should not be construed as limiting.

EXAMPLE 26.—TABLETS 20,000 scored tablets for oral use, each containing 200 mg. of 1,2 - dihydro - 1 - hydroxy-2-imino-6-methyl-4-piperidino-pyrimidine free base are prepared from the following ingredients:

| | Gm. |
|---|---|
| 1,2 - dihydro - 1-hydroxy-2-imino-6-methyl-4-piperidinopyrimidine micronized | 4000 |
| Starch, U.S.P. | 350 |
| Talc, U.S.P. | 250 |
| Calcium stearate | 35 |

The micronized 1,2 - dihydro - 1 - hydroxy-2-imino-6-methyl - 4 - piperidinopyrimidine free base is granulated with a 4 percent w./v. aqueous solution of methylcellulose U.S.P. (1500 cps.). To the dried granules is added a mixture of the remainder of the ingredients and the final mixture is compressed into tablets of proper weight. Satisfactory clinical response is obtained in adults showing hypertension with 1 tablet which can be repeated in 4 hours, if necessary. For moderate conditions, a half tablet is used.

EXAMPLE 27.—CAPSULES 20,000 two-piece hard gelatin capsules for oral use, each containing 100 mg. of 1,2 - dihydro-1-hydroxy-2-imino - 6 - methyl - 4 - piperidinopyrimidine free base are prepared from the following ingredients:

| | Gm. |
|---|---|
| 1,2 - dihydro - 1-hydroxy-2-imino-6-methyl-4-piperidinopyrimide | 2000 |
| Lactose, U.S.P. | 1000 |
| Starch, U.S.P. | 300 |
| Talc, U.S.P. | 65 |
| Calcium stearate | 25 |

The micronized 1,2 - dihydro - 1 - hydroxy-2-imino-6-methyl - 4 - piperidinopyrimidine free base is mixed with the starch-lactose mixture followed by the talc and calcium stearate. The final mixture is then encapsulated in the usual manner. One capsule is used every 3 hours to control hypertension.

Capsules containing 10, 25, 50 and 350 mg. of 1,2-dihydro - 1 - hydroxy - 2 - imino-6-methyl-4-piperidinopyrimidine free base are also prepared by substituting 200, 500, 1000 and 7000 gm. for 2000 gm. in the above formulation.

EXAMPLE 28.—SOFT ELASTIC CAPSULES

One-piece soft elastic capsules for oral use, each containing 5 mg. of 1,2 - dihydro - 1 - hydroxy-2-imino-6-methyl - 4 - piperidinopyrimidine free base are prepared in the usual manner by first dispersing the powdered active material in sufficient corn oil to render the material capsulatable.

EXAMPLE 29.—AQUEOUS PREPARATION

An aqueous preparation for oral use containing in each 5 ml., 50 mg. of 1,2-dihydro-1-hydroxy-2-imino-6-methyl-4-piperidinopyrimidine hydrochloride is prepared from the following ingredients:

| | | |
|---|---|---|
| 1,2-dihydro-1-hydroxy-2-imino-6-methyl-4-piperidinopyrimidine hydrochloride | gm | 100 |
| Methylparaben, U.S.P. | gm | 7.5 |
| Propylparaben, U.S.P. | gm | 2.5 |
| Saccharin sodium | gm | 12.5 |
| Cyclamate sodium | gm | 2.5 |
| Glycerin | ml | 3000 |
| Tragacanth powder | gm | 10 |
| Orange oil flavor | gm | 10 |
| F.D. and C. Orange Dye | gm | 7.5 |
| Deionized water, q.s. to 10,000 ml. | | |

EXAMPLE 30.—PARENTERAL SUSPENSION

A sterile aqueous suspension suitable for intramuscular injection and containing in each milliliter, 25 mg. of 1,2 - dihydro - 1 - hydroxy - 2 - imino - 6 - methyl - 4-piperidinopyrimidine free base is prepared from the following ingredients:

| | Gm. |
|---|---|
| Polyethylene glycol 4000, U.S.P. | 3 |
| Sodium chloride | 0.9 |
| Polysorbate 80, U.S.P. | 0.4 |
| Sodium metabisulfite | 0.1 |
| Methylparaben, U.S.P. | 0.18 |
| Propylparaben, U.S.P. | 0.02 |
| 1,2-dihydro-1-hydroxy-2-imino-6-methyl-4-piperidinopyrimidine free base (micronized) | 2.5 |
| Water for injection, q.s. to 100 ml. | |

EXAMPLE 31.—AQUEOUS SOLUTION

An aqueous solution for oral use and containing in each 5 ml., 25 mg. of 1,2-dihydro-1-hydroxy-2-imino-6-methyl-4-piperidinopyrimidine free base is prepared from the following ingredients:

| | Gm. |
|---|---|
| 1,2-dihydro-1-hydroxy-2-imino-6-methyl-4-piperidinopyrimidine free base | 5 |
| Deionized water, q.s. to 1000 ml. | |

EXAMPLE 32.—PARENTERAL SOLUTION

A sterile aqueous solution for intravenous or intramuscular injection and containing 20 mg. of 1,2-dihydro-1 - hydroxy - 2 - imino - 6 - methyl - 4 - piperidinopyrimidine maleate in each 2 ml. is prepared from the following ingredients:

| | Gm. |
|---|---|
| 1,2-dihydro-1-hydroxy-2-imino-6-methyl-4-piperidinopyrimidine maleate | 10 |
| Chlorobutanol | 3 |
| Water for injection, q.s. to 1000 ml. | |

EXAMPLE 33.—CAPSULES

One thousand hard gelatin capsules for oral use, each containing 25 mg. of 1,2-dihydro-1-hydroxy-2-imino-6-methyl-4-piperidinopyrimidine free base and 25 mg. of hydrochlorothiazide are prepared from the following ingredients:

| | Gm. |
|---|---|
| 1,2-dihydro-1-hydroxy-2-imino-6-methyl-4-piperidinopyrimidine free base micronized | 25 |
| Hydrochlorothiazide | 25 |
| Starch | 125 |
| Talc | 25 |
| Magnesium stearate | 15 |

One capsule 2 to 4 times a day is advantageous in the relief of moderate to severe hypertension in adult humans.

EXAMPLE 34.—CAPSULES

One thousand hard gelatin capsules for oral use, each containing 50 mg. of 1,2-dihydro-1-hydroxy-2-imino-6-methyl-4-piperidinopyrimidine free base, 25 mg. of hydrochlorothiazide, 0.1 mg. of reserpine, and 400 mg. of potassium chloride are prepared from the following ingredients:

| | Gm. |
|---|---|
| 1,2-dihydro-1-hydroxy-2-imino-6-methyl-4-piperidinopyrimidine free base micronized | 50 |
| Hydrochlorothiazide | 25 |
| Reserpine | 0.1 |
| Potassium chloride | 400 |
| Talc | 75 |
| Magnesium stearate | 20 |

One or two capsules daily is advantageously used for reducing hypertension.

EXAMPLE 35.—TABLETS

Ten thousand tablets for oral use, each containing 50 mg. of 1,2 - dihydro - 1 - hydroxy - 2 - imino - 6 - methyl-4-piperidinopyrimidine free base and 25 mg. of chlorisondamine chloride, are prepared from the following ingredients:

| | Gm. |
|---|---|
| 1,2-dihydro-1-hydroxy-2-imino-6-methyl-4-piperidinopyrimidine free base | 500 |
| Chlorisondamine chloride | 250 |
| Lactose | 1200 |
| Corn starch | 500 |
| Talc | 500 |
| Calcium stearate | 25 |

The powdered ingredients are thoroughly mixed and slugged. The slugs are broken down into granules which are then compressed into tablets. For relief of hypertension in adult humans, 1 tablet is administered 1 to 4 times daily after meals.

EXAMPLE 36.—TABLETS

Ten thousand scored tablets for oral use, each containing 25 mg. of 1,2-dihydro-1-hydroxy-2-imino-6-methyl-4-piperidinopyrimidine free base and 0.1 mg. of reserpine, are prepared from the following ingredients and using the procedure of Example 26.

| | Gm. |
|---|---|
| 1,2-dihydro-1-hydroxy-2-imino-6-methyl-4-piperidinopyrimidine free base | 250 |
| Reserpine | 1 |
| Lactose | 1500 |
| Corn starch | 500 |
| Talc | 500 |
| Calcium stearate | 25 |

This combination of active materials is effective in adult humans for the reduction of hypertension. The dose is one-half to two tablets 3 times a day depending on the severity of the condition.

EXAMPLE 37.—CAPSULES

Ten thousand hard gelatin capsules for oral use, each containing 25 mg. of 1,2-dihydro-1-hydroxy-2-imino-6-methyl-4-piperidinopyrimidine free base and 200 mg. of meprobamate, are prepared from the following ingredients:

| | Gm. |
|---|---|
| 1,2-dihydro-1-hydroxy-2-imino-6-methyl-4-piperidinopyrimidine free base | 250 |
| Meprobamate | 2000 |
| Starch | 350 |
| Talc | 250 |
| Calcium stearate | 150 |

One capsule 4 times a day is useful in the treatment of hypertension.

EXAMPLE 38.—TABLETS

Ten thousand tablets for oral use, each containing 25 mg. of 1,2-dihydro-1-hydroxy-2-imino-6-methyl-4-piperidinopyramidine free base and 40 mg. of ethoxzolamide, are prepared from the following ingredients:

| | Gm. |
|---|---|
| 1,2-dihydro - 1 - hydroxy-2-imino-6-methyl-4-piperidinopyrimidine free base | 250 |
| Ethoxzolamide | 400 |
| Lactose | 1200 |
| Corn starch | 500 |
| Talc | 500 |
| Calcium stearate | 25 |

The powdered ingredients are thoroughly mixed and slugged. The slugs are broken into granules which are then compressed into tablets. For relief of hypertension in adult humans, 1 tablet is administered 2 to 4 times daily.

We claim:
1. A compound selected from the group consisting of the free base form, pharmaceutically acceptable acid addition salts, and carboxyacylates containing up to and including about 11 carbon atoms in the carboxyacyl portion thereof of the compounds of the formulas:

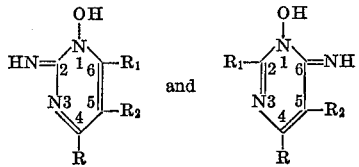

wherein
R is a moiety selected from the group consisting of moieties of the formula

wherein
R$_3$ and R$_4$ are selected from the group consisting of hydrogen, lower alkyl, lower alkenyl, lower aralkyl, and lower cycloalkyl, with the proviso that both R$_3$ and R$_4$ are not hydrogen,
and the heterocyclic moieties aziridinyl, azetidinyl, pyrrolidinyl, piperidino, hexahydroazepinyl, heptamethylenimino, octamethylenimino, morpholino, and 4-lower-alkylpiperazinyl,
each of said heterocyclic moieties having attached as substituents on carbon atoms thereof zero to 3 lower alkyls, inclusive,
a nitrogen atom of each of said heterocyclic moieties being the point of attachment of R to the ring in said formula,
R$_1$ is lower alkyl, and
R$_2$ is selected from the group consisting of hydrogen, lower alkyl, bromo, chloro, nitro, amino, R as defined above, and

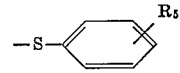

wherein
R$_5$ is selected from the group consisting of hydrogen, bromo, chloro, fluoro, nitro, amino and lower alkyl.

2. 1,2-dihydro-1-hydroxy-2-imino-6-methyl - 4 - piperidinopyrimidine, the compound of Formula IA of claim 1 where R is piperidino, R$_1$ is methyl and R$_2$ is hydrogen.

3. 1,2-dihydro-1-hydroxy-2-imino-6-methyl - 4 - (1-pyrrolidinyl)-pyrimidine, the compound of Formula IA of claim 1 where R is 1-pyrrolidinyl, R$_1$ is methyl and R$_2$ is hydrogen.

4. 1,2-dihydro-1-hydroxy-2-imino-6-methyl-4-morpholinopyrimidine, the compound of Formula IA of claim 1 where R is morpholino, $R_1$ is methyl and $R_2$ is hydrogen.

5. 1,2-dihydro-1-hydroxy-2-imino-6-methyl-4-[1-(4-methylpiperazinyl)]pyrimidine, the compound of Formula IA of claim 1 where R is 4-methyl-1-piperazinyl, $R_1$ is methyl and $R_2$ is hydrogen.

6. 1,2-dihydro-1-hydroxy-2-imino-6-methyl-4-(1-hexahydroazepinyl)pyrimidine, the compound of Formula IA of claim 1 where R is 1-hexahydroazepinyl, $R_1$ is methyl and $R_2$ is hydrogen.

7. 1,2-dihydro-1-hydroxy-2-imino-6-methyl-4-dimethylamino-pyrimidine, the compound of Formula IA of claim 1 where R is

$R_3$ and $R_4$ both being methyl, $R_1$ is methyl and $R_2$ is hydrogen.

8. 1,2-dihydro-1-hydroxy-2-imino-6-methyl-4-allylaminopyrimidine, the compound of Formula IA of claim 1 where R is

$R_3$ being hydrogen and $R_4$ being allyl, $R_1$ is methyl and $R_2$ is hydrogen.

9. 1,2-dihydro-1-hydroxy-2-imino-6-methyl-4-benzylaminopyrimidine, the compound of Formula IA of claim 1 where R is

$R_3$ being hydrogen and $R_4$ being benzyl, $R_1$ is methyl and $R_2$ is hydrogen.

10. 1,2-dihydro-1-hydroxy-2-imino-5,6-dimethyl-4-piperidinopyrimidine, the compound of Formula IA of claim 1 where R is piperidino and $R_1$ and $R_2$ are methyl.

11. 1,2-dihydro-1-hydroxy-2-imino-6-methyl-5-bromo-4-(1-pyrrolidinyl)pyrimidine, the compound of Formula IA of claim 1 where R is 1-pyrrolidinyl, $R_1$ is methyl and $R_2$ is bromo.

12. 1,2-dihydro-1-hydroxy-2-imino-6-methyl-5-nitro-4-piperidino-pyrimidine, the compound of Formula IA of claim 1 where R is piperidino, $R_1$ is methyl and $R_2$ is nitro.

13. 1,2-dihydro-1-hydroxy-2-imino-6-methyl-5-amino-4-piperidino-pyrimidine, the compound of Formula IA of claim 1 where R is piperidino, $R_1$ is methyl and $R_2$ is amino.

14. 1,2-dihydro-1-hydroxy-2-imino-6-methyl-4,5-bis(1-pyrrolidinyl)pyrimidine, the compound of Formula IA of claim 1 where R is 1-pyrrolidinyl, $R_1$ is methyl and $R_2$ is 1-pyrrolidinyl.

15. 1,2-dihydro-1-hydroxy-2-imino-6-methyl-5-piperidino-4-(1-pyrrolidinyl)pyrimidine, the compound of Formula IA of claim 1 where R is 1-pyrrolidinyl, $R_1$ is methyl and $R_2$ is piperidino.

16. 1,2-dihydro-1-hydroxy-2-imino-6-methyl-5-(p-chlorophenylthio)-4-(1-pyrrolidinyl)pyrimidine, the compound of Formula IA of claim 1 where R is 1-pyrrolidinyl, $R_1$ is methyl and $R_2$ is

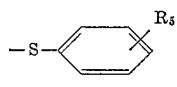

$R_5$ being p-chloro.

17. 1,6-dihydro-1-hydroxy-2-methyl-6-imino-4-piperidinopyrimidine, the compound of Formula IB of claim 1 where R is piperidino, $R_1$ is methyl and $R_2$ is hydrogen.

References Cited

UNITED STATES PATENTS

| | | | |
|---|---|---|---|
| 1,915,334 | 6/1933 | Salzberg et al. | 167—22 |
| 2,075,359 | 3/1937 | Salzberg et al. | 167—22 |
| 2,425,320 | 8/1947 | Hill | 252—149 |
| 2,487,569 | 11/1949 | Mackey | 260—256.4 |
| 2,606,155 | 8/1952 | Hill | 252—149 |
| 3,087,910 | 4/1963 | Wear | 260—256.4 |
| 3,149,104 | 9/1964 | Lesner et al. | 260—256.4 |
| 3,192,216 | 6/1965 | Gray et al. | 260—256.4 |
| 3,202,650 | 8/1965 | Steinemann | 260—256.4 |
| 3,270,015 | 8/1966 | Ursprung | 260—249.6 |
| 3,270,014 | 8/1966 | Ursprung et al. | 260—249.6 |

OTHER REFERENCES

Burger: Medicinal Chemistry, 2nd ed., 1960, p. 78.
Braker et al.: J. Am. Chem. Soc., vol. 69 (1947), pp. 3072–8.
Culvenor: Revs. Pure App. Chem., vol. 3 (1953), pp. 83–91.
Oda: Chem. Abstracts, vol. 45 (1951), col. 8526.

NICHOLAS S. RIZZO, Primary Examiner

R. J. GALLAGHER, Assistant Examiner

U.S. Cl. X.R.

260—239.1, 247.1, 247.2, 256.4, 256.5; 424—199, 232, 246, 251